US007574511B2

(12) United States Patent
Pujol et al.

(10) Patent No.: US 7,574,511 B2
(45) Date of Patent: Aug. 11, 2009

(54) METHODS, SYSTEMS, AND SOFTWARE FOR PROVIDING SERVICE INTEGRATION FRAMEWORK

(75) Inventors: Guy Pujol, Edison, NJ (US); Albert Bauer, Lambertville, NJ (US); Rodney Bass, Princeton, NJ (US); Carl Dashfield, Flemington, NJ (US); Shashidhar Gurrala, Lawrenceville, NJ (US); Gafar Lawal, Plainfield, NJ (US); Wissam D. Mazboudi, Robbinsville, NJ (US); Suresh Nair, Robbinsville, NJ (US)

(73) Assignee: Merrill Lynch & Company, Inc., New York, NY (US)

( * ) Notice: Subject to any disclaimer, the term of this patent is extended or adjusted under 35 U.S.C. 154(b) by 670 days.

(21) Appl. No.: 10/799,227

(22) Filed: Mar. 12, 2004

(65) Prior Publication Data
US 2005/0204048 A1 Sep. 15, 2005

(51) Int. Cl.
*G06F 15/16* (2006.01)
(52) U.S. Cl. ............... 709/229; 709/206; 709/248; 709/246; 709/222; 709/223; 709/227; 709/228; 715/202; 707/10

(58) Field of Classification Search ............ 709/229, 709/29, 206, 248, 222, 246
See application file for complete search history.

(56) References Cited

U.S. PATENT DOCUMENTS

| | | | |
|---|---|---|---|
| 2003/0004853 A1* | 1/2003 | Ram et al. ............... 705/37 |
| 2003/0212761 A1* | 11/2003 | Meredith et al. ......... 709/218 |
| 2004/0221066 A1* | 11/2004 | Ganfield et al. ......... 709/250 |
| 2005/0055700 A1* | 3/2005 | Singler et al. ........... 719/311 |
| 2005/0144226 A1* | 6/2005 | Purewal ................. 709/203 |
| 2007/0199056 A1* | 8/2007 | Bhatia et al. .............. 726/8 |

* cited by examiner

Primary Examiner—Jude J Jean Gilles
(74) Attorney, Agent, or Firm—Morgan, Lewis & Bockius LLP

(57) ABSTRACT

A preferred embodiment of the subject invention comprises a system for implementing computer network services and applications, comprising a front-end component comprising one or more applications; a back-end component comprising one or more services; and an abstraction layer component operable to communicate with the front-end and back-end components. In another preferred embodiment, the subject invention comprises a system for linking applications and services, comprising: a vendor connectivity component; a business integration component; a security component; a utility component; and a back end connectivity component.

29 Claims, 57 Drawing Sheets

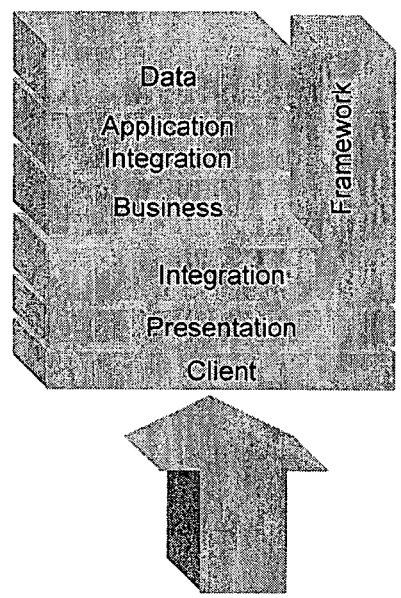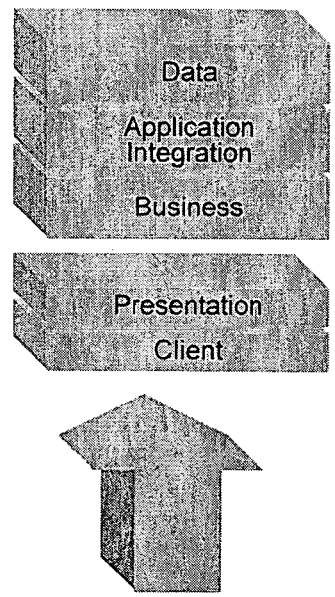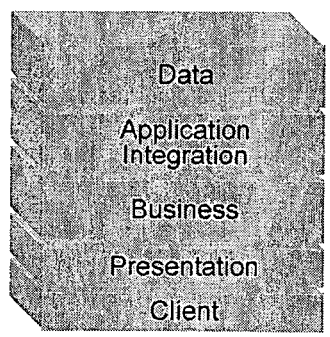
FIG.5

Log System Event

US 7,574,511 B2

METHODS, SYSTEMS, AND SOFTWARE FOR PROVIDING SERVICE INTEGRATION FRAMEWORK

BACKGROUND OF THE INVENTION

The present invention generally relates to computer and Internet technology, and more particularly to technology for providing a consistent mechanism for systems (such as vendor systems) to access back-end functionality and data from services that deal with the public.

Typically, front-end business applications have been integrated with back-office host and network-based applications through a complex and non-standard set of APIs, adapters, and services. This may be thought of as a product-driven approach, since it has multiple products interfacing with the back office, each through its own set of integration, access, and security mechanisms.

There are a number of problems associated with this approach. For example, multiple database-specific access methods may be required. There may be several ways to do the same thing. There may be no organized way to provide audit information, and diagnostics may be distributed throughout the environment (e.g., in event logs and text files).

Regarding the back-end, there may be multiple vendor-supported middleware solutions in place, and there may be direct coupling of applications to an individual connectivity utility.

Regarding security, there may be no single client authenticator allowing a user to interface with multiple applications, and there may be multiple entitlements systems. The security may be integrated with channel frameworks, and there may be inconsistent representation of processes and data.

Such approaches typically evolve through a history of developing redundant and diverse technologies as new infrastructure components are added for each new project. As a consequence, they have a number of drawbacks.

One problem, aside from the ones listed above, is that these various technologies often have tight coupling to individual channels and systems, making adaptation to change progressively difficult. Development and maintenance of each new solution becomes increasingly expensive and time-consuming.

Another problem with such systems is that new vendors encounter a steep learning curve when trying to interface with the various channels and systems. Also, end-to-end problem resolution between a vendor and a back-end office can be costly in time and resources.

It was with the foregoing understanding that the present invention was made.

SUMMARY OF THE INVENTION

One object of the present invention is to provide a consistent mechanism for systems and applications (for example, vendor systems and applications) to access back-end functionality and data.

Another object is to provide a mechanism for insulating applications from the various particular ways in which a service may be implemented.

Another object is to abstract a back-end from vendor channels and to abstract middle-tier business applications from middle-tier infrastructure services.

Another object is to provide a channel-driven model that enables multiple products to interface with a back office in a consistent and scalable manner.

Another object is to provide a system wherein any application can be replaced without affecting back-end systems.

Another object is to provide a system that enables single sign-on for a plurality of services.

Another object is to provide a system that enables system-wide error reporting.

The above and other objects of the invention are realized by the embodiments described herein.

A preferred embodiment of the subject invention comprises a system for implementing computer network services and applications, comprising a front-end component comprising one or more applications; a back-end component comprising one or more services; and an abstraction layer component operable to communicate with the front-end and back-end components. Embodiments also comprise such systems wherein the abstraction layer component is operable to provide de-coupling of services provided by the back-end component; the abstraction layer component is operable to provide de-coupling of applications in the front-end component; the abstraction layer component is operable to provide single sign on for substantially all of the applications; the abstraction layer component is operable to provide built-in entitlements; the abstraction layer component is operable to provide system wide error reporting; the abstraction layer component comprises a business integration component; abstraction layer component comprises a vendor connectivity component; the abstraction layer component comprises a security component; the abstraction layer component comprises a utility component; the abstraction layer component comprises a back end connectivity component; the abstraction layer component uses application templates to provide standardization of business services; the abstraction layer component is operable to provide one or more standardized interfaces to back end services; the abstraction layer component is operable to provide standardization of back end services; the abstraction layer component is operable to provide one or more standardized interfaces to external consumers and providers; and/or the abstraction layer component comprises a single deployment platform.

In another preferred embodiment, the subject invention comprises a system for linking applications and services, comprising: a vendor connectivity component; a business integration component; a security component; a utility component; and a back end connectivity component. Embodiments also include such systems wherein: the vendor connectivity component is operable to standardize exposure of the applications to the services; the vendor connectivity component is operable to provide a consistent abstraction between a user interface and a middle tier; the vendor connectivity component is operable to use standardized headers to provide substantially seamless system management integration between a caller and the applications; the vendor connectivity component is operable to provide automatically generated service entry points; the vendor connectivity component is operable to provide service location and activation capabilities using one or more standard interfaces; the one or more standard interfaces comprise a Universal Discovery Description and Integration interface; the business integration component is operable to provide call context information; the business integration component is operable to provide identity context information; the business integration component is operable to provide application context information; the security component is operable to provide distributed security; the security component is operable to provide single sign on; the security component is operable to provide entitlement management; the security component is operable to provide identity management; the utility component is operable to enable the applications to access utilities using a standardized application program interface; the utility component is operable to provide centralized end-to-end system management with an ability to correlate information across a plurality of parameters; the utility component is operable to enable auditing at system boundaries to manage service level agreements and method level metering; the back end connectivity component is operable to enable the applications to access the services via one standardized application program interface; the back end connectivity component is operable to provide access to back end data sources without changing a back end system; and/or the back end connectivity component is operable to enable de-coupling of the applications from the services.

BRIEF DESCRIPTION OF THE DRAWINGS

FIG. 5 depicts evolution of the need for the present invention.

DESCRIPTION OF THE PREFERRED EMBODIMENTS

Referring first to FIGS. 1-15, preferred embodiments of the present invention will now be described. It will be appreciated that the invention is equally applicable without limitation for use in a number of other computer-related applications and systems.

Figure 1:
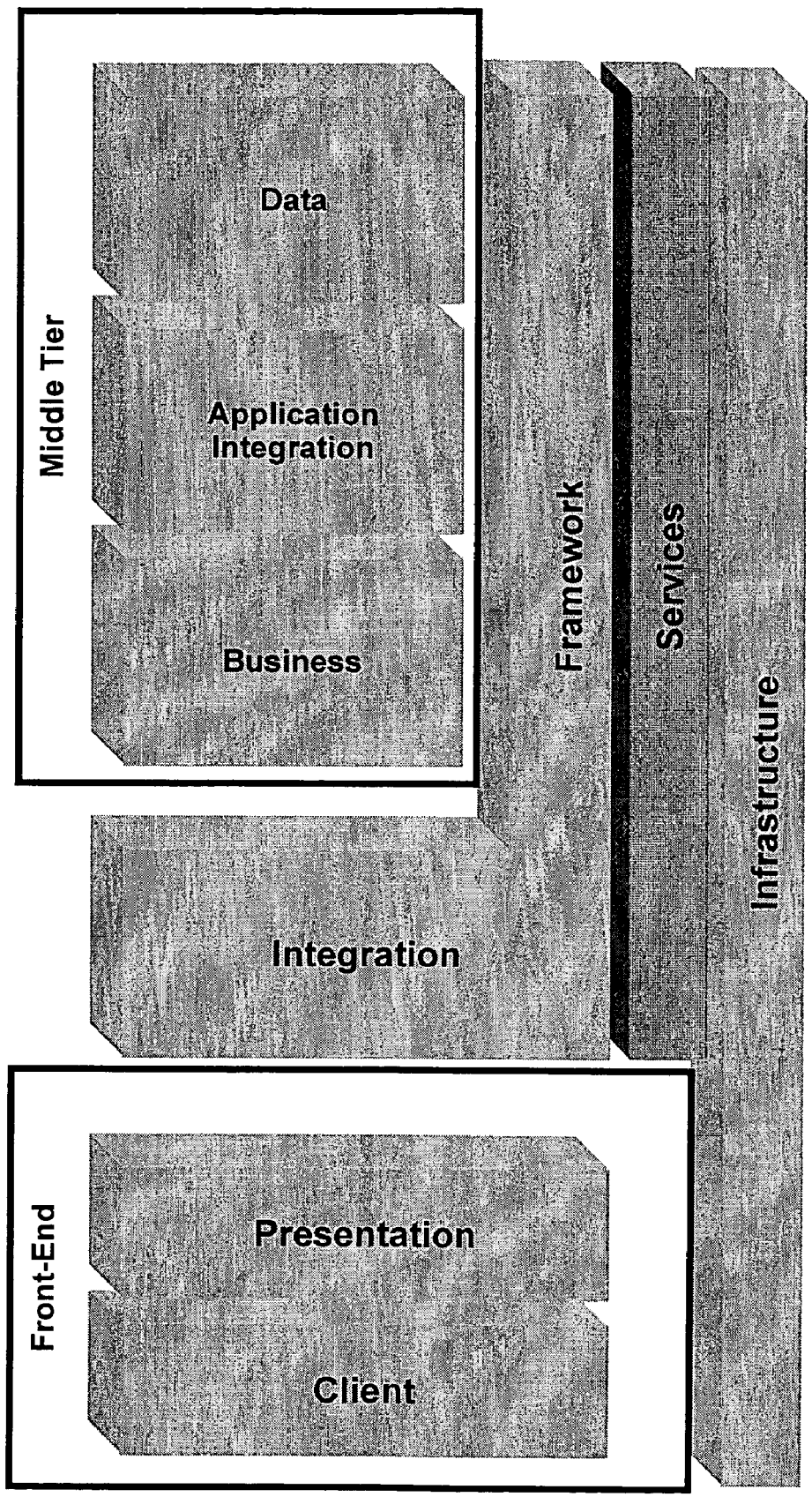
FIG. 1 is a general depiction of a preferred embodiment of the present invention.
Figure 2:
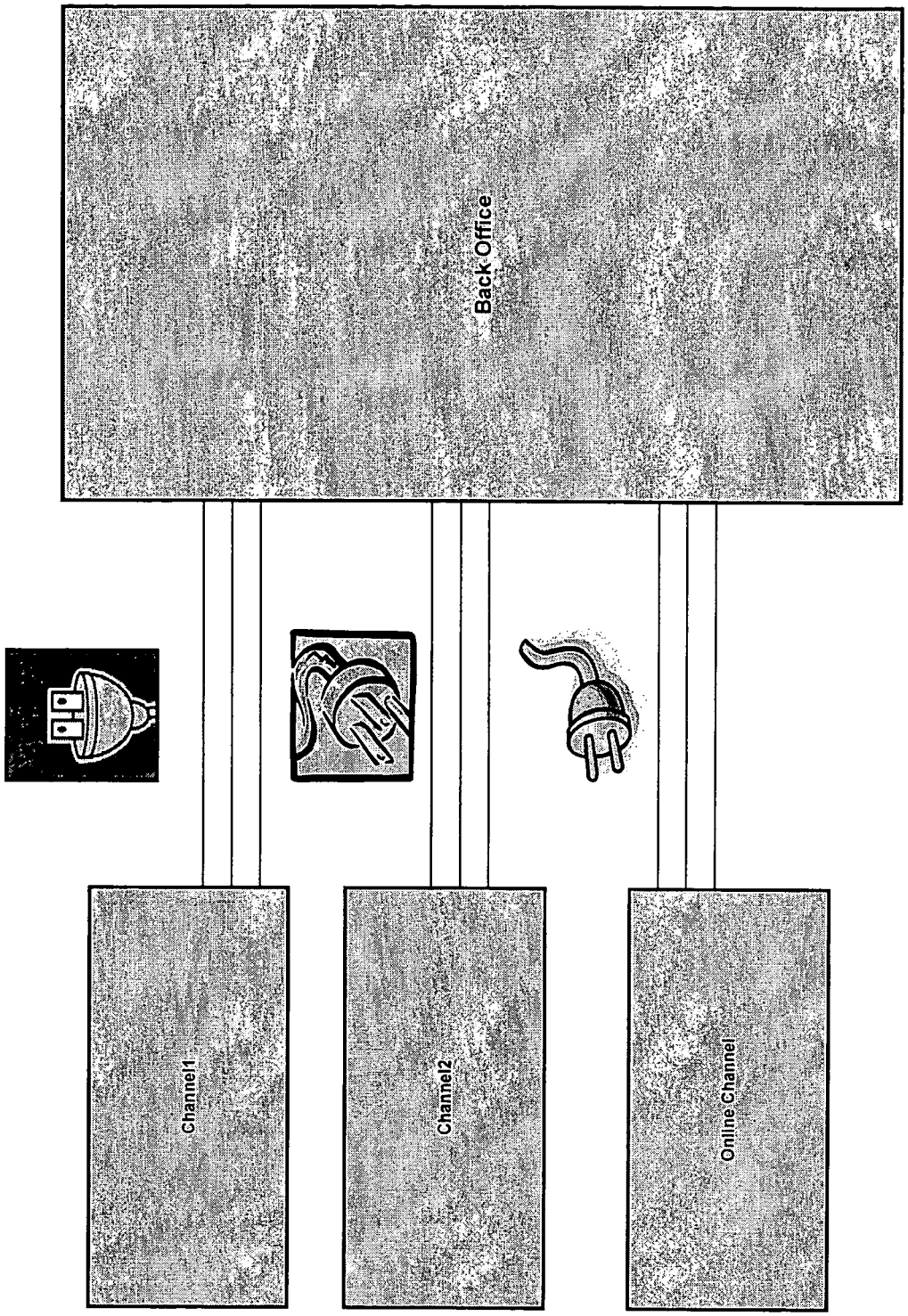
FIG. 2 depicts prior art, product-driven systems.

A preferred embodiment of the present invention relates to an Integration Framework (IF), which provides a consistent mechanism for systems to access backend functionality and data. IF preferably abstracts a backend from vendor channels and middle-tier business applications from the middle-tier infrastructure services, as shown in FIG. 1.

The IF preferably provides a mechanism to insulate applications from the many ways in which a service may be implemented, based not on who implements the services (vendor, back office, or other party) or how the services get implemented, but rather on what the requirements for the services are. In contrast to the prior art, IF-based business applications are simpler to develop, deploy, and manage.

In one preferred embodiment, the invention comprises up to five major components that each provide substantially distinct functionality. Those components are: (1) a vendor connectivity framework; (2) a business integration framework; (3) a security framework; (4) a utility framework; and (5) a back-end connectivity framework. However, those skilled in the art will recognize that the IF is more general than the above five components and may compromise different combinations of those components or other components while still remaining within the scope of the invention.

A preferred vendor connectivity framework provides one or more of the following benefits: (a) standardizes the way in which business services are exposed; (b) provides a consistent abstraction between a user interface and a middle tier; (c) provides seamless system management integration between callers and applications through standardized headers; (d) service entry points are auto-generated and hence kept up-to-date with the latest in web services standards (e.g., Global XML Web Services Architecture (GXA)) without any development effort; (e) provides service location and activation capabilities through standard Universal Discovery Description and Integration (UDDI) interfaces (thereby de-coupling the implementation from the service provider); (f) provides business service grouping and categorization guidelines; and (g) provides documentation and help on business services exposed by a back office.

Universal Discovery Description and Integration is a specification for distributed Web-based information registries of Web Services. UDDI is also a publicly accessible set of implementations of the specification that allow businesses to register information about the Web Services they offer so that other businesses can find them.

A preferred business integration framework provides one or more of the following benefits: (a) common business application services; (b) provides call context (who called from which channel using what program and device); (c) provides identity context (end user and client information, preferably including identity, role and entitlements); and (d) provides application context information (for example, application level entitlements and state information) to applications.

A preferred security framework (see FIG. 10) provides distributed security, which: (a) supports Web application and Web services; (b) provides a single sign-on that utilizes a corporate domain for internal users and establishes a Lightweight Directory Access Protocol (LDAP) directory for external users; (c) provides policy based security that enables externalization of access control rules from application code and eliminates the impact on an application when access rules change; and (d) provides enhanced context services that coordinate with an integrated framework context while enhancing entitlement response headers for applications.

Preferably, the security framework also provides entitlement management, which: (a) establishes standards for role definition and role-based security, utilizing human resources (HR) data for classification of internal users and defining rules for classification of external users; and (b) provides a highly extensible model that allows integration and convergence of existing entitlement data and support for legacy entitlements.

Preferably, the security framework also provides identity management, which: (a) provides an implemented meta-directory infrastructure to manage identity data; and (b) provides enhanced identity data integrity based on using an authoritative source for data. Single sign on is also provided in a preferred embodiment.

A preferred utility framework (see FIG. 8) provides one or more of the following benefits: (a) enables applications to access utilities via a standardized application program interface (API); (b) provides centralized end-to-end system management with an ability to correlate information across a number of parameters (e.g., user, application, environment, caller, calling device, and time); (c) enables auditing at system boundaries to manage service level agreements (SLs) and method level metering; (d) provides flexible convergence opportunities—changes in utilities have limited impact on applications; (e) reliability, availability, scalability and maintainability of applications and utilities is simplified—hotspots can be readily identified and addressed; (f) reduces cost of software, infrastructure and support; and (g) provides a standardized, optimized, and simplified state management solution.

A preferred back-end connectivity framework (see FIG. 9) provides one or more of the following benefits: (a) applications access mainframe, distributed backend and third party data sources via the same standardized API; (b) provides consumption-based alternatives to applications (XML, bitstream, MDAC, for example); (c) provides access to any backend data source without changing the backend system; (d) de-couples applications from backend systems; and (e) provides flexible convergence opportunities—changes in the backend have limited impact on applications or backend access services.

Benefits of a preferred embodiment include: (1) standardizes business applications by using application templates; (2) standardizes interfaces to the services that support business applications; (3) standardizes the services themselves; (4) standardizes interfaces to external vendors; and (5) converges infrastructure by using a singular deployment platform.

Other benefits include: (1) de-couples business applications from their supporting services, presentation tier, and other business applications; (2) streamlines the software release process; (3) reduces turnaround time on the software development life cycle (SDLC) as a whole; and (4) enhances operational manageability.

Figure 3:
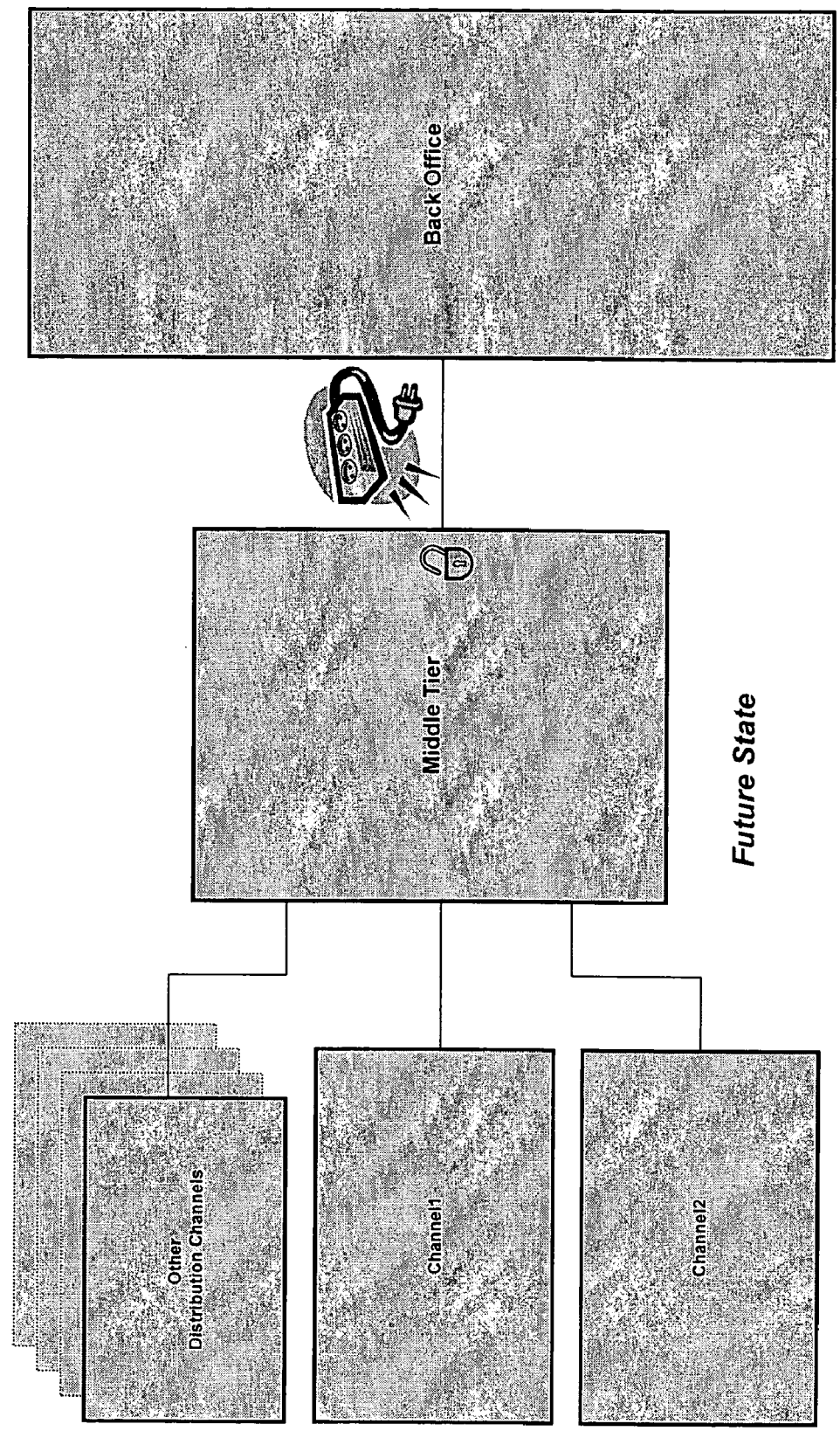
FIG. 3 depicts a preferred channel-driven model.

One goal of IF was to move from a product-driven model that consisted of multiple products interfacing with a back office through their own integration, access, and security mechanisms (depicted in FIG. 2) to a channel-driven model that enables multiple products to interface with a back office in a consistent and scalable manner (see FIG. 3).

Figure 4:
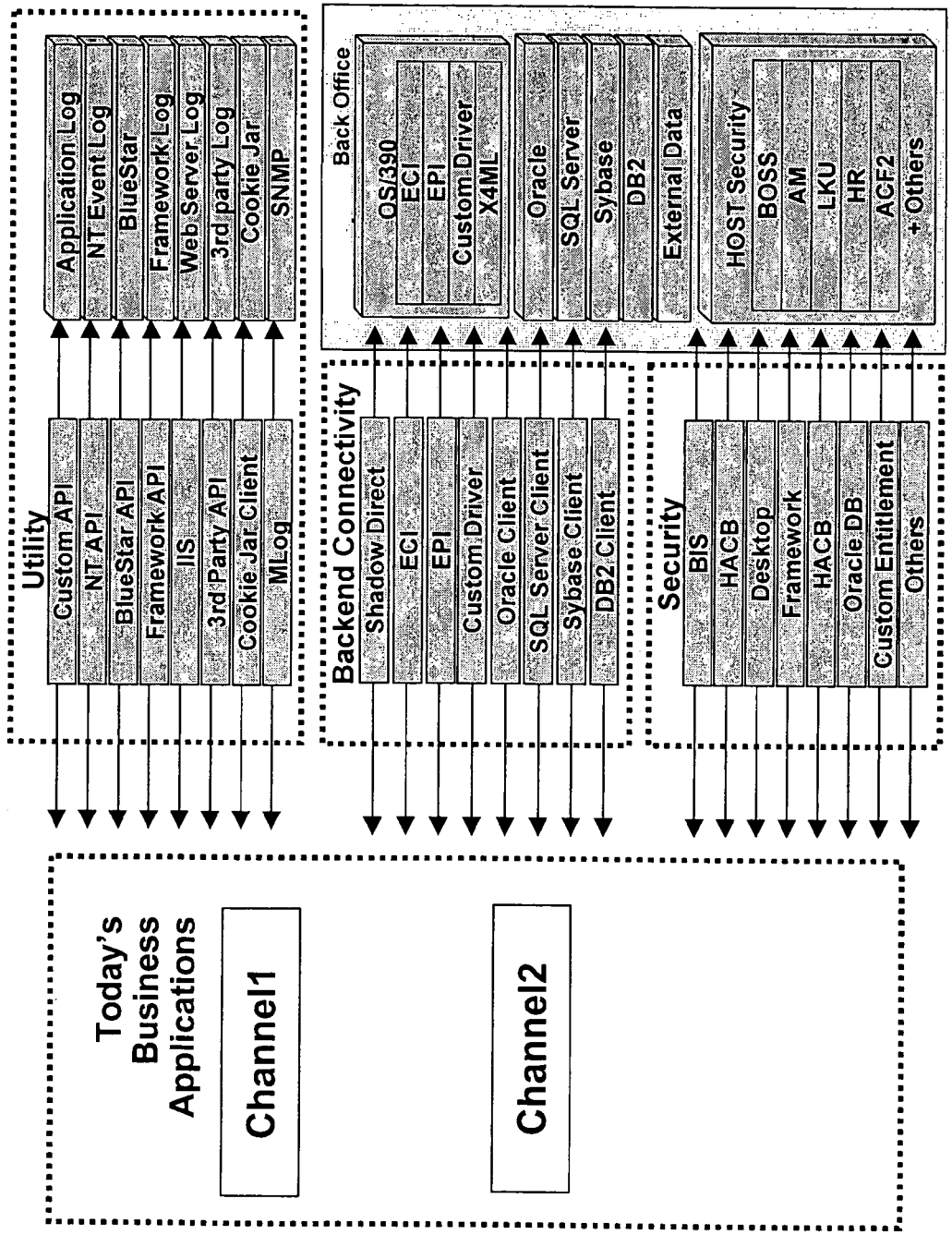
FIG. 4 depicts prior art disadvantages.

In prior art systems, front-end business applications often are integrated with back-office host and network-based applications through a complex and non-standard set of APIs, adapters and services (see FIG. 4).

For example, as discussed above, multiple database-specific access methods may be required. There may be several ways to do the same thing. There may be no organized way to provide audit information, and diagnostics may be distributed throughout the environment (e.g., in event logs and text files). Regarding the back-end, there may be multiple vendor-supported middleware solutions in place, and there may be direct coupling of applications to an individual connectivity utility. Regarding security, there may be no single client authenticator allowing a user to interface with multiple applications, and there may be multiple entitlements systems. The security may be integrated with channel frameworks, and there may be inconsistent representation of processes and data.

FIG. 5 depicts evolution of the need for the present invention. At first there was a layered architecture comprising a number of components to deliver specified services. Then business demand created a need to de-couple the front and back ends of the layered enterprise architecture. This led to the development of the IF using web services, which accommodate ubiquitous access to business services.

Referring again to FIG. 1, it may be seen that the IF provides a "screen" behind which back end business applications and data can evolve over time. The IF's service oriented architecture (SOA) using web services provides a foundation for future elaborations of the enterprise architecture encompassing both the front and back end.

Figure 6:
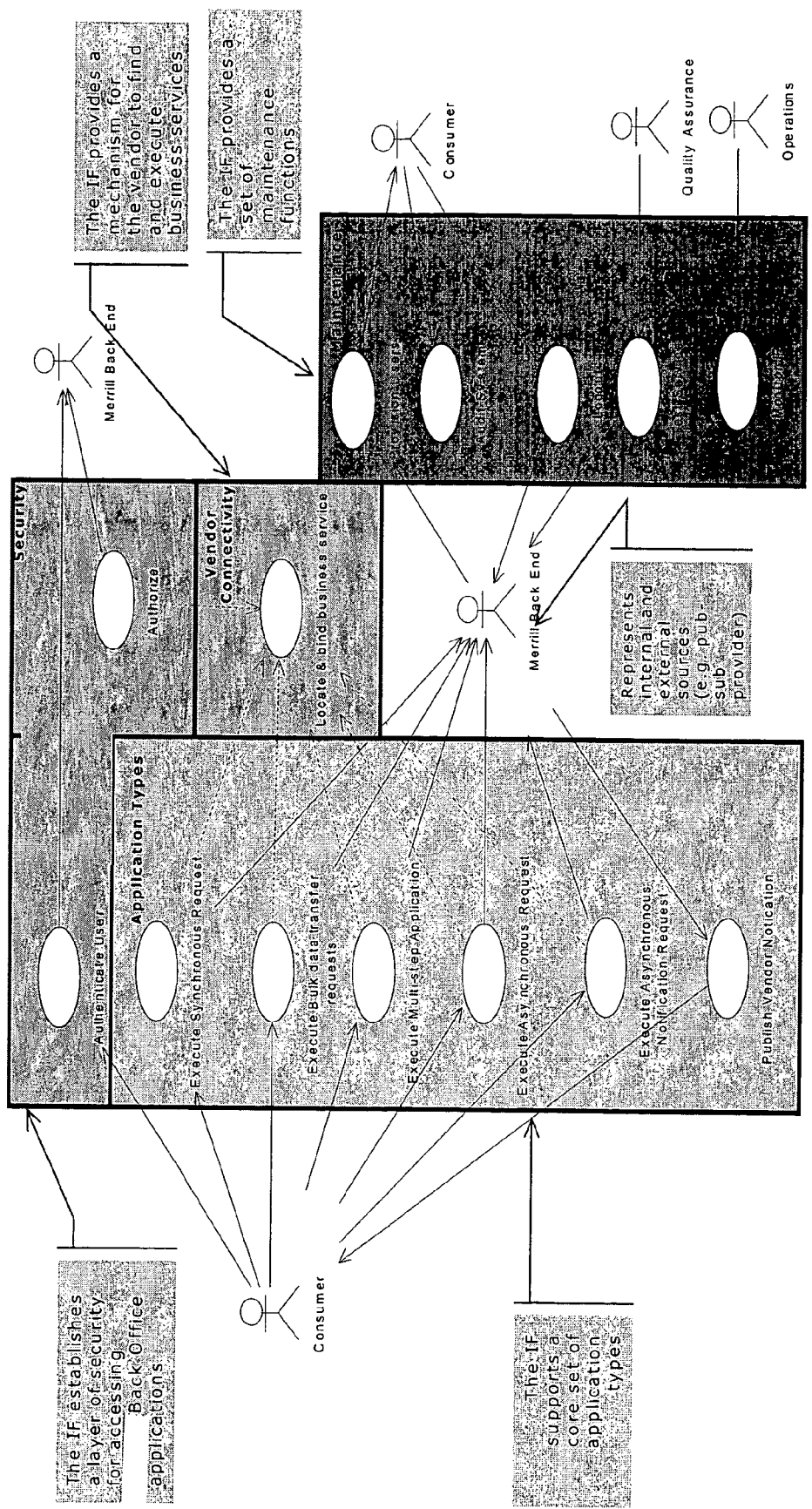
FIG. 6 illustrates use cases and data types supported by a preferred embodiment of the present invention.

FIG. 6 depicts exemplary use cases and application types supported by a preferred embodiment.

Figure 7:
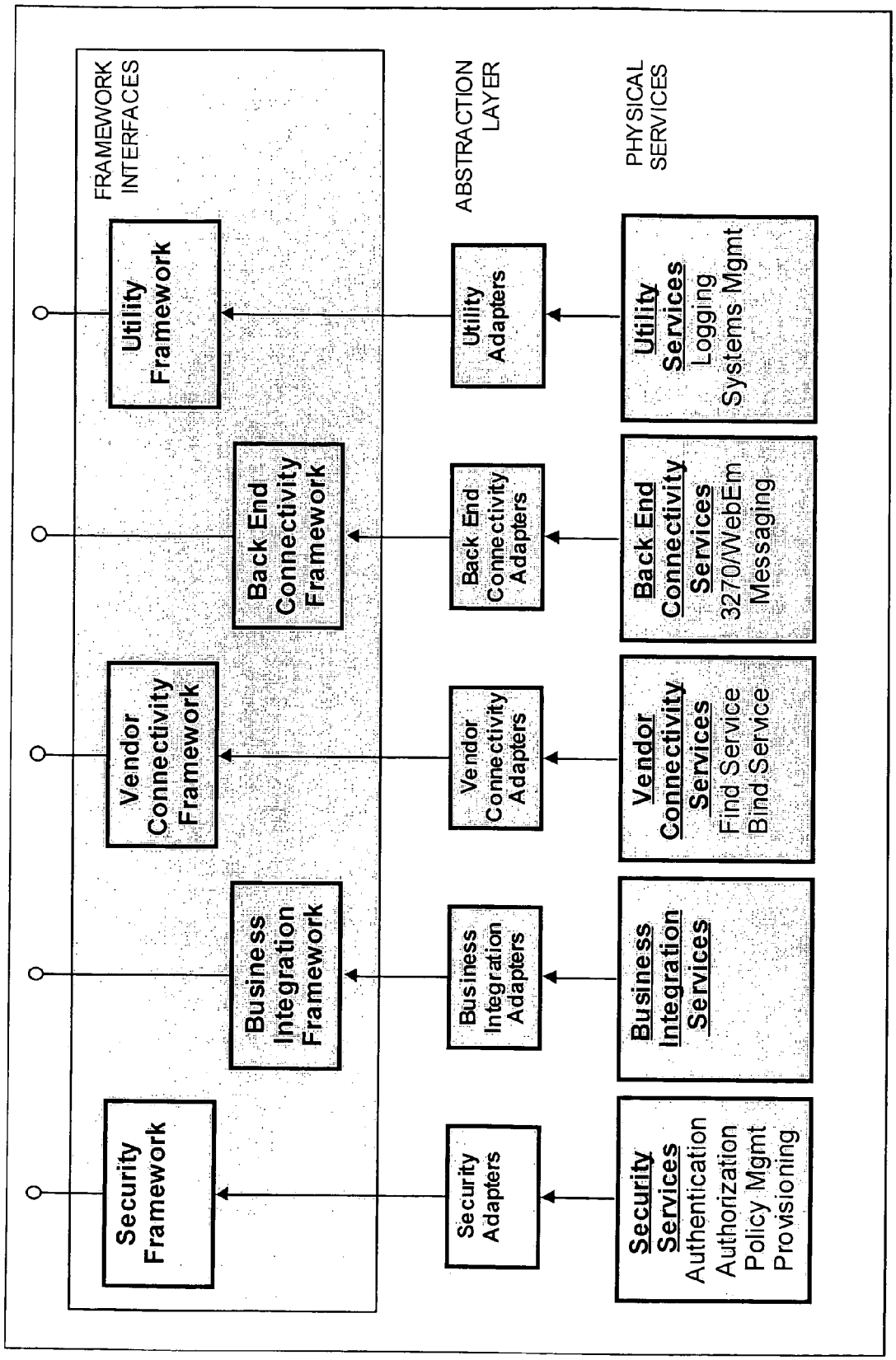
FIG. 7 depicts a preferred relationship between physical services, an abstraction layer, and framework interfaces.
Figure 8:
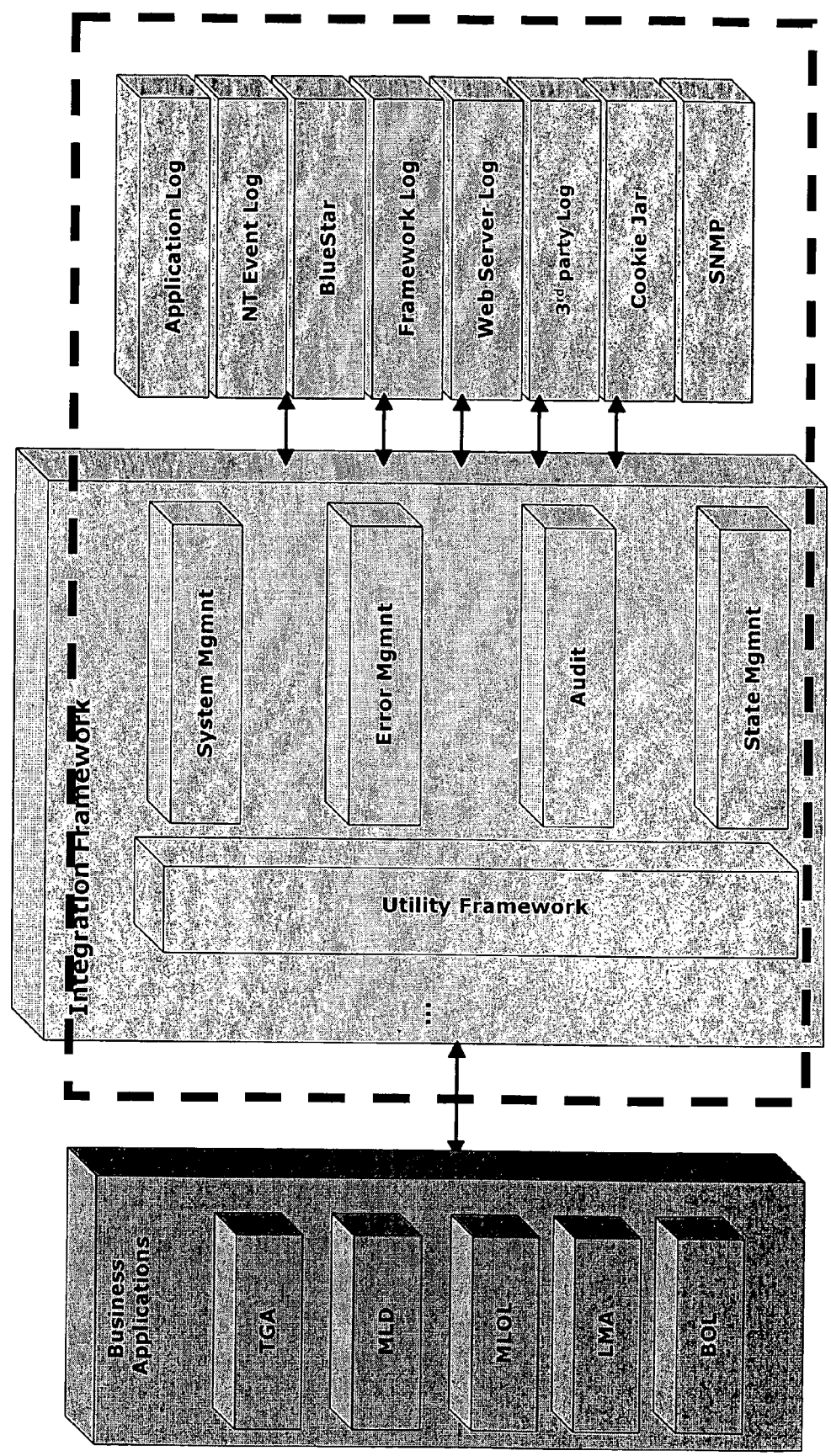
FIG. 8 depicts a preferred utility framework.
Figure 9:
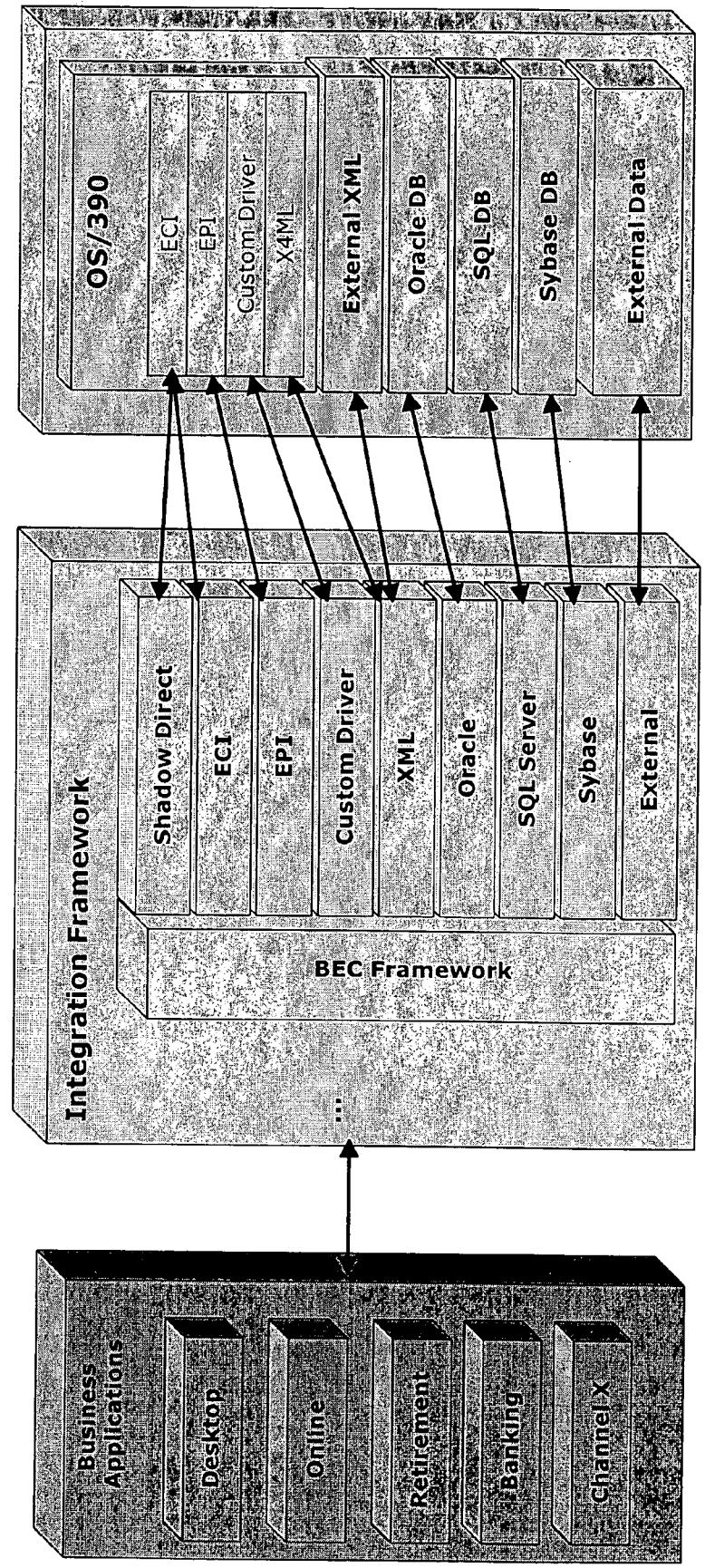
FIG. 9 depicts a preferred back-end connectivity framework.
Figure 10:
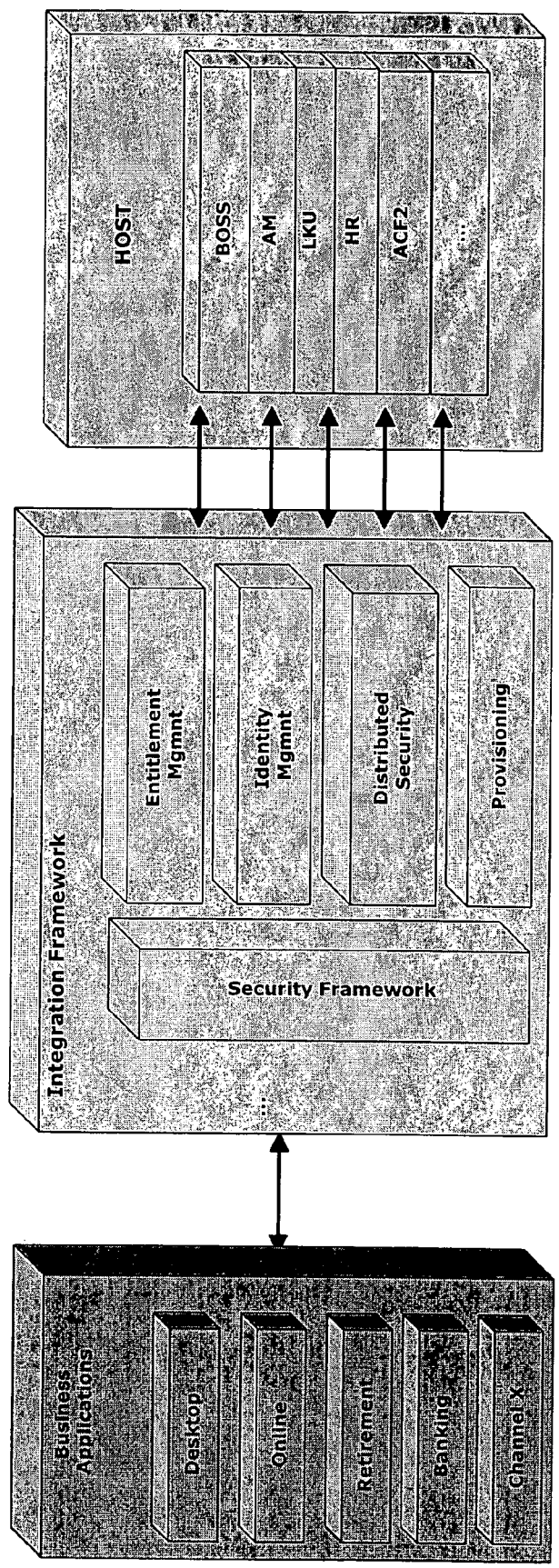
FIG. 10 depicts a preferred security framework.

FIG. 7 illustrates separation of framework interfaces and physical services provided by a preferred embodiment of the present invention.

Figure 11:
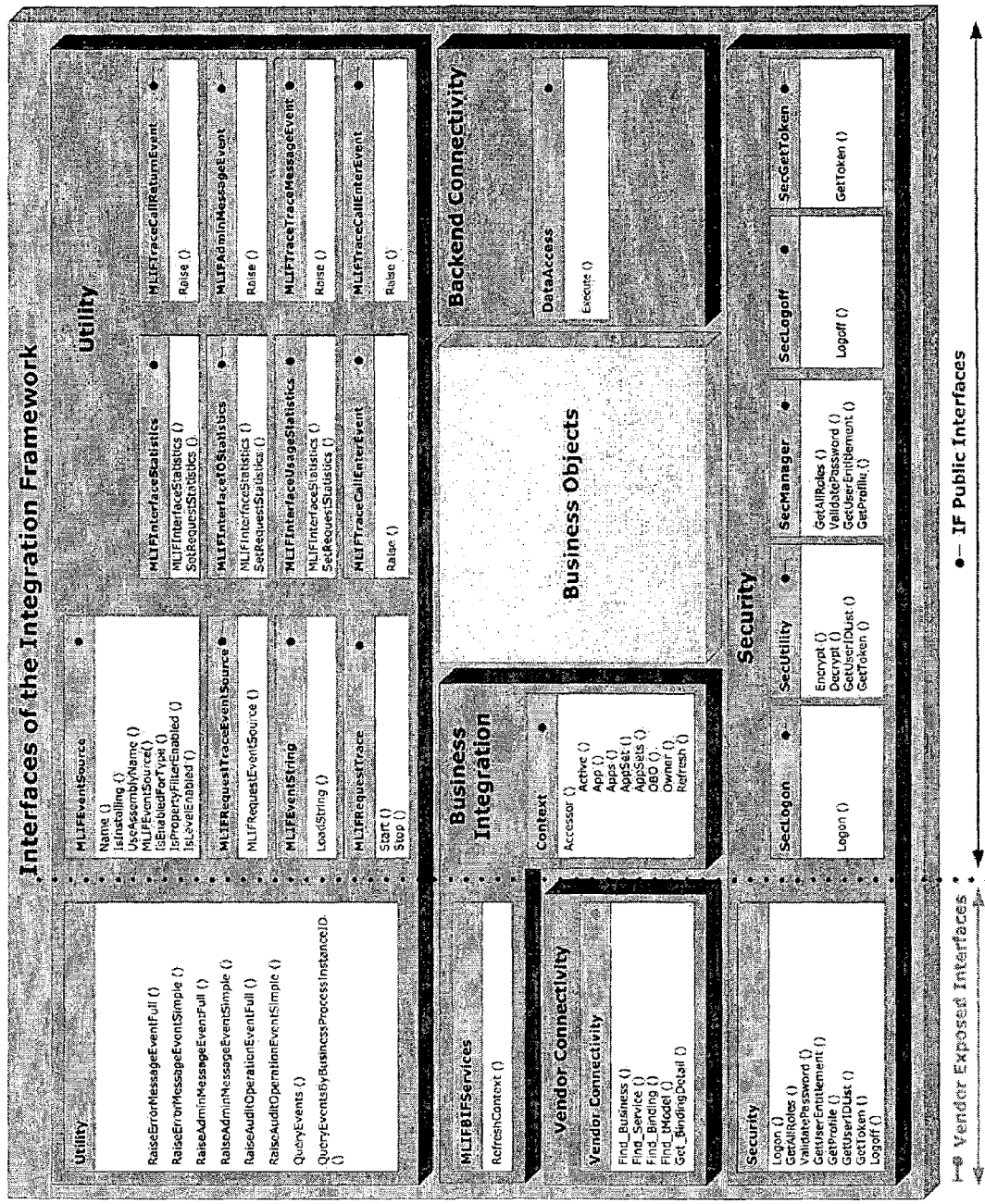
FIG. 11 illustrates preferred internal and edge interfaces.
Figure 12:
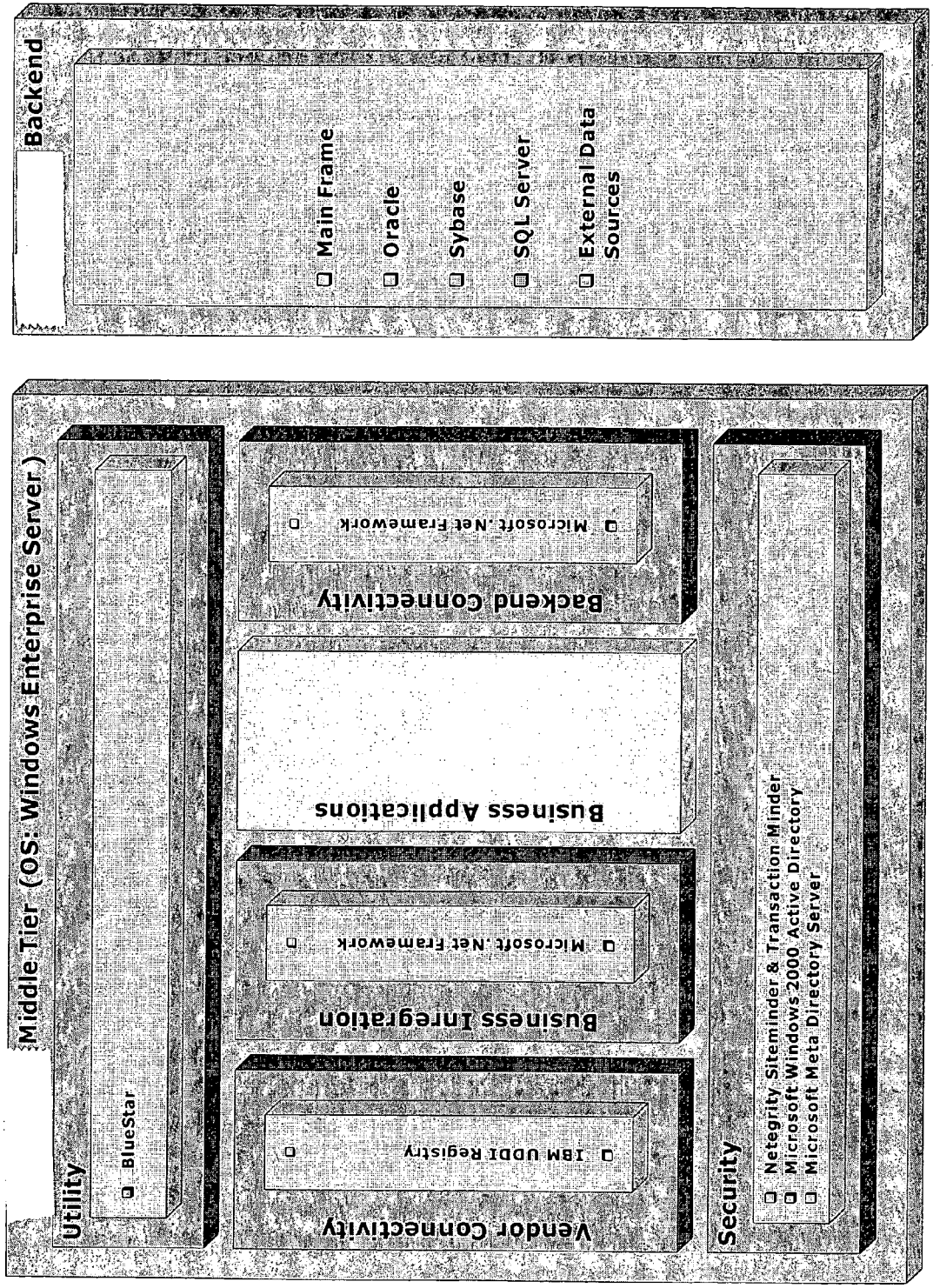
FIG. 12 depicts exemplary components of a preferred embodiment.

FIG. 11 illustrates exemplary internal and edge interfaces of a preferred embodiment. Preferred IF interfaces provide an abstraction layer that protects vendors from changes to the services and the back office. Implementing business application facing interfaces (using, for example, Microsoft technologies) is familiar to developers, and significantly reduces migration burdens and associated costs and risks to schedules. The interfaces preferably provide a well-defined, standardized model for UI vendors and IF vendors to integrate with a back office. Edge interfaces (e.g., utility, vendor connectivity, and security interfaces) expose services to be used by vendors. Other interfaces (e.g., business integration and backend connectivity interfaces) expose services for IF developers to integrate IF and a back office.

In an exemplary implementation (see FIG. 12), convergence is supported through development of a reference architecture for an IF.

Figure 13:
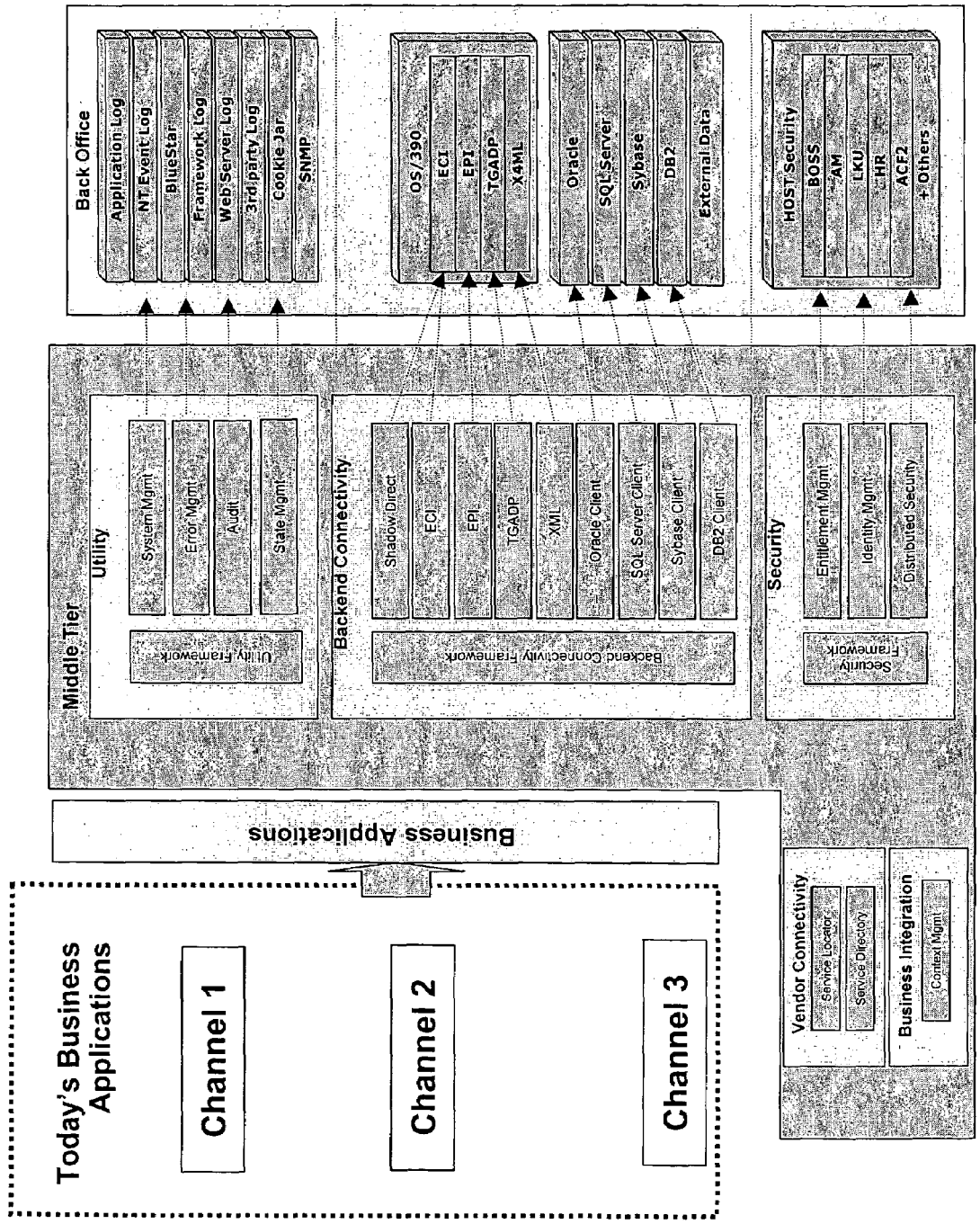
FIG. 13 depicts an exemplary implementation of a preferred embodiment.

FIG. 13 shows an exemplary implementation of a preferred embodiment in greater detail. A preferred utility framework provides centralized end-to-end system management, supports an audit at system boundaries to manage SLs and method level metering, and provides an optimized and simplified state management solution.

A preferred backend connectivity framework enables applications to access mainframe, distributed backend, and third party data sources via the same standardized API, and provides consumption based alternatives to applications (for example, XML, bit-stream, and Microsoft Data Access Components (MDAC)).

A preferred security framework introduces a centralized security authorization solution; introduces centralized entitlement and role-based access control (RBAC) to enhance current access control lists (ACLs) and static maps and to enable multiple roles and role-switching; and enforces a unique identifier that is centrally implemented to link to identity maps.

A preferred vendor connectivity framework standardizes the way in which business services are exposed; provides a consistent abstraction between the UI and middle tier; and enables service entry points to be auto-generated and hence kept up-to-date with latest standards.

A preferred business integration framework provides call context, identity context, and application context information to the applications.

Referring again to FIG. 1, it may be seen that the IF standardizes services and infrastructure. For example, an API based thereon may be released and establish a standard set of services to be exposed to a UI vendor.

The IF enables convergence of services and infrastructure. It provides a singular deployment platform; provides standardized interfaces to all services; converges on a standard for security services (for example, Netegrity); and converges data access points through a single data access point.

The IF supports de-coupling. It enables de-coupling of business applications from their supporting services, de-coupling of business applications from business applications, and de-coupling of a presentation tier from business applications.

The IF enables migration. Standard application types and application templates may be developed to simplify migration and streamline the release process.

Figure 14:
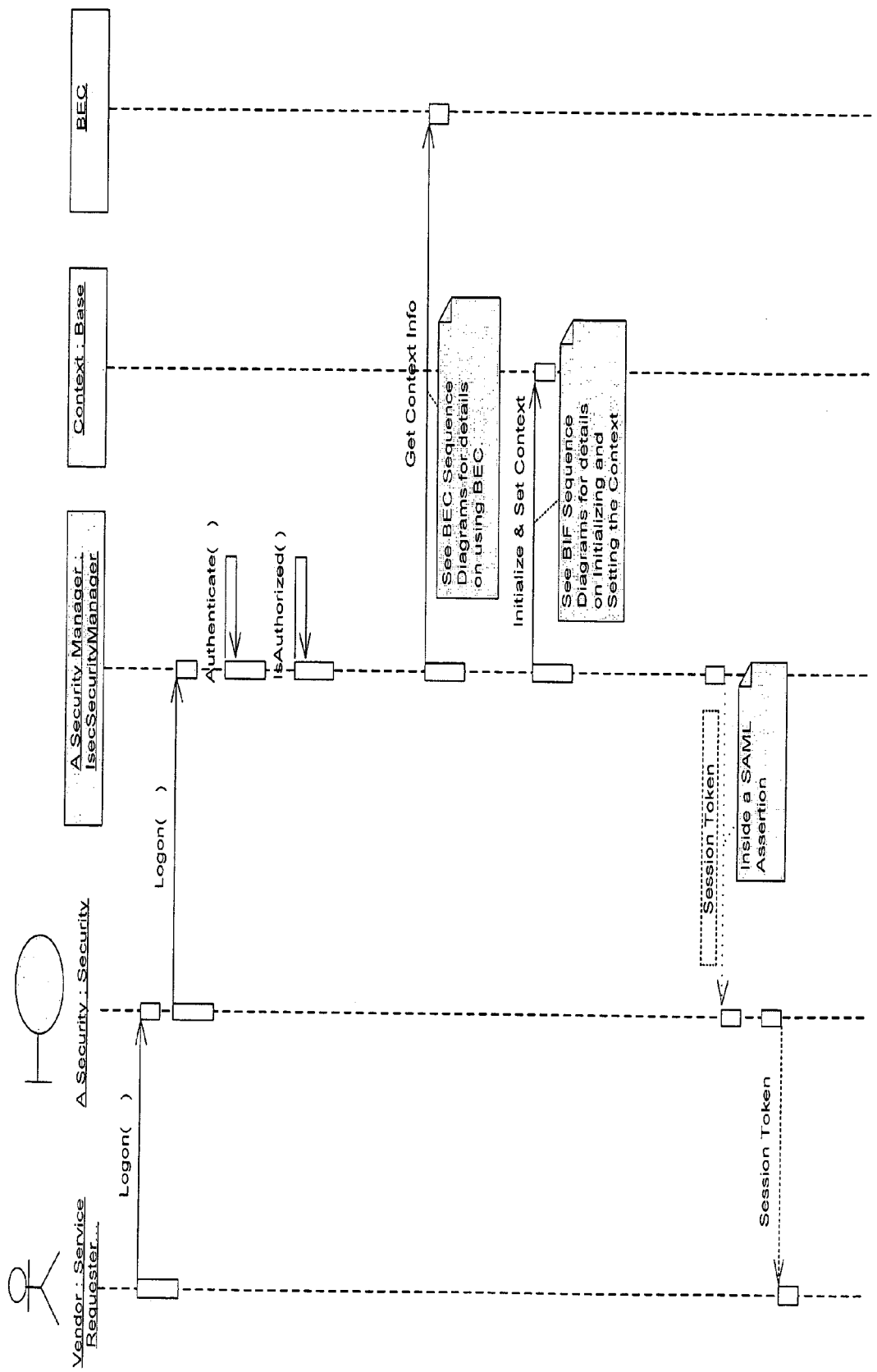
FIG. 14 illustrates a logon use case for a preferred embodiment of the present invention.

The IF improves manageability. The IF utility services for error, log, and audit make it easier to locate problems and narrow down issues. Correlation is supported across services and applications FIG. 14 illustrates an exemplary use case: a logon use case. FIG. 14 is an interaction diagram showing steps of an exemplary logon process for a vendor seeking to logon to a particular service.

Figure 15:
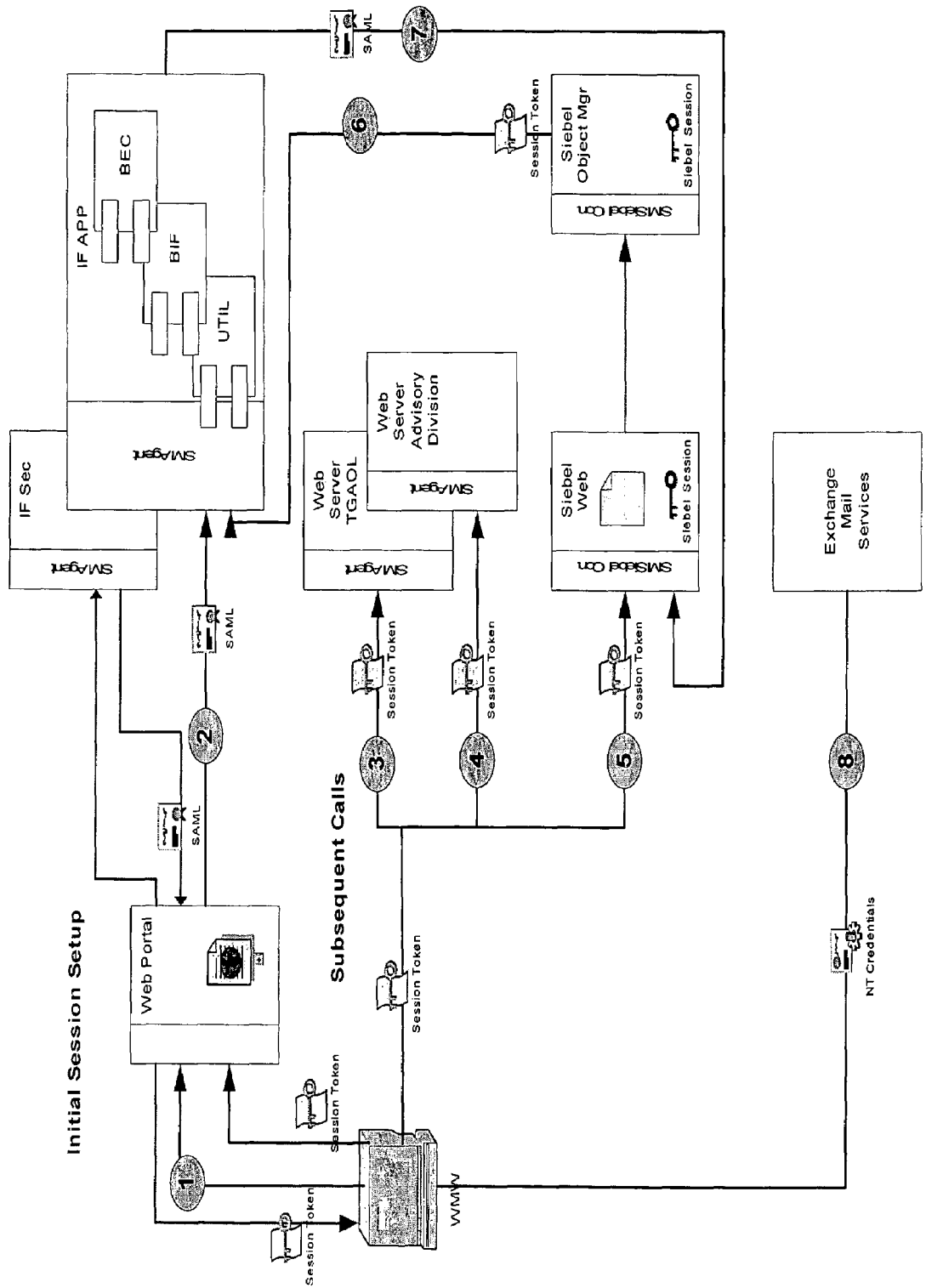
FIG. 15 illustrates logical flow for security aspects of a preferred embodiment.
Figure 16:
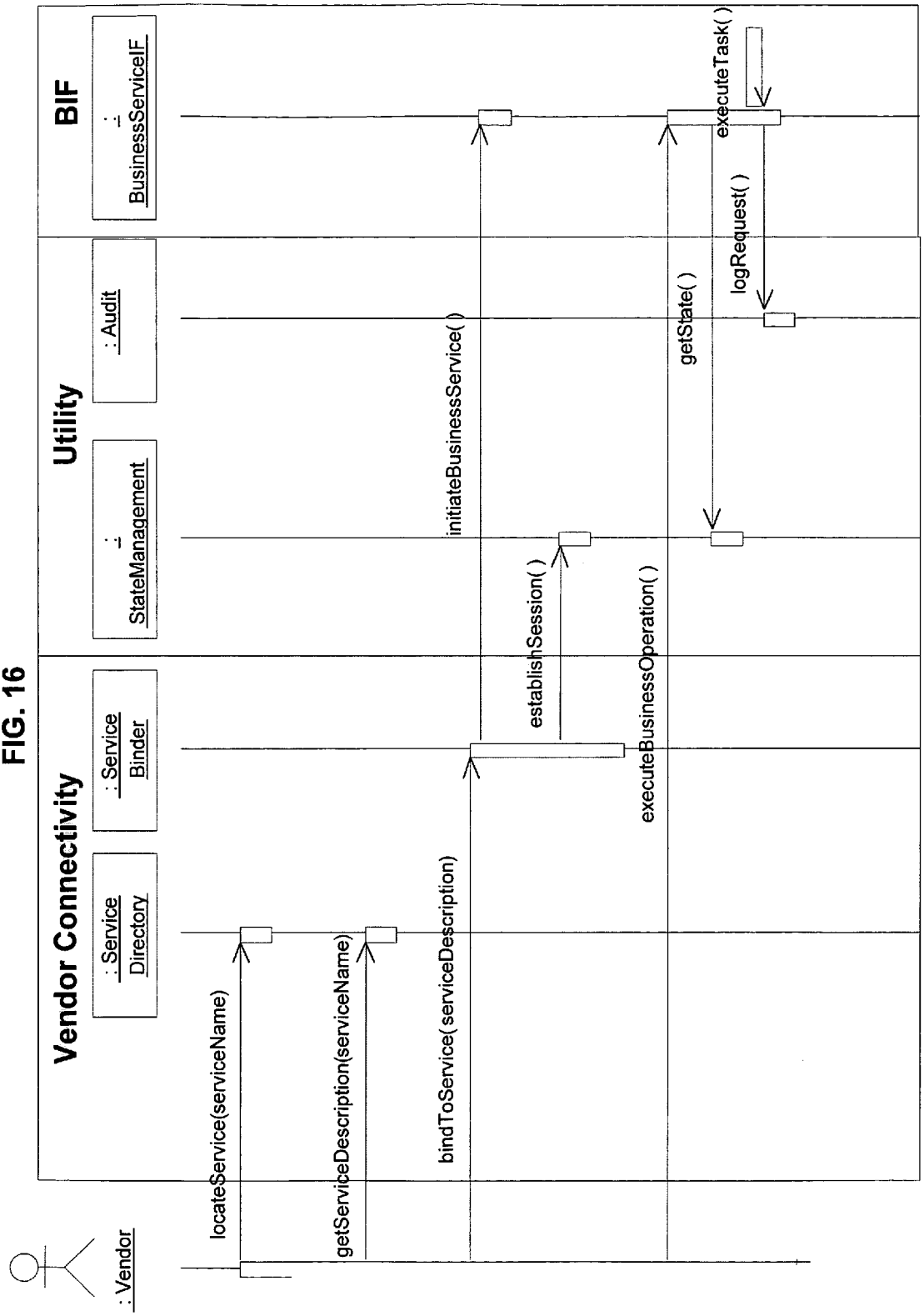
FIG. 16 depicts a preferred Locate and Bind to Service scenario.

FIG. 15 is a flow diagram showing logical flow for an exemplary initial session setup.

FIGS. 16-57 and the following description illustrate specific details of exemplary embodiments of the present invention. These details are described solely for illustration and enablement, and are not intended to limit the scope of the claimed invention in any manner.

As discussed above, a preferred embodiment of the Integration Framework is focused on exposing a consistent set of interfaces to connect to back end functionality and data. It preferably consists of five major areas: Vendor Connectivity Framework, Security Framework, Business Integration Framework, Utility Framework, and Back End Connectivity Framework.

The Utility Framework preferably provides one or more of the following services to the overall Integration Framework:

(a) Specification Error, Audit, and Trace logging and querying interfaces for IF components. This provides standardization of error logging across IF.

(b) System Management functionality to acquire, store, classify, and distribute application and infrastructure events such as errors and warnings.

(c) Session Management functionality to provide state and context management for IF components.

The Business Integration Framework (BIF) serves as an important part of a middle tier. A presentation tier, typically developed and hosted by outside vendors, communicates with backend systems through BIF. The input to BIF is fully authorized and partially authenticated by a security tier. BIF is responsible for enforcing business rules validation, transformation of data to backend (and conversely) to a common intermediate form that Back End Connectivity (BEC) can consume, and providing access for its applications to horizontal services such as logging, session management, etc. (these services themselves preferably are provided by the Utility Framework).

BIF defines a vendor's interface to business applications as well as service providers of the Business Integration Framework. The BIF is somewhat analogous to COM objects for business purposes. The COM interface does not change because new functionality is implemented to fulfill the COM request. In the same manner, the Business Integration Framework is capable of defining just one interface for all application types, such that no matter what transaction is executed the interface remains the same; only the data passed by parameters changes. As a rule, code changes (even "module changes") should not be required when a new application (of already existing app-type) is added to a suite of applications.

Preferred Vendor Connectivity Framework Specification

Exemplary Assumptions:

(a) The vendor connectivity framework is the specification by which all core applications are located and executed.

(b) The vendor connectivity framework is a specification of all the interfaces for the core applications being used.

(c) The vendor connectivity framework is a specification for the context in which all core applications are activated. This includes the definition of the application request and response payload, as well as the definition of integration framework context outside the application request and response payload.

Scenario Analysis

A scenario relevant to Vendor Connectivity is Locate and Bind to Service. In this section the relevant sequence diagram is depicted for that scenario.

Locate and Bind to Service. Precondition: The Vendor has passed all security checks, is authorized to execute a service, and all required logging of the request has taken place. See FIG. 16.

Component Analysis

This section outlines the Logical Interface Definition provided by Vendor Connectivity. Note that the interface is defined at the logical level and hence describes the behavior to be offered, but not the specific physical messages. Guidelines on how the physical messages can be constructed are given in the Implementation Considerations section below.

Figure 17:
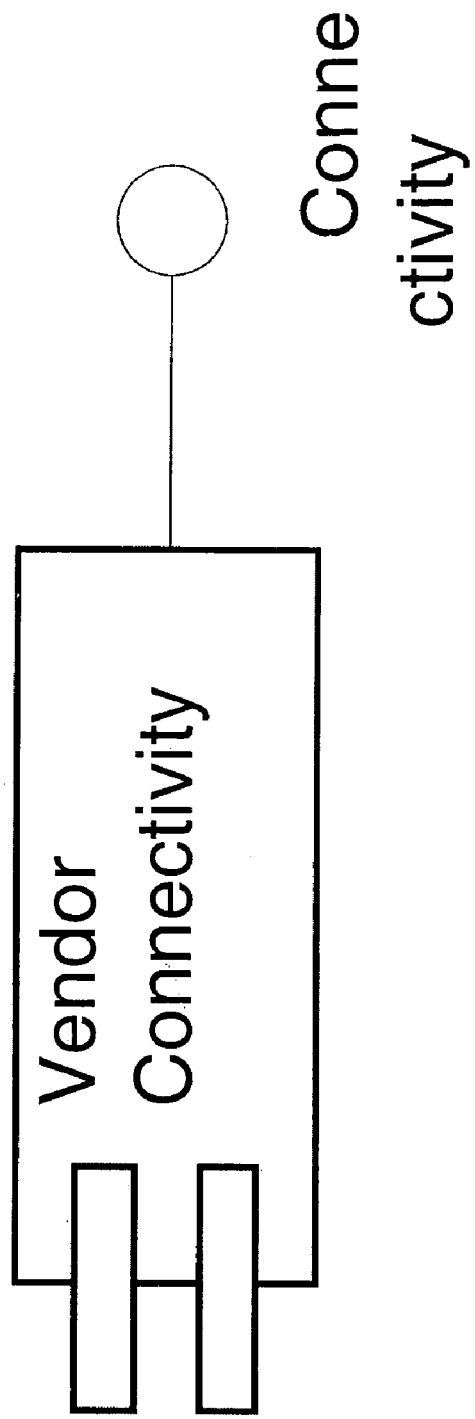
FIG. 17 depicts a preferred connectivity interface.

Logical Interface Definition. As depicted in FIG. 17, the Vendor Connectivity Component realizes the Connectivity interface. Note that a component could support multiple interfaces.

The Connectivity interface preferably has the logical operations depicted in Table 1.

TABLE 1

| Operation | Parameters | Return | Behavior |
|---|---|---|---|
| locateService | serviceName | List of matching service name | Based upon the name of the service a matching list of appropriate service names are determined |
| getServiceDescription | serviceName | Service Descriptions (WSDL) | The WSDL for the service is returned |
| bindToService | serviceDescription | Pointer to service to be executed | The service is initiated and appropriate state is set up |

Implementation Considerations

This section describes some of the considerations that preferably are taken into account while implementing the service.

Protocol. These are the minimum requirements for the Vendor Connectivity Namespace. (Security/Context ID at the IF protocol level).

Generic Header:

ServiceID (leads to Service Category, Sub Cat, Access Point, Contact Info)

Version

DateTime (up to millisecond)

ClientApp (Vendor app, test drivers etc.)

Client User Info (to be ratified with security)

Environment (Production, QA, PE, Development, Sandbox, UAT)

EndPoint (FQ service end point—physical desc)

Request:

Service Specific Params

Response:

Requested data:

Requested status:

Warnings:

Error details: Error ID, Error type (server, app., etc.)

Error Message, Source, Stack trace, Service call header

General Interface Syntax

Interface: <Verb><AppCategory>[Optional: SubCategory][Optional:Qualifier](in Schema, outSchema)

Generally speaking, in preferred embodiments, an interface represents an agreement between a consumer of a service or function and a provider of a service or function as to how the service or functionality should be invoked and used. This section describes the preferred general syntax of the service interfaces provided by the Integration Framework to vendors or internal consumers of services. The preferred syntax of the Integration Framework interfaces has a simple, predictable pattern, as follows:

Interface:

<Verb><AppCategory>[Optional:SubCategory][Optional: Qualifier](in, out)

Verb: The action to be taken by the Integration Framework on behalf of a vendor application. For example, Query, Insert, Update, Delete, Publish, Subscribe.

AppCategory: Represents a high-level category of business information, such as, Account, Research, Client, Order, MarketData.

SubCategory: Represent a secondary level of business information, such as Holdings, Balances, Activity. When combined with a Verb and higher level AppCategory, serves to describe in more detail the nature of the request. For example, QueryAccountHoldings. Subcategory is an optional descriptor.

Qualifier: Describes a tertiary level of business information. Serves to describe in more detail the nature of the action to be taken on behalf of vendor's application. Qualifier is an optional descriptor. For example, QueryAccountHoldings-MarketValue, where MarketValue represents a Qualifier.

In: A self-describing data schema containing a list of input parameter names, parameter data types (e.g., integer, string, binary, etc. . . . ), and parameter values. Similar to an xml document with an attached xsd.

Out: A self-describing data schema containing a list of output field names, data types (e.g., integer, string, binary, etc . . . ), and output values. Similar to an xml document with an attached xsd.

Examples of some possible interfaces:
QueryAccountHoldingsMarketValue(in, out)
QueryAccountActivity(in, out)
QueryAccountAssetAllocation(in, out)
UpdateClientInfoAddress(in, out)
InsertOrderEquityEntry(in, out)

List Connectivity Candidates are shown below in Table 2.

TABLE 2

| Connectivity Approach | Directory | Standard | Skills Required |
|---|---|---|---|
| SOAP | UDDI | IETF | Most major platforms |
| COM+ | ADSI | Vendor Proprietary | Microsoft platform specific |
| RMI | JNDI | Java Proprietary | Java platform specific |
| Websphere/MQ | JNDI | Java Proprietary | Java platform specific |
| JMS | JNDI | Java Proprietary | Java platform specific |
| Tibco | NA | Vendor Proprietary | Vendor specific |

Service Provider Constraints

Functional: The directory service preferably supports application partitioning. This allows for deployments of new versions of software to a small production test audience, before releasing the version to the general population. The directory service preferably allows for an individual application to be shut off on schedule or on demand.

Non-Functional: Reliability, performance, and supportability.

Preferred Utility Framework Specification

Exemplary Assumptions

A session will be established by the security framework component. For a given request being processed within the IF, a session ID may be obtained by querying a security framework interface.

A session ID is an IF-wide unique identifier that will remain constant for the duration of a session. Security framework will provide an interface to validate the session ID.

Storage for the state and context managed by the session management will be accessed by using the interfaces provided by the back-end connectivity framework.

Access control for the state and context information managed by the session management will be expressed by using the interfaces supported by the security framework. The security framework will enforce the access control.

Exemplary Design Goals for Error, Audit, and Trace System and System Management.

An error is a common name for the status messages generated by an IF component to report its progress. These statuses may be informational, warnings, or errors.

An Audit message is generated at each entry and exit point of a component. Additional audit entries may be generated by a component to record significant progress in a component's activity.

Tracing provides information for monitoring a component for debugging purpose. Tracing is disabled during normal functioning of a component. It can be enabled or disabled administratively.

Single mechanism for producing audit events, reporting errors, and emitting trace events into system management facilities.

Highly efficient, has minimal impact to the performance of the application.

The viewer component provides a means to search and display events by type (Error, Trace, Audit) and/or customizable criteria (i.e. Account Number, Symbol, etc).

Distributed administration of trace levels.

Integrate errors from application components, network, and infrastructure into a common store to support information correlation.

Exemplary Design Goals for Session Management

Provide intra application state management.

Provide inter application context management.

Scenario Analysis

Figure 18:
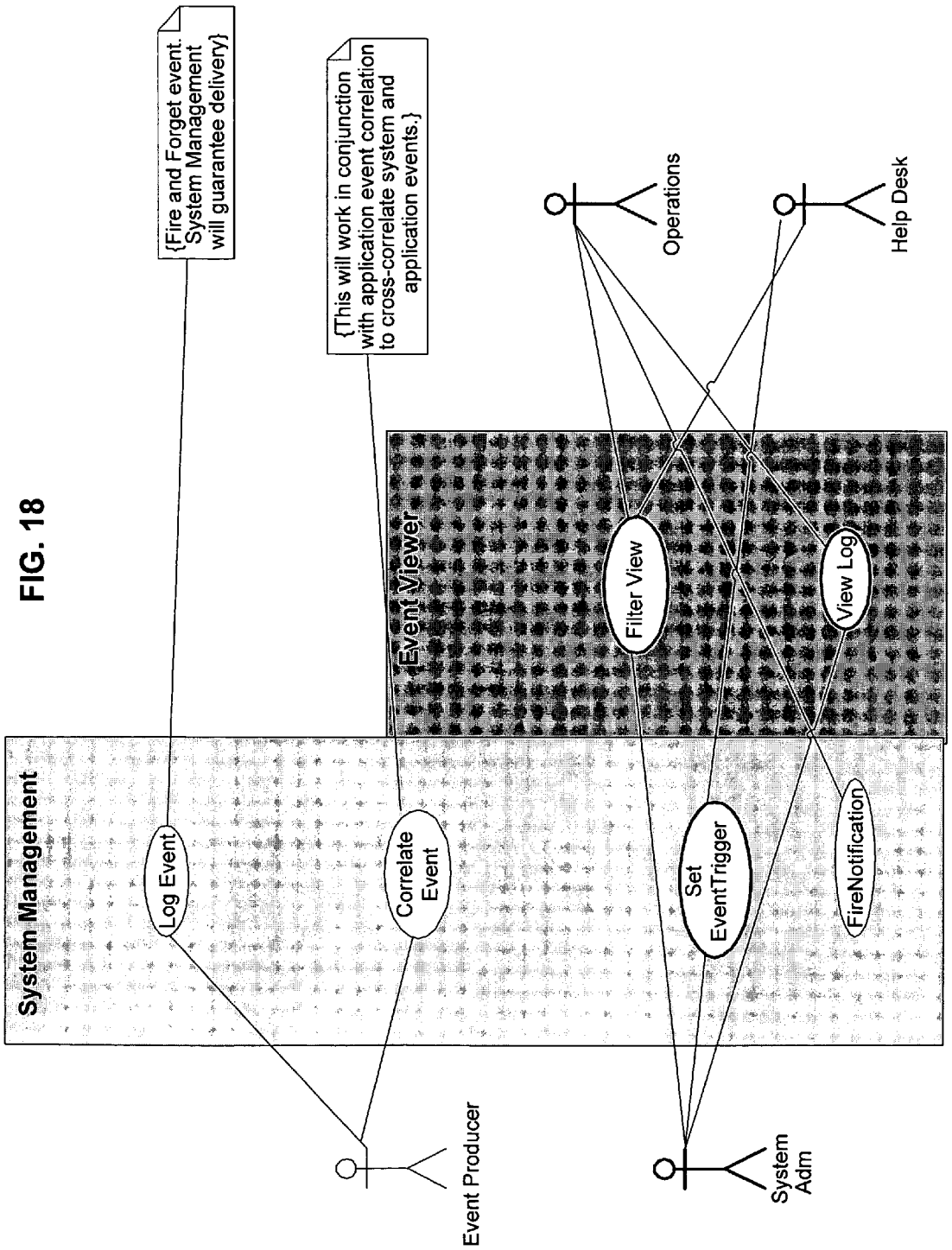
FIG. 18 depicts a preferred error, audit, and trace management system.

FIG. 18 depicts a preferred Error, Audit, and Trace Management system and its interaction with the system management facility. The scenario in FIG. 18 also depicts scenarios applicable to the session management system.

Figure 19:
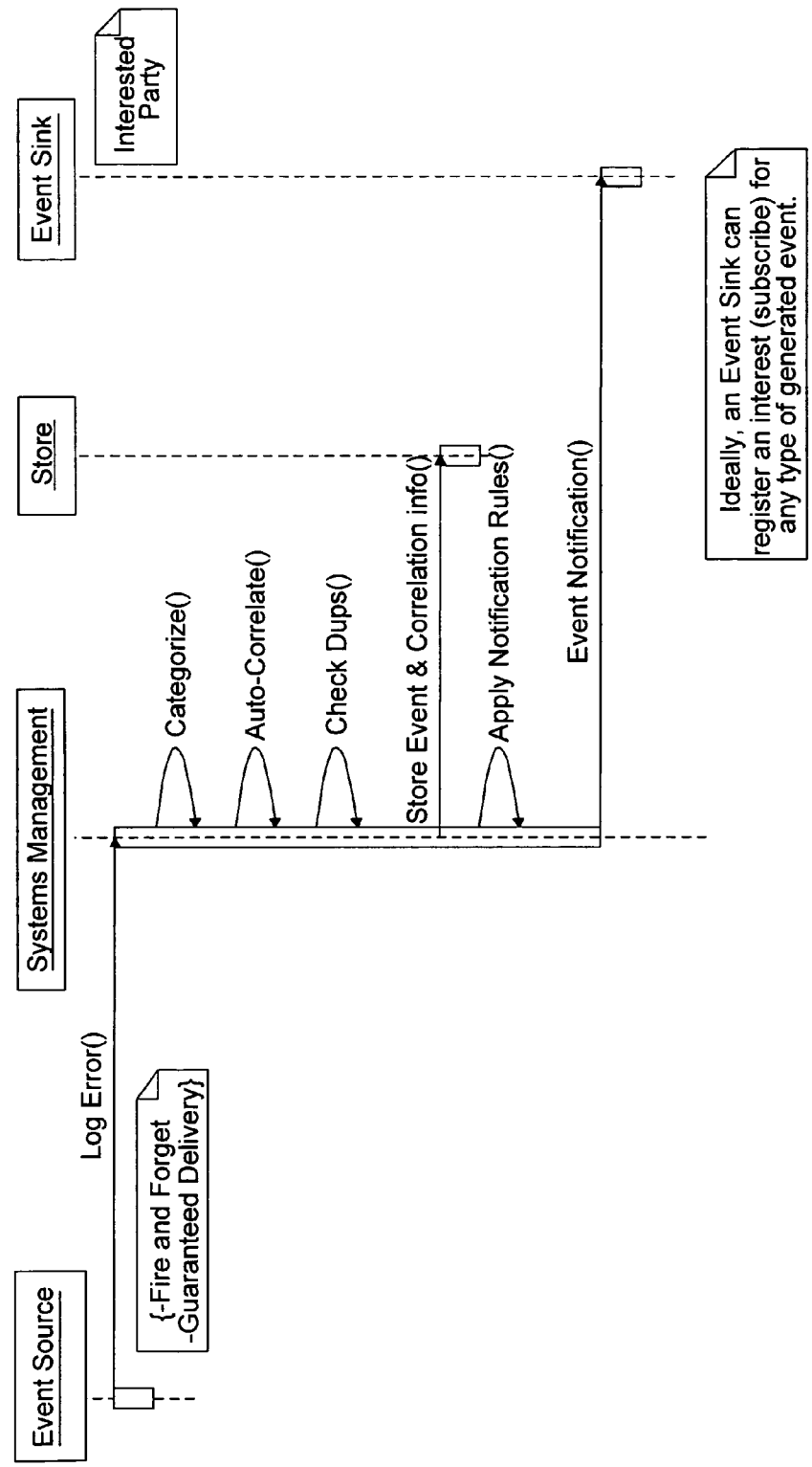
FIG. 19 depicts a preferred sequence diagram for a log system event.
Figure 20:
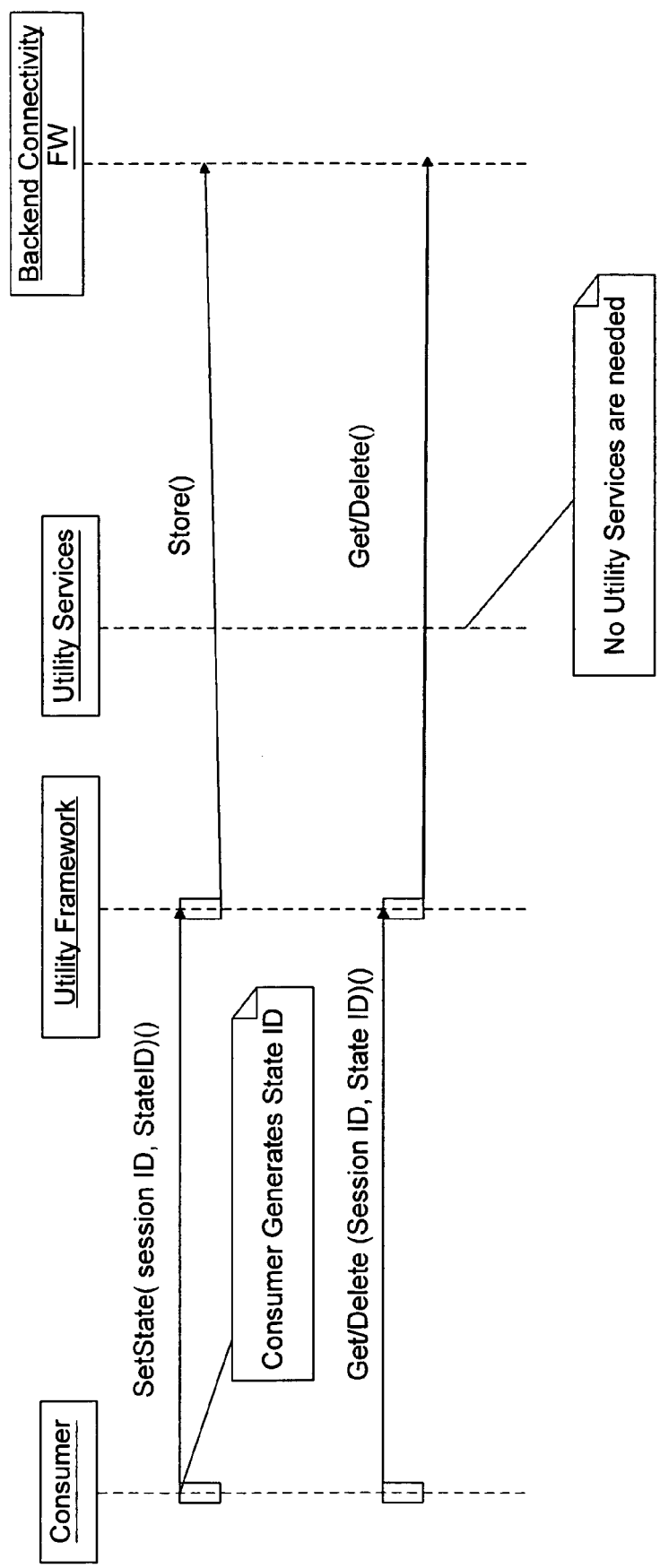
FIG. 20 illustrates exemplary interactions among preferred session management components.
Figure 21:
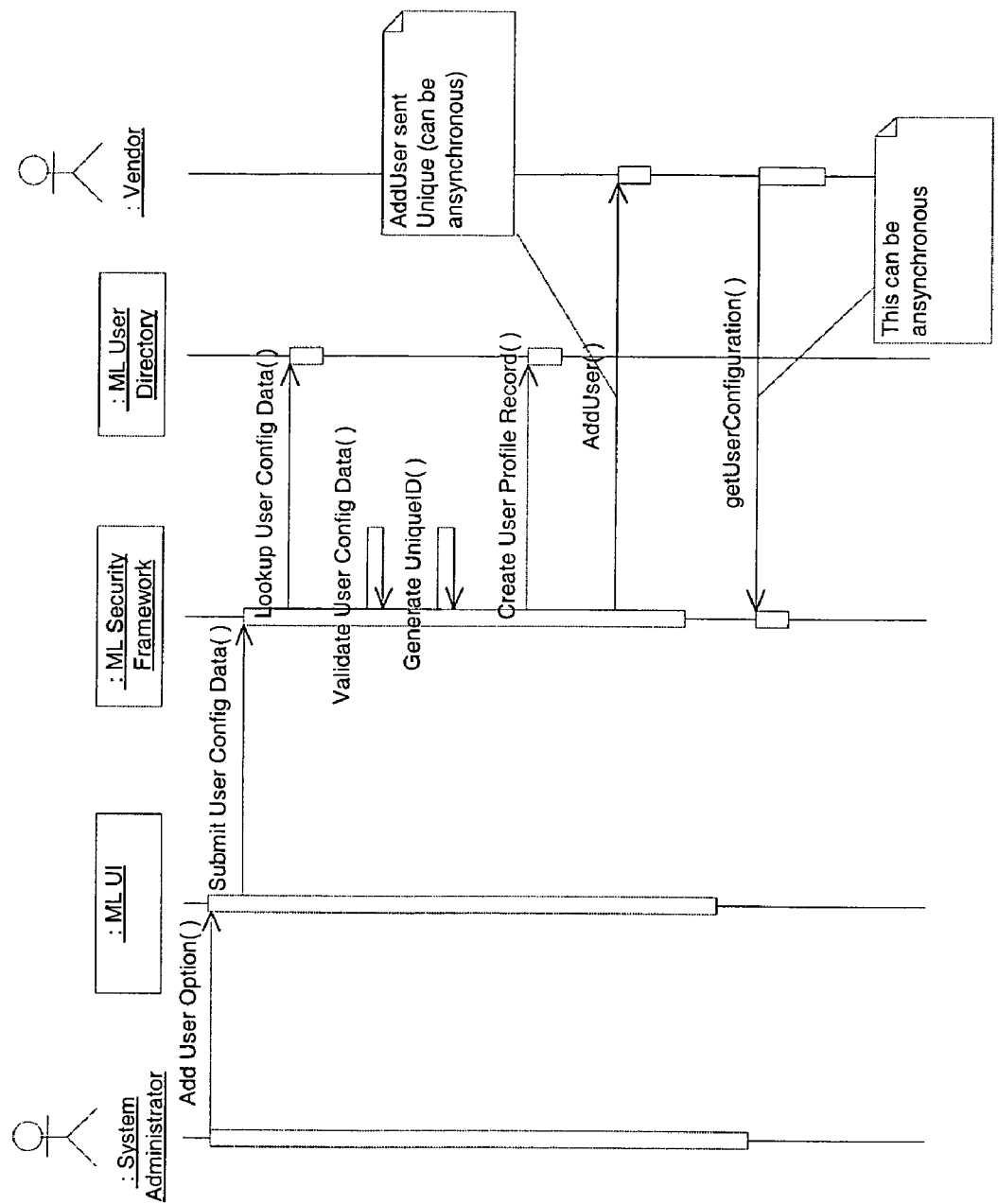
FIG. 21 depicts a preferred Add a User scenario.
Figure 22:
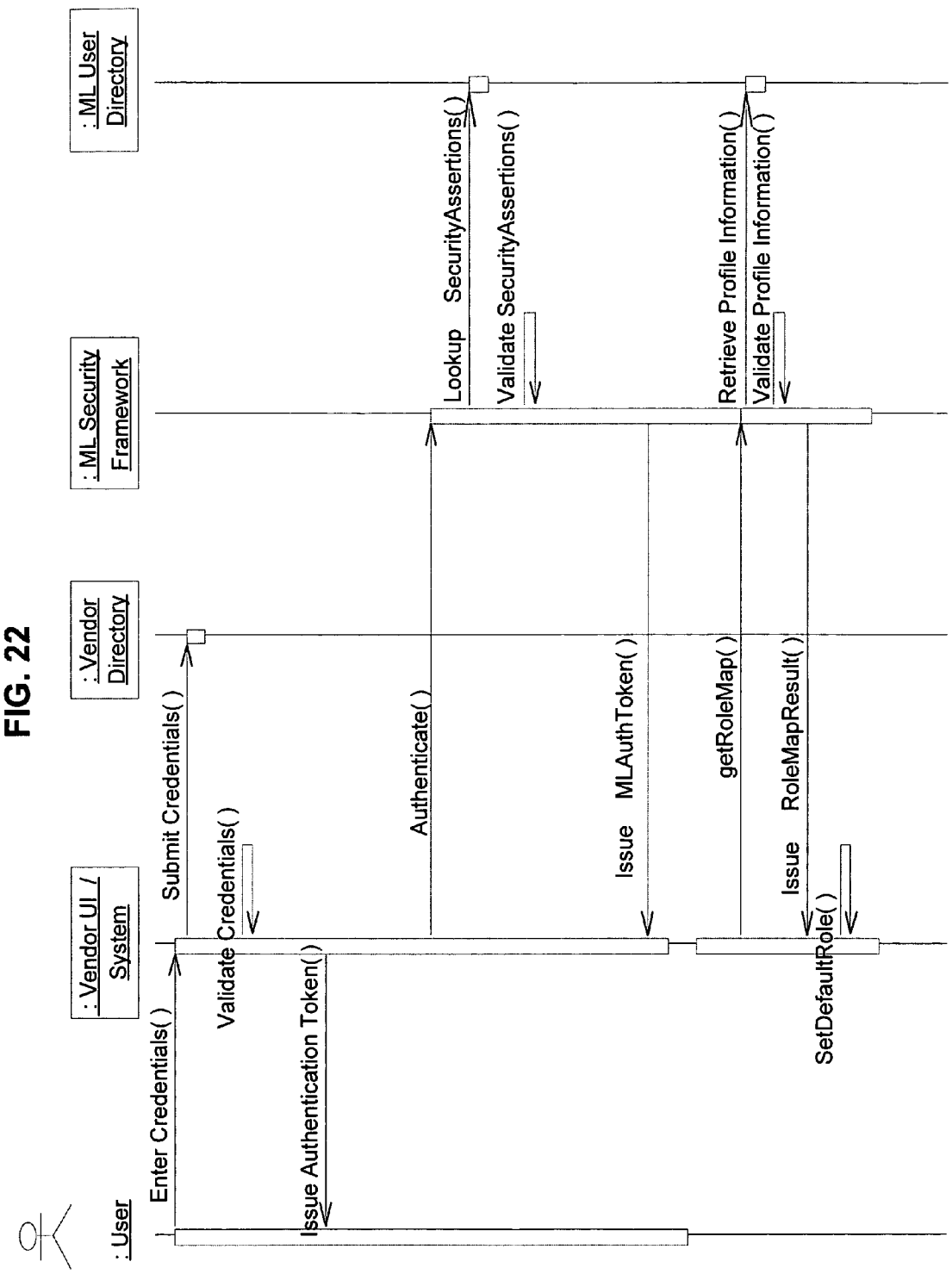
FIG. 22 depicts a preferred Login (Authentication) scenario.
Figure 23:
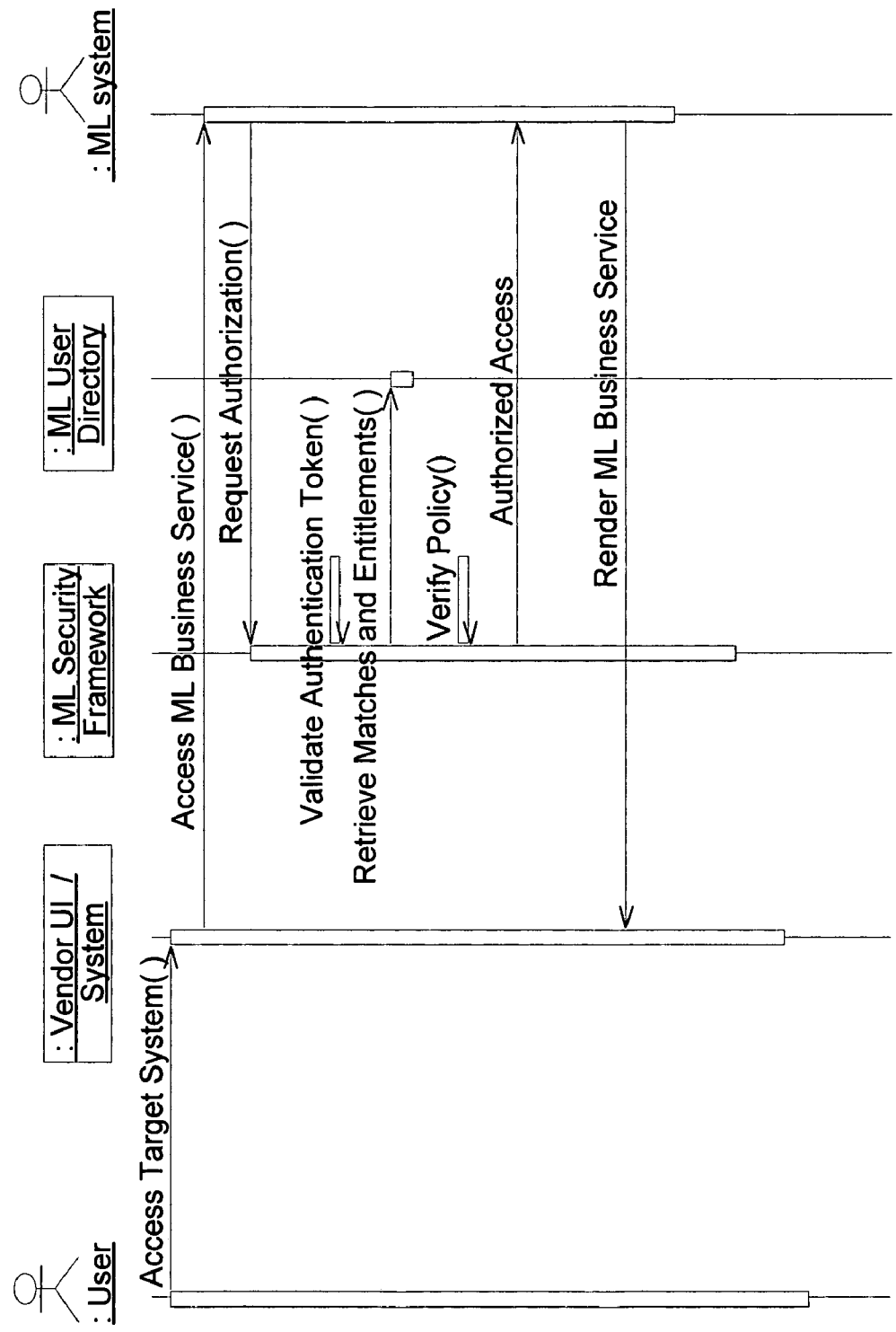
FIG. 23 depicts a preferred Authorization for Target Resource scenario.
Figure 24:
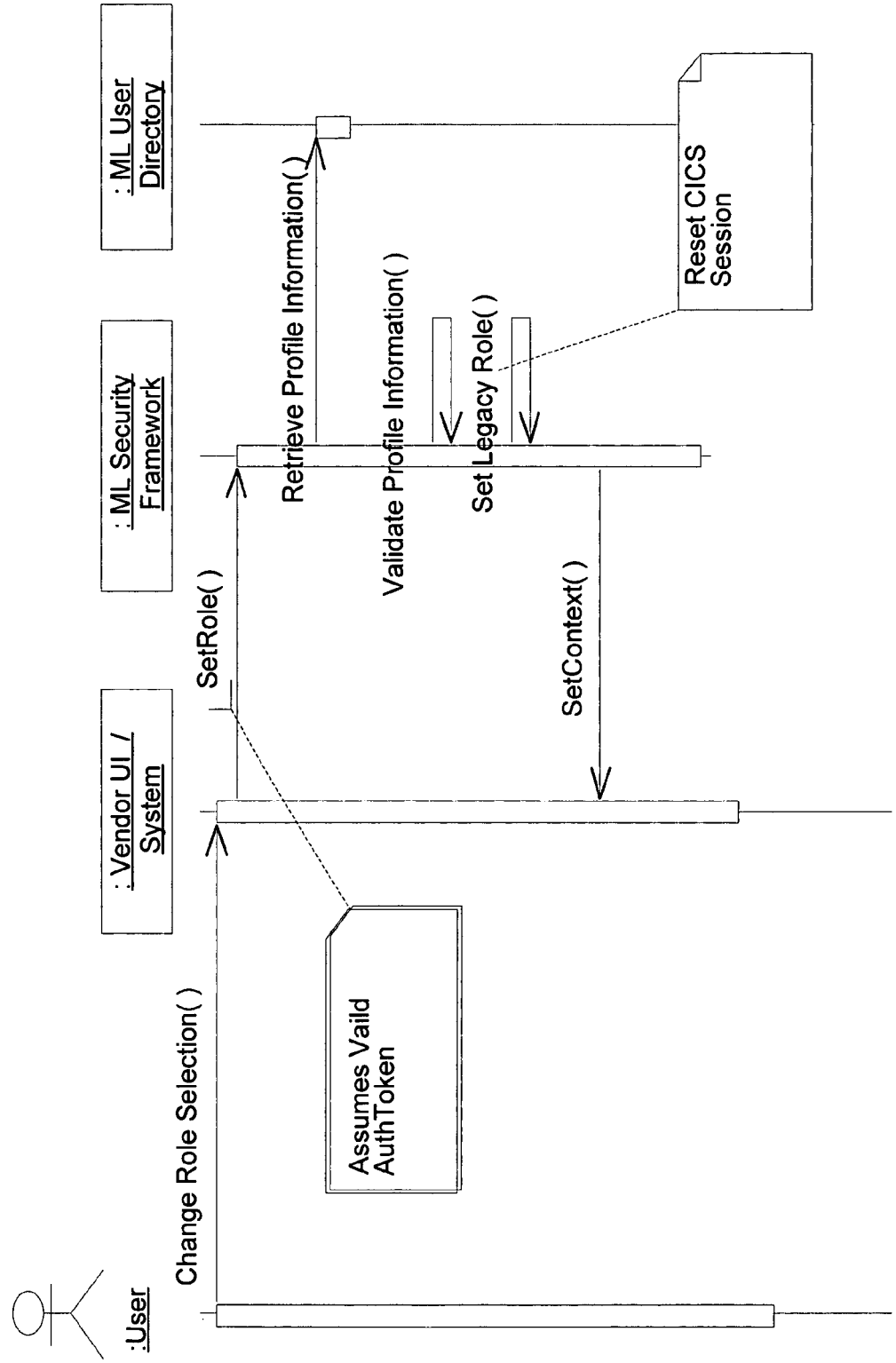
FIG. 24 depicts a preferred Change Role scenario.
Figure 25:
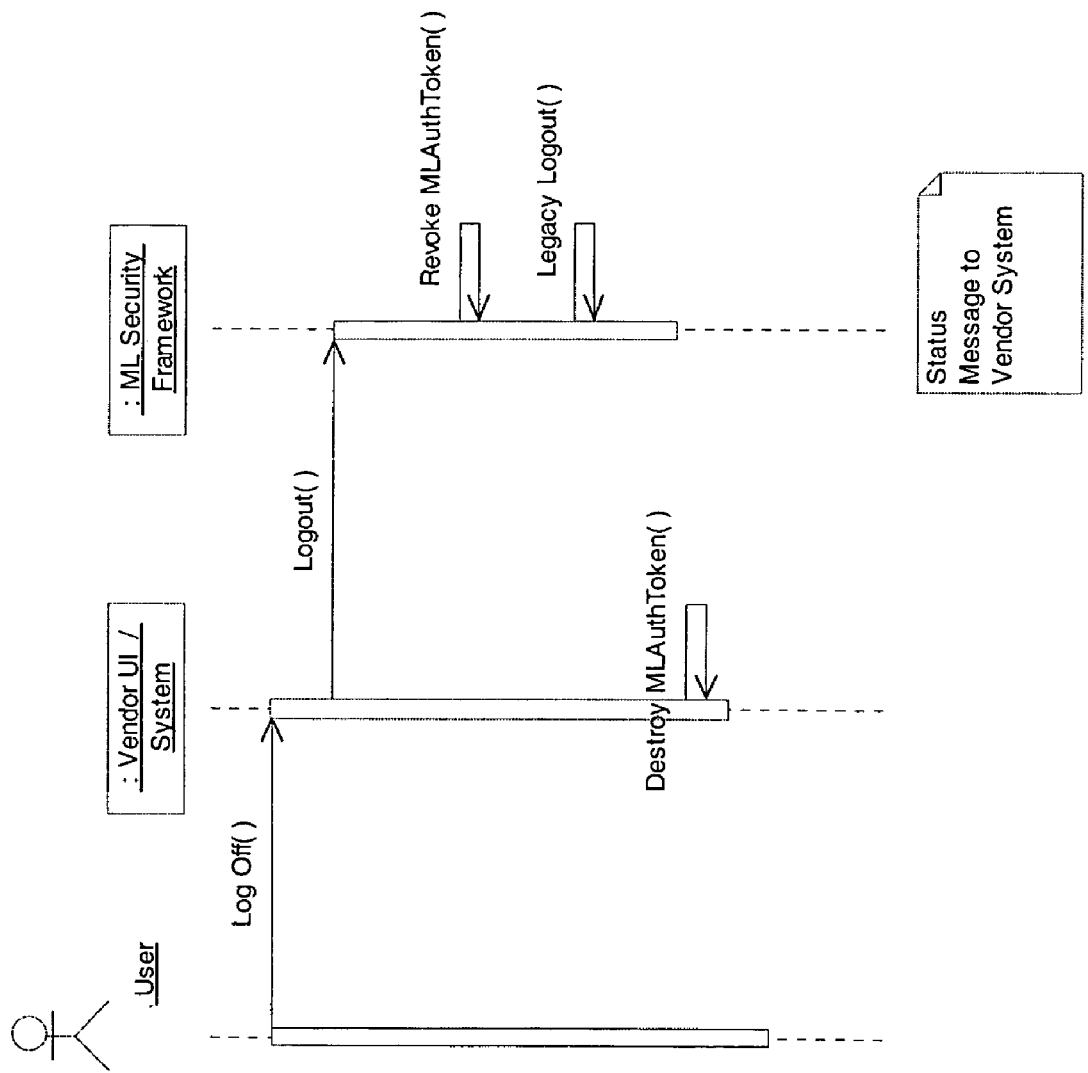
FIG. 25 depicts a preferred Logout scenario.

FIG. 19 depicts preferred interactions among components of an error, audit, and trace management system and system management facility components. FIG. 20 depicts preferred interactions among session management components.

Component Analysis

This section outlines a preferred Logical Interface Definition provided by a preferred Utility Framework. It should be noted that the interface is defined at the logical level and hence describes the prefered behavior to be offered, not the specific physical messages.

The following are the functional descriptions of the common information structures referred to in the interface definitions.

Common Information Structures:

Raw Message: A Raw Message is an error, audit, or trace message generated by the message source in its native format.

Message: A message is an error, audit, or trace message normalized by a message adapter. This standardization will decorate the message with information such as user ID, session ID, application ID, computer ID, and timestamp to make it usable for downstream processing.

Criterion: A criterion is a collection of attribute values present in a normalized message structure. A set of criteria may be used to filter, search or order messages.

Event Source Address: Event source address is an address to which an alert can be delivered. It may be an email address, a phone number, etc.

Rule: A rule is a Boolean expression of criteria followed by an action to be taken in case the expression was evaluated to be true.

Logical Interface Definition

TABLE 3

Error, Audit, Trace Interfaces

| Operation | Parameters | Return | Behavior |
|---|---|---|---|
| WriteError | Application ID, Error ID, Error Source, Error Description, Extra Information | None | Gathers parameters and additional information such as session ID, time stamp, computer ID and sends the error to the system management adapter. |
| WriteAuditInformation | ApplicationID, Activity ID, Audit Message | Success/Failure Status | Gathers parameters and additional information such as session ID, time stamp, computer ID and sends the error to the system management adapter. |
| WriteTrace | Application ID, Trace Information | None | Gathers parameters and additional information such as session ID, time stamp, computer ID and sends the error to the system management adapter. |

Adapter—An Adapter acquires raw errors from application components, infrastructure, and vendors and converts them to a standard format for use by a system management facility.

TABLE 4

System Management Interfaces

| Operation | Parameters | Return | Behavior |
|---|---|---|---|
| AddMessage | Raw Message | None | Acquires a raw message from a message source and formats it into a standard message format for use by system management. |

Rules Engine and Data Manager—. This component categorizes the messages and acts as a traffic cop between the messages and message stores.

TABLE 5

| Operation | Parameters | Return | Behavior |
|---|---|---|---|
| AddRule | Rule | Success/Failure Status | Adds message categorization and correlation rules. |
| PrioritizeRules | Rule ID, Priority | Success/Failure | Sets the relative rules priority |
| SetRuleProperties | Rule ID, Property | Success/Failure | Enable/Disable Rule |

TABLE 6

Alerting Mechanism

| Operation | Parameters | Return | Behavior |
|---|---|---|---|
| Subscribe | Criteria, Subscriber Address | Success/Failure | Creates a subscription for an alert for a message matching the given criteria. |
| Unsubscribe | Criteria, Subscriber Address | Success/Failure | Removes a subscription. |
| ListSubscriptions | [Criteria] | List of Subscriptions | Lists subscriptions matching the criteria. |

TABLE 7

Viewing System Management Messages

| Operation | Parameters | Return | Behavior |
|---|---|---|---|
| Search | Criteria | Messages | Searches and retrieves messages matching the criteria |
| Filter | Messages Criteria | Messages | Filters a set of messages based on the criteria |
| Consolidate | Messages Criteria | Messages | Consolidates messages based on a given criteria |

TABLE 8

Session Management Interfaces

| Operation | Parameters | Return | Behavior |
|---|---|---|---|
| SetState | Session ID, State ID, Value | Success/Failure | Saves the state information |
| GetState | SessionID, State ID | Value | Retrieves the state information |

Preferred Security Framework Specification

Exemplary Assumptions

The Security Framework is the specification by which all core applications are protected; and by which all requests to core applications are authenticated and authorized.

The Security Framework is a specification of all the interfaces for the distributed security services that wrap the core applications being used.

The Security Framework is the specification for all user data (defined separately from application data).

The Security Framework is the specification for Role-Based access control.

The Security Framework supports Role inheritance and delegation.

All calls made to the Security Framework will be logged based on defined corporate policies.

The Security Framework is the specification for issuance on session information.

Security Frame Work will adhere to the information security standards as defined by corporate policies.

Scenario Analysis

The scenarios that are relevant to a preferred Security Framework are listed below. The relevant sequence diagrams are depicted for the scenarios. For the use cases that follow the Login Use Case, the user is assumed to hold a valid authentication token.

Add User. Precondition: All approvals have been obtained. See FIG. 21.

Login (Authentication). Precondition: User has already been provisioned. See FIG. 22.

Authorization for Target Resource. Precondition: User has already logged-in and has AuthToken. See FIG. 23.

Change Role. See FIG. 24.

Logout. See FIG. 25.

Component Analysis

This section outlines a preferred Logical Interface Definition provided by Security Framework. Note that the interface is defined at the logical level and hence describes the behavior to be offered, but not the specific physical messages. Guidelines on how the physical messages can be constructed are given in the Implementation Considerations section.

Logical Interface Definition: the Security Framework component preferably realizes the following interfaces (note that a component could support multiple interfaces): Provisioning; IdentityManagement; EntitlementManagement; and AccessControl.

The Provisioning Interface has the GetUserConfiguration ( ) logical operation/method and the AccessControl interface has the rest of the following logical operations/methods:

TABLE 9

| Operation | Parameters | Return | Behavior |
|---|---|---|---|
| GetUserConfiguration | UniqueUserID | UserConfigurationData | Returns configuration details for the user so that the Vendor can provision the user on their side. Must be an authenticated bind to Security Framework |
| Authenticate | Security Assertions [Must include UniqueUserId plus a trusted token that verifies that user has been authenticated on the Vendor side] | MLAuthToken | Authenticates the user to the realm based on the user's successful authentication to the Vendor security realm |
| GetRoleMap | UniqueUserId- [Unique Id for user as recognized within systems-<string>] PlatformName [Platform like TGA, MLD, BOl etc so that the relevant roles for that platform can be returned] | List of roles user belongs to | Returns list of roles that the User can play within the realm. Vendor needs to provide UI for user to switch roles. Must be an authenticated bind to Security Framework |
| SetRole | UniqueUserId- [Unique Id for user as recognized within systems-<string>] RoleName [Identifier for the role that user wants to play] | Context Info for that role | Returns associated context/entitlement info for that role. Must be an authenticated bind to Security Framework |
| Logout | UniqueUserId- [Unique Id for user as recognized within systems-<string>] | Status message, Revoke AuthToken. | Resets authentication tokens and returns status message. Must be an authenticated bind to Security Framework |

TABLE 10

| | Vendor Implemented Methods | | |
|---|---|---|---|
| Operation | Parameters | Return | Behavior |
| AddUser | UniqueUserID | Acknowledgement | Accepts a request for provisioning a new user and returns an acknowledgement |
| SetContext | ContextInfo | Acknowledgement | Updates context info for user for current role |

Implementation Considerations

This section describes some of the considerations that preferably are taken into account while implementing the service.

Protocol. General Interface Syntax:

Interface: <Verb><AppCategory>[Optional: SubCategory] [Optional:Qualifier]

Verb: Add, Update, Delete, Get, Authenticate, Authorize

AppCategories: User, Role, Identity

SubCategory: Map

Qualifier

Example: AddUser, GetRoleMap, AuthenticateUser etc.

Service Provider Constraints.

Functional Constraints. The Security Framework preferably provides the following functionality and supports the following scenarios:

(A) The concept of multiple roles and allowing users to switch roles.

(B) The concept of identity mapping so a user can be identified across multiple systems.

(C) Seamless authentication of a user coming from a trusted vendor's security realm.

(D) Third Parties should have access to accounts based on permissions set by the account owner.

(E) Delegation of access permissions should be supported.

(F) An access control mechanism is provided to check an individuals' entitlements to determine whether the permission to access a particular service has been turned on.

(G) Permissions will be granular to control access to a service, interface, or method.

(H) Access Control prevents access to actions in a service before that action is invoked (i.e., the front-end prevents a client from placing an Options trade if the service has not been turned on because the documentation has not been received).

(I) Centralized security management is provided to ensure consistency across all web services and with the Back-end.

(J) Single sign-on to all business services including online channels.

(K) Global logout and site specific logout capabilities.

(L) Interfaces for administration and reporting.

(M) Establish, validate, and cancel a session token associated with an authenticated session.

(N) Store and expose user entitlements and user profile information.

The Vendor is expected to provide an interface to support provisioning of new users. The interface should implement the method AddUser( . . . ). The vendor also is expected to provide an interface to support updating user context for users. The interface should implement the method SetContext( . . . ).

Preferred Business Integration Framework Specification

Exemplary Design Goals for Business Integration Framework

To provide clean application abstractions.

Disallow coupling between UI/Presentation zone and Fulfillment/Host zone.

Identify common services that all applications need (e.g., logging).

Determine application types and corresponding characteristics.

Define "Application model" which includes data model, design model, configuration model, deployment model, etc.

Exemplary Assumptions

BIF abstracts common behavior among application types, identified by the use cases.

BIF exposes common services like utility framework services, backend connectivity framework services, etc., to the business services.

BIF enables adding a new application of a known application type without any changes to the common abstractions.

BIF assumes that the Integration Framework provides for central access to session data and shared access to central data. The integrity of the session data must be protected at all times.

By the time a request comes to BIF, security has fully authenticated the request. In one embodiment, authorization is done as part of an SEC filter before it reaches the BIF.

Scenario Analysis at BIF and Peer Level

Figure 26:
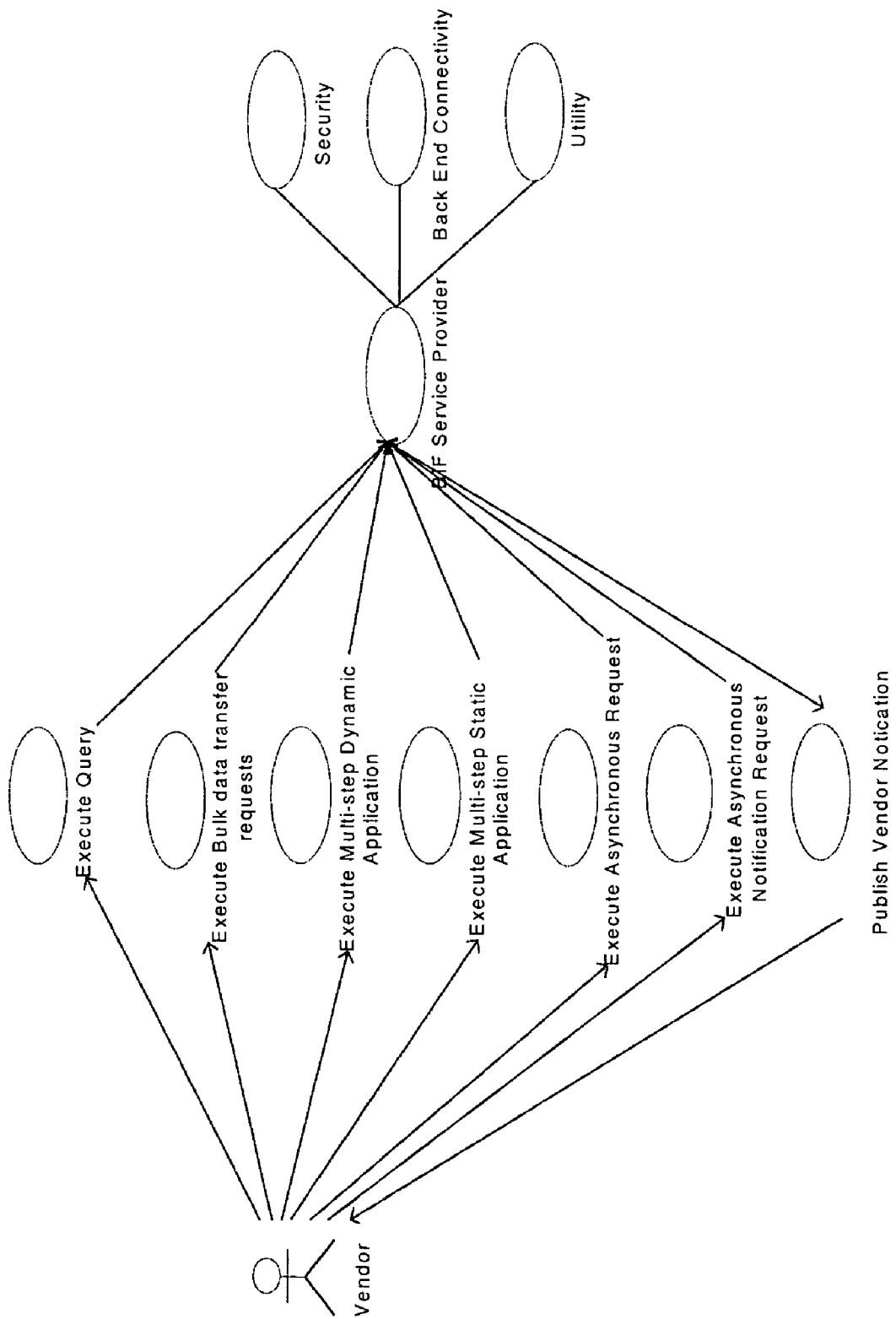
FIG. 26 illustrates preferred interaction between a Business Integration Framework (BIF) and the Integration Framework, from a BIF perspective.

FIG. 26 depicts a preferred Business Integration Framework and its interaction with the Integration Framework from a BIF perspective.

Figure 27:
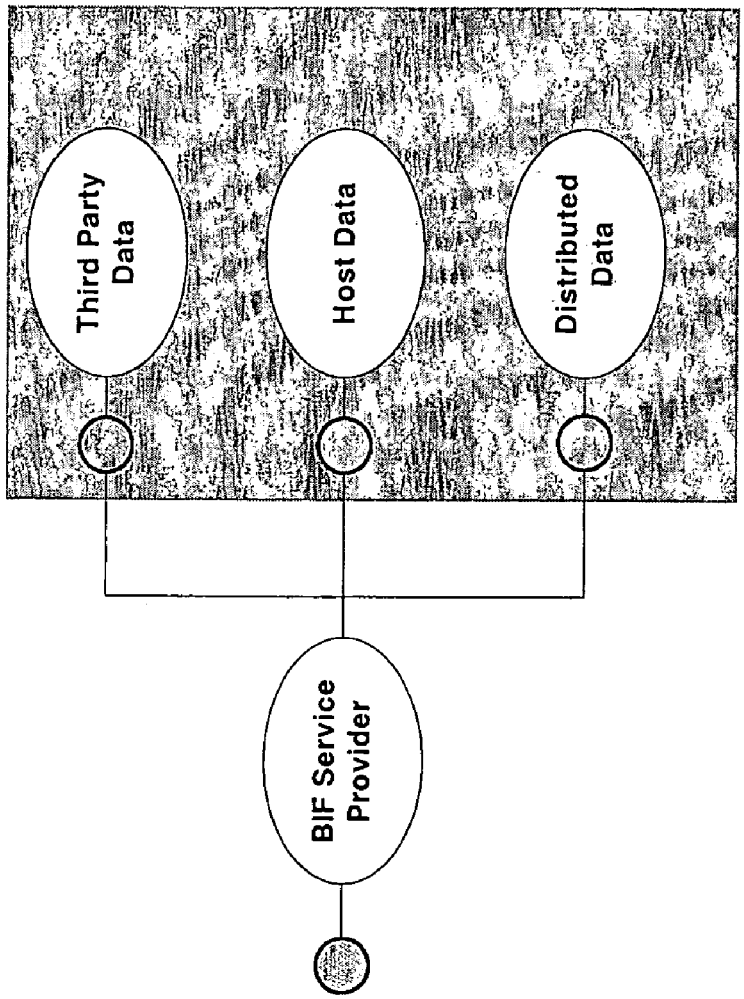
FIG. 27 depicts a preferred structural model of the BIF using Back End Connectivity.

FIG. 27 shows a preferred structural model of BIF usage of Back End Connectivity.

Figure 28:
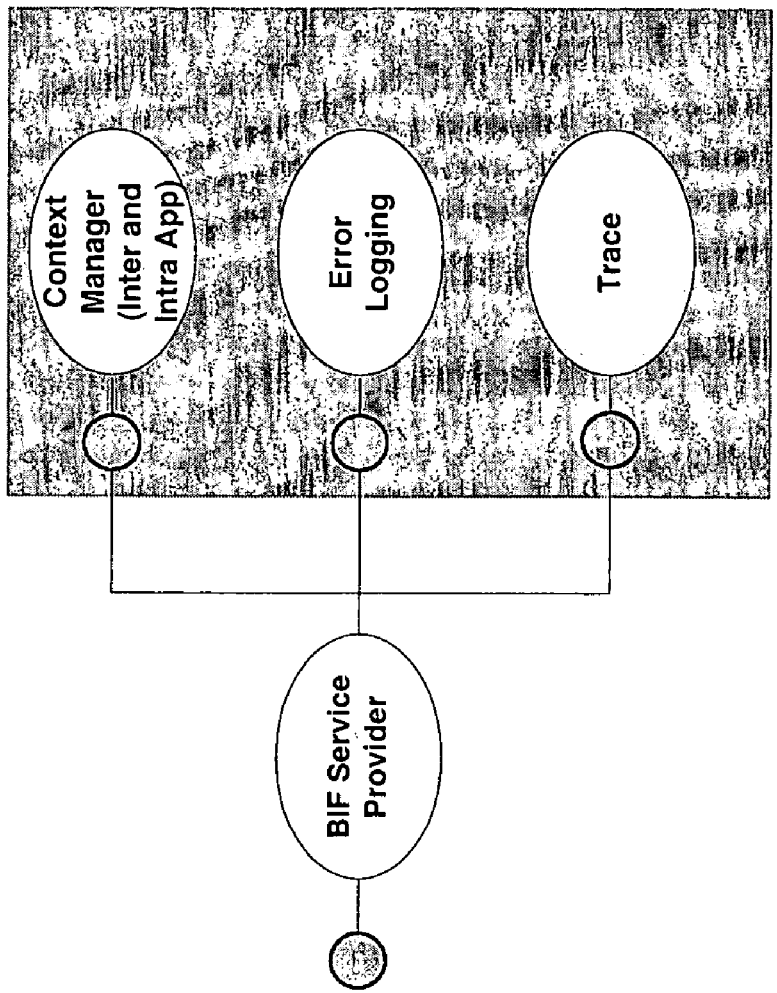
FIG. 28 depicts a preferred structural model of the BIF using the Utility Framework.

A preferred structural relationship of BIF usage of the Utility Framework components is depicted in FIG. 28.

Exemplary Sequence Diagrams: As detailed in Table 11 below, a number of current applications have been analyzed and documented as sequence diagrams.

TABLE 11

| Application Type | Application | Transaction |
| --- | --- | --- |
| Execute Synchronous Request | Funds Transfer | Get Valid Accounts |
| Execute Synchronous Request | Funds Transfer | Get Bank Relationships |
| Execute Synchronous Request | Funds Transfer | Get Funds Transfer Options and Perform Funds Transfer |
| Dynamic Multi-Step | CAMU | Validate and Lock Account |
| Multi-Step Static | Mutual Funds Profile | Get Profile |
| Execute Synchronous Request | Online Statements | Get Statement List |
| Bulk Data Transfer Request | Online Statements | Get Statement |
| Execute Synchronous Request | List of Scans | Get List of Lists |
| Execute Synchronous Request | List of Scans | Get Results |
| Execute Synchronous Request | List of Scans | Save Results |
| Execute Synchronous Request | B2B Webservices | Submit Trade |
| Execute Synchronous Request | Online Deal Management | Search for client |
| Execute Synchronous Request | Online Deal Management | Select Client |
| Execute Synchronous Request | Online Deal Management | Submit Indication of Interest |
| Execute Synchronous Request | Rubicon | Subscribe |
| Asynchronous Notification Request | Rubicon | Set up alert |

TABLE 11-continued

| Application Type | Application | Transaction |
| --- | --- | --- |
| Publish Vendor Notification | Rubicon | Alert Triggered |
| Execute Synchronous Request | PCOE | GetCheckInfo |
| Execute Synchronous Request | PCOE | ValidateCheckOrder |
| Execute Synchronous Request | PCOE | SubmitCheckOrder |
| Execute Synchronous Request | Managed Assets | Verify Acct On MainFrame |
| Execute Synchronous Request | Managed Assets | Add Account To Client Acct Collection |
| Multistep | MLX Allocation | Block Allocation |
| Multistep/Execute Synchronous Request | Benefits Online | Multiple |

FIGS. 29-45 depict exemplary sequence diagrams for applications and transactions detailed in Table 11.

Figure 29:
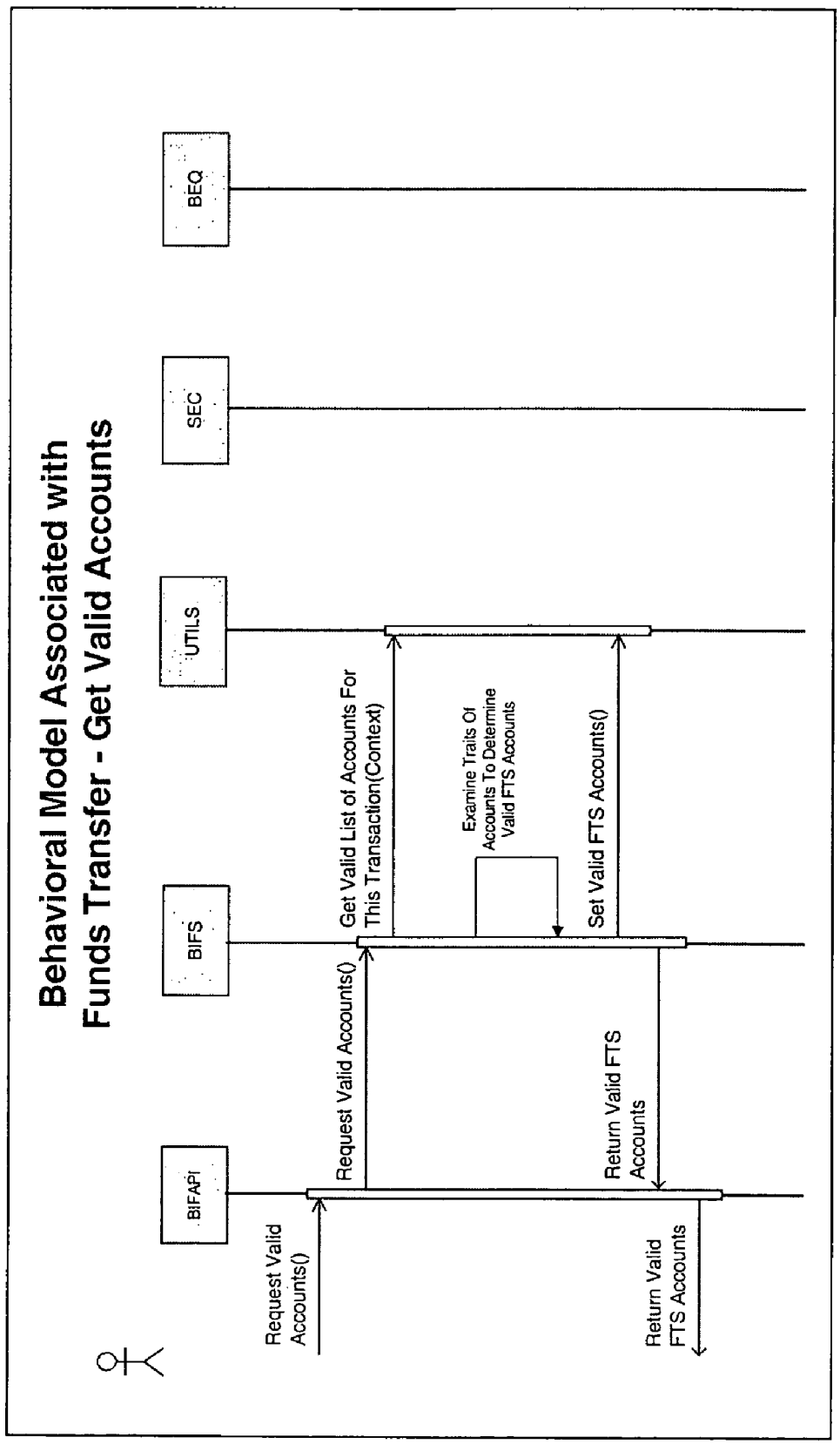
FIG. 29 depicts a preferred behavioral model associated with a Funds Transfer application performing a Get Valid Accounts transaction.

FIG. 29 depicts a behavioral model associated with a Funds Transfer application performing a Get Valid Accounts transaction.

Figure 30:
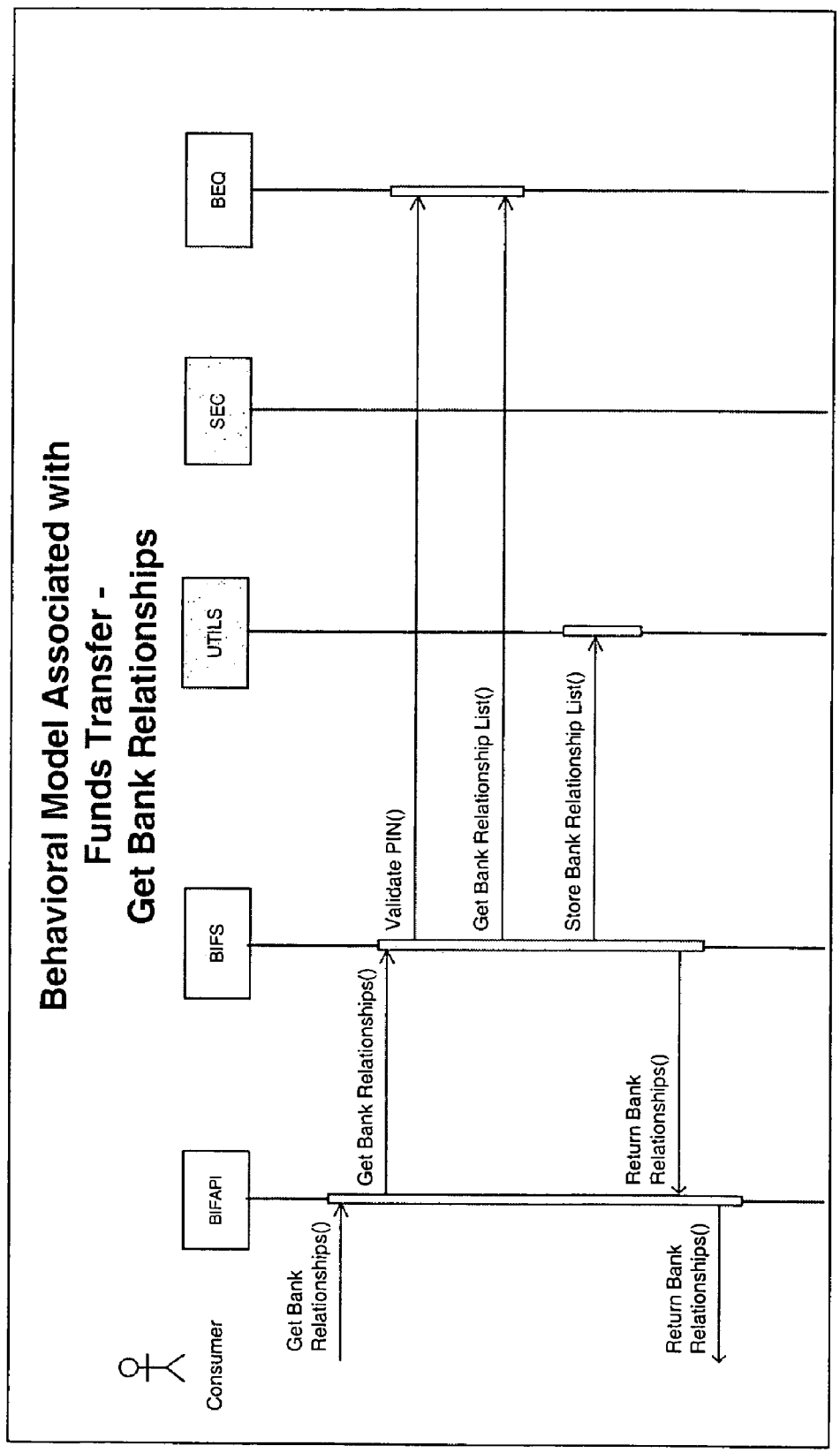
FIG. 30 depicts a preferred behavioral model associated with a Funds Transfer application performing a Get Bank Relationships transaction.

FIG. 30 depicts a behavioral model associated with a Funds Transfer application performing a Get Bank Relationships transaction.

Figure 31:
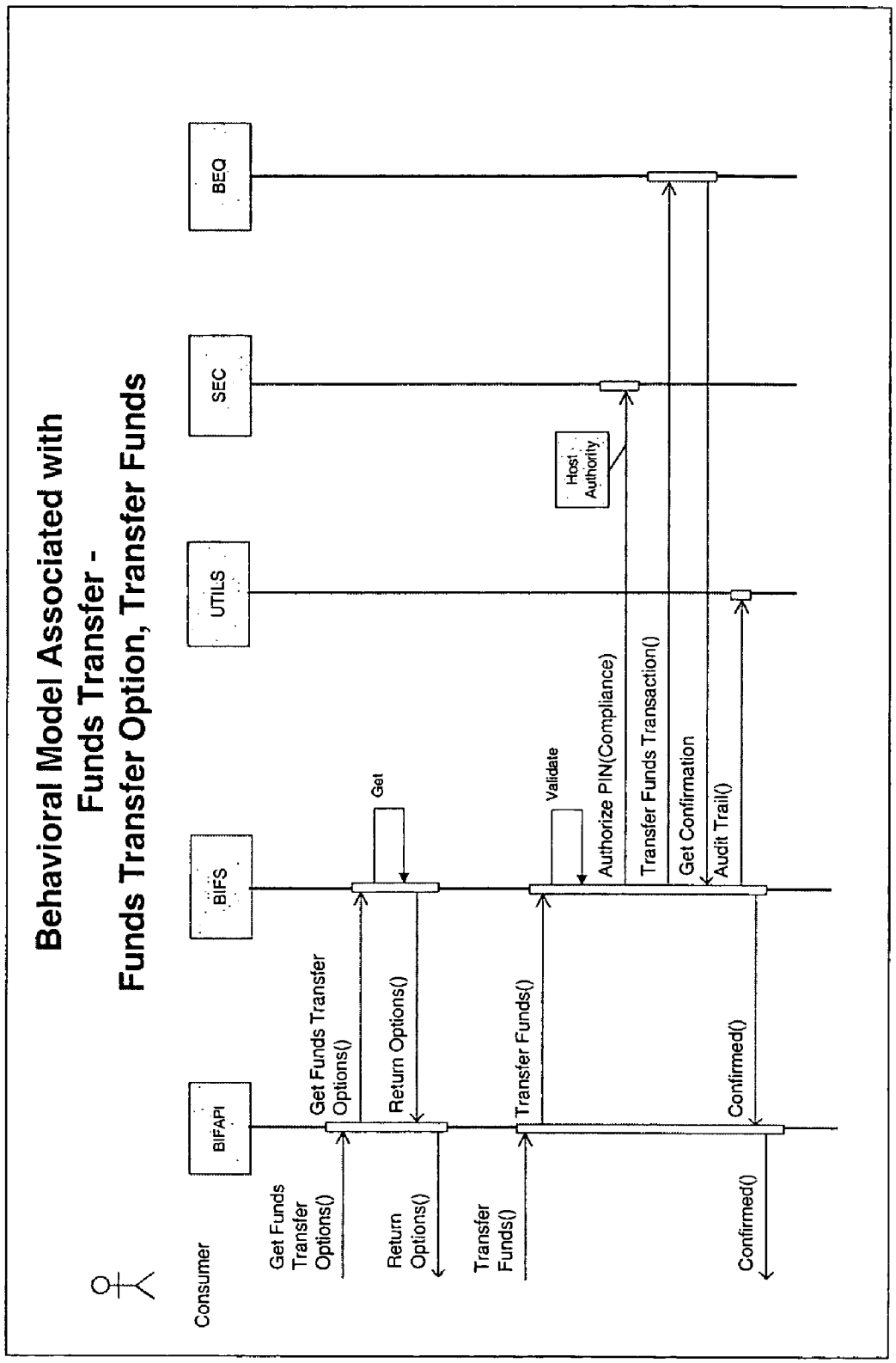
FIG. 31 depicts a preferred behavioral model associated with a Funds Transfer application performing a Get Funds Transfer Options and Perform Funds Transfer transaction.

FIG. 31 depicts a behavioral model associated with a Funds Transfer application performing a Get Funds Transfer Options and Perform Funds Transfer transaction.

Figure 32:
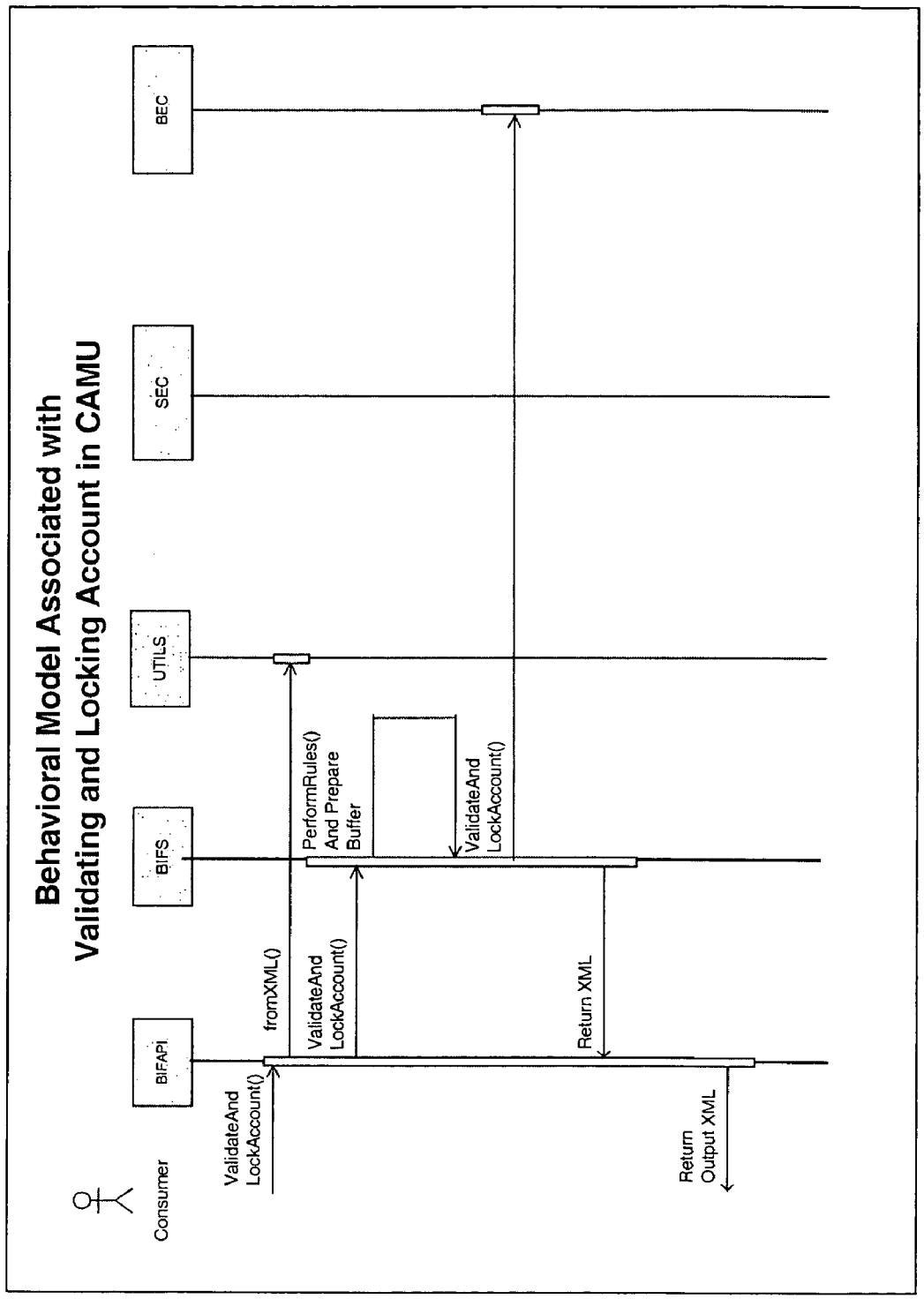
FIG. 32 depicts a preferred behavioral model associated with a CAMU application performing a Validate and Lock Account transaction.

FIG. 32 depicts a behavioral model associated with a CAMU application performing a Validate and Lock Account transaction.

Figure 33:
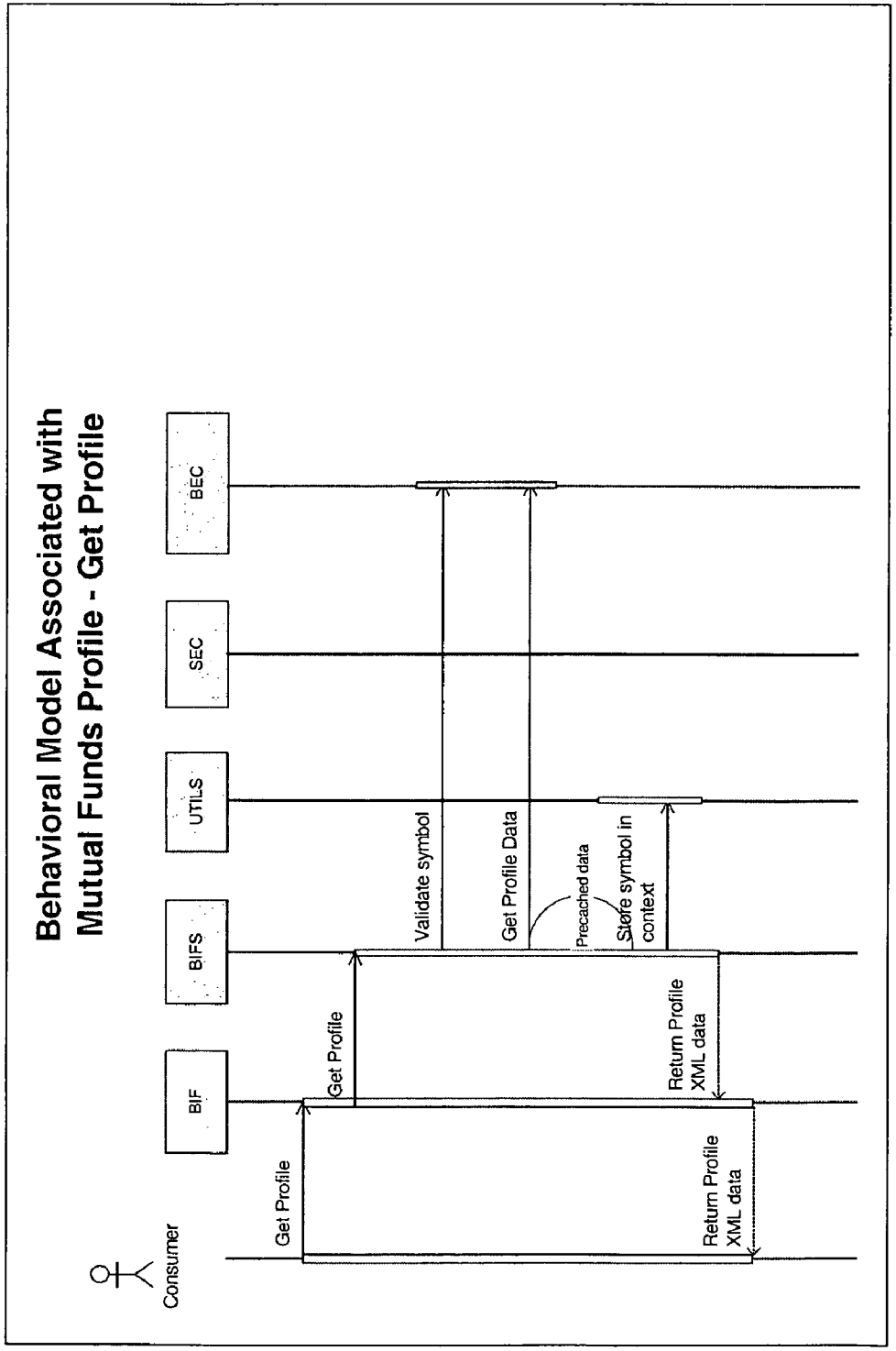
FIG. 33 depicts a preferred behavioral model associated with a Mutual Funds application performing a Get Profile transaction.

FIG. 33 depicts a behavioral model associated with a Mutual Funds Profile application performing a Get Profile transaction.

Figure 34:
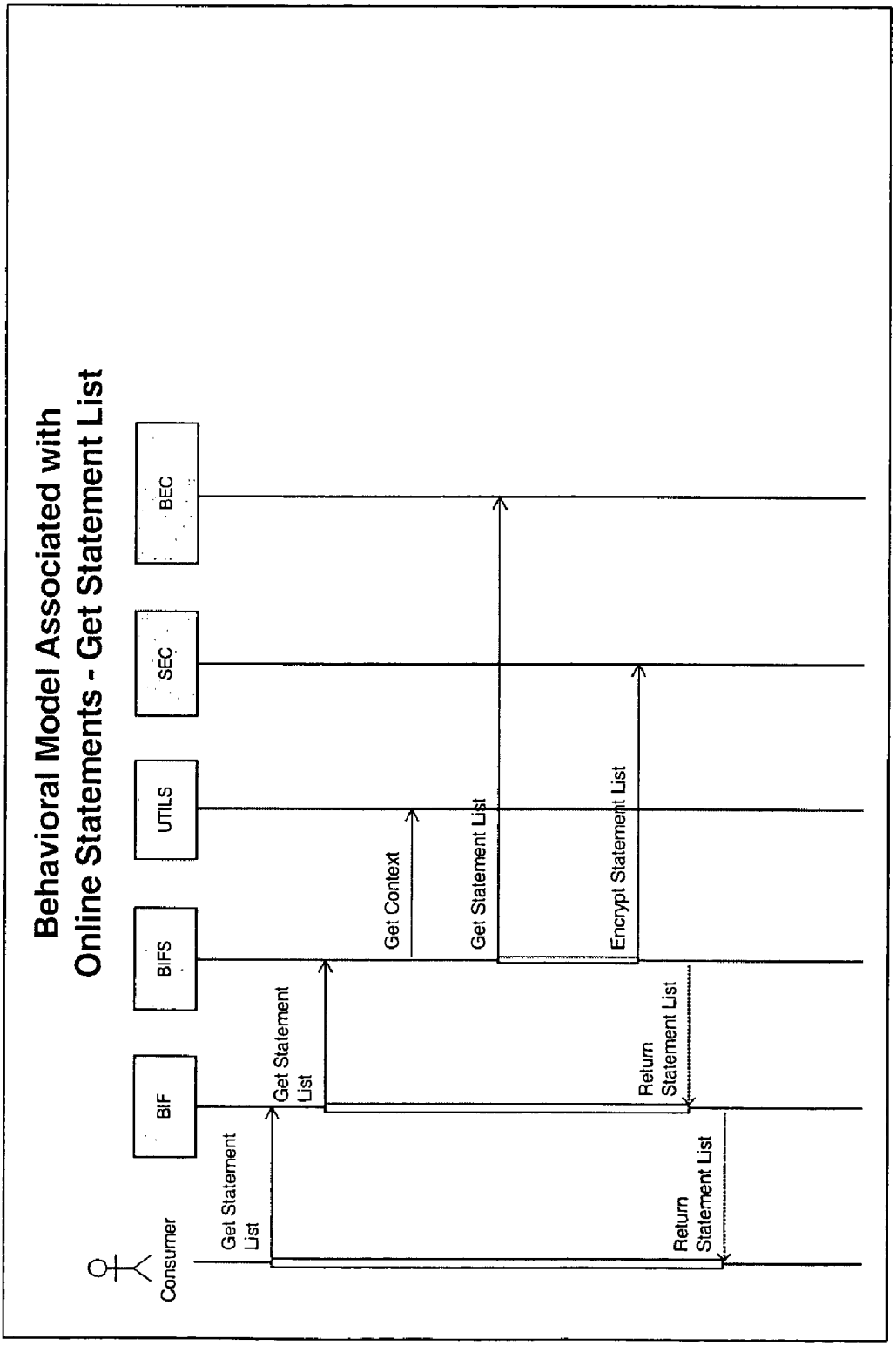
FIG. 34 depicts a preferred behavioral model associated with an Online Statements application performing a Get Statement List transaction.

FIG. 34 depicts a behavioral model associated with an Online Statements application performing a Get Statement List transaction.

Figure 35:
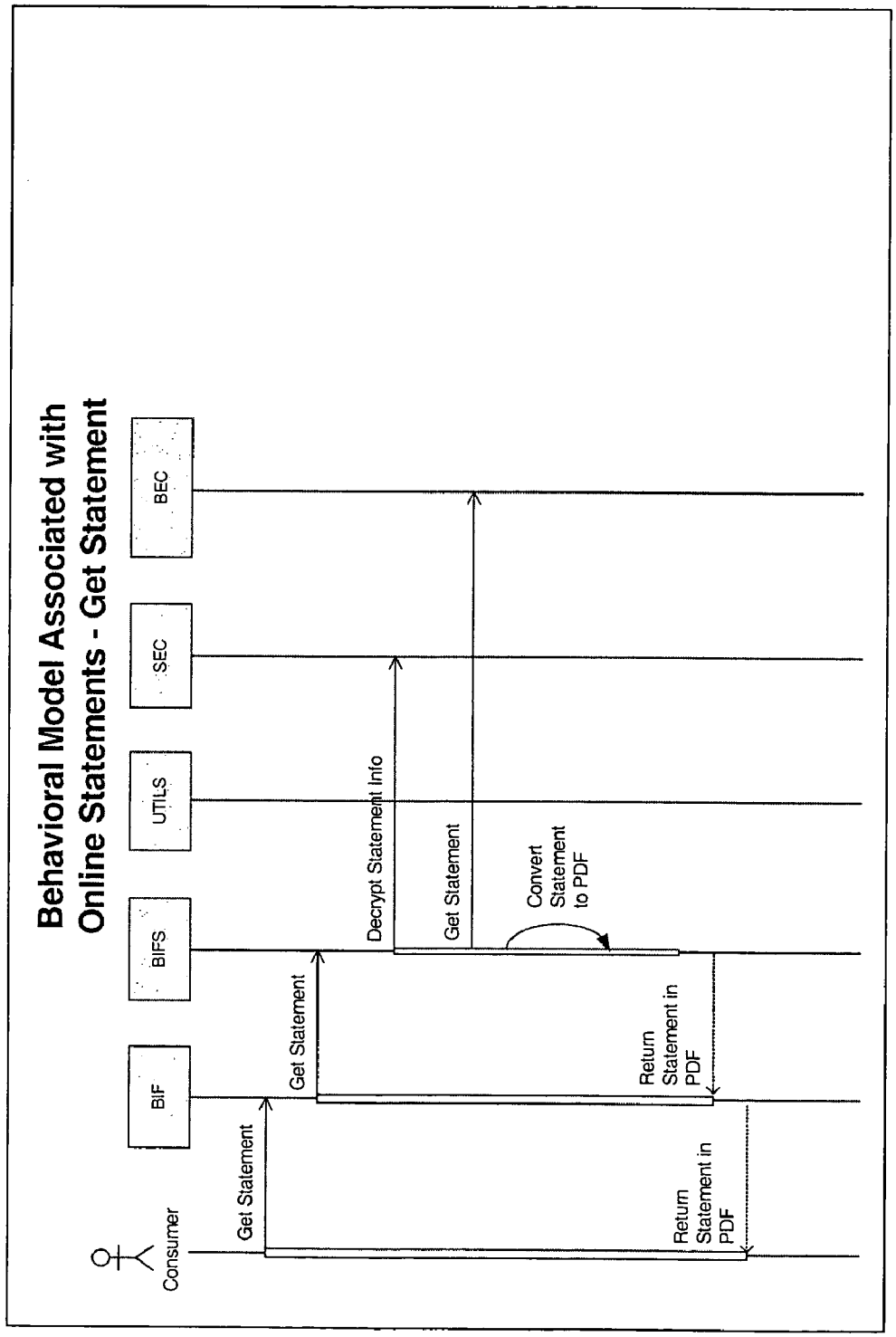
FIG. 35 depicts a preferred behavioral model associated with an Online Statements application performing a Get Statements transaction.

FIG. 35 depicts a behavioral model associated with an Online Statements application performing a Get Statement transaction.

Figure 36:
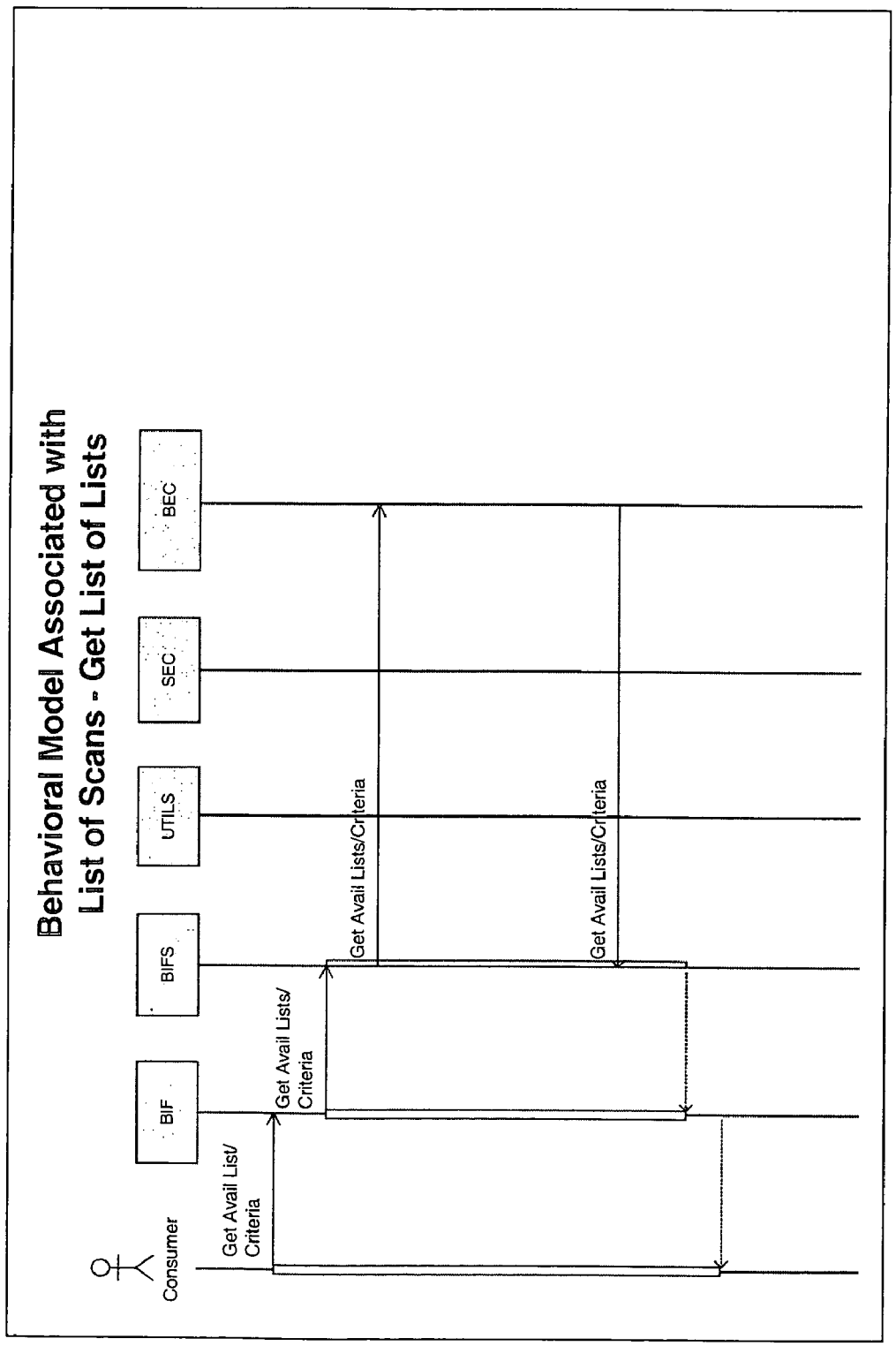
FIG. 36 depicts a preferred behavioral model associated with a List of Scans application performing a Get List of Lists transaction.

FIG. 36 depicts a behavioral model associated with a List of Scans application performing a Get List of Lists transaction.

Figure 37:
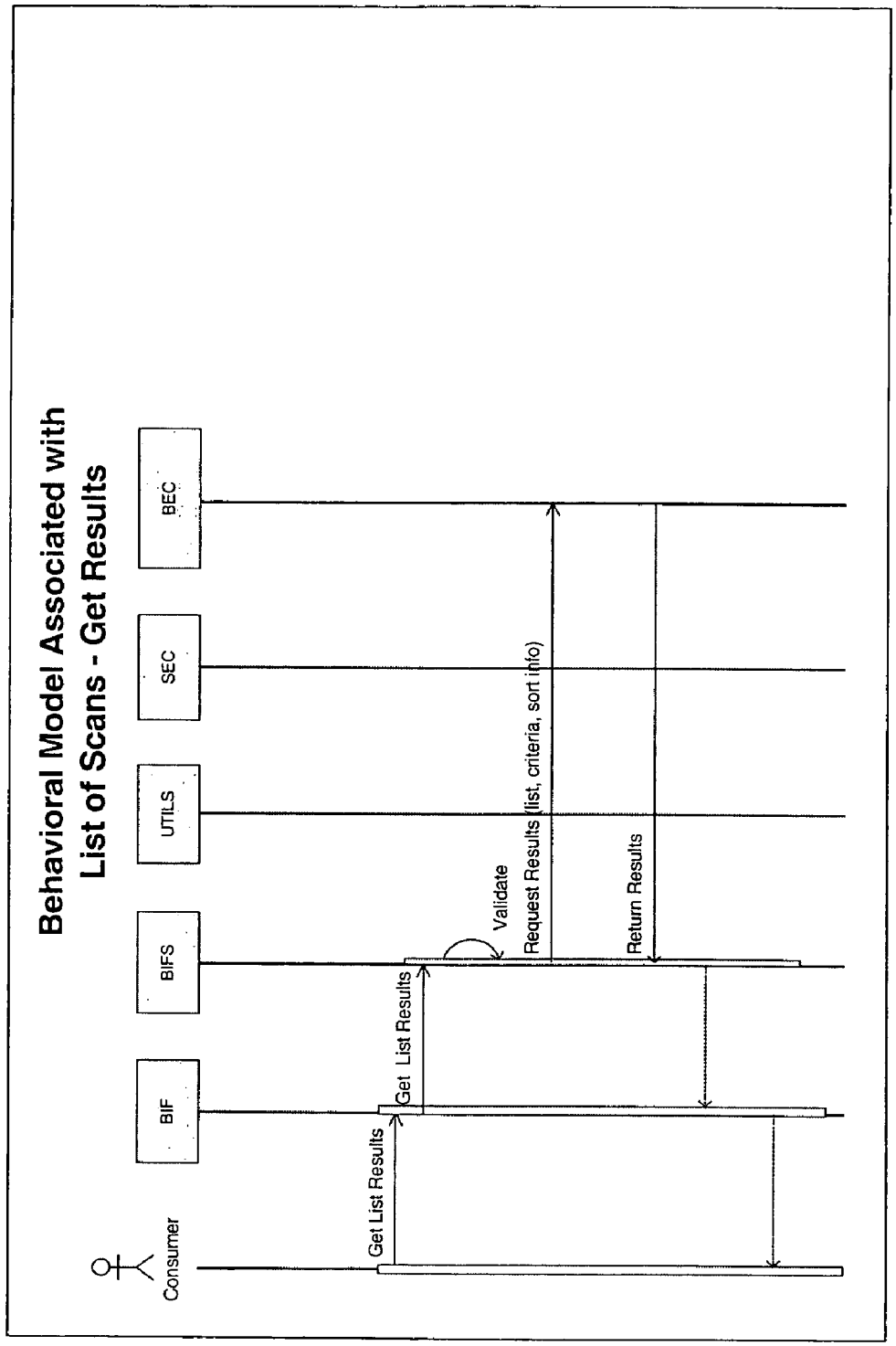
FIG. 37 depicts a preferred behavioral model associated with a List of Scans application performing a Get Results transaction.

FIG. 37 depicts a behavioral model associated with a List of Scans application performing a Get Results transaction.

Figure 38:
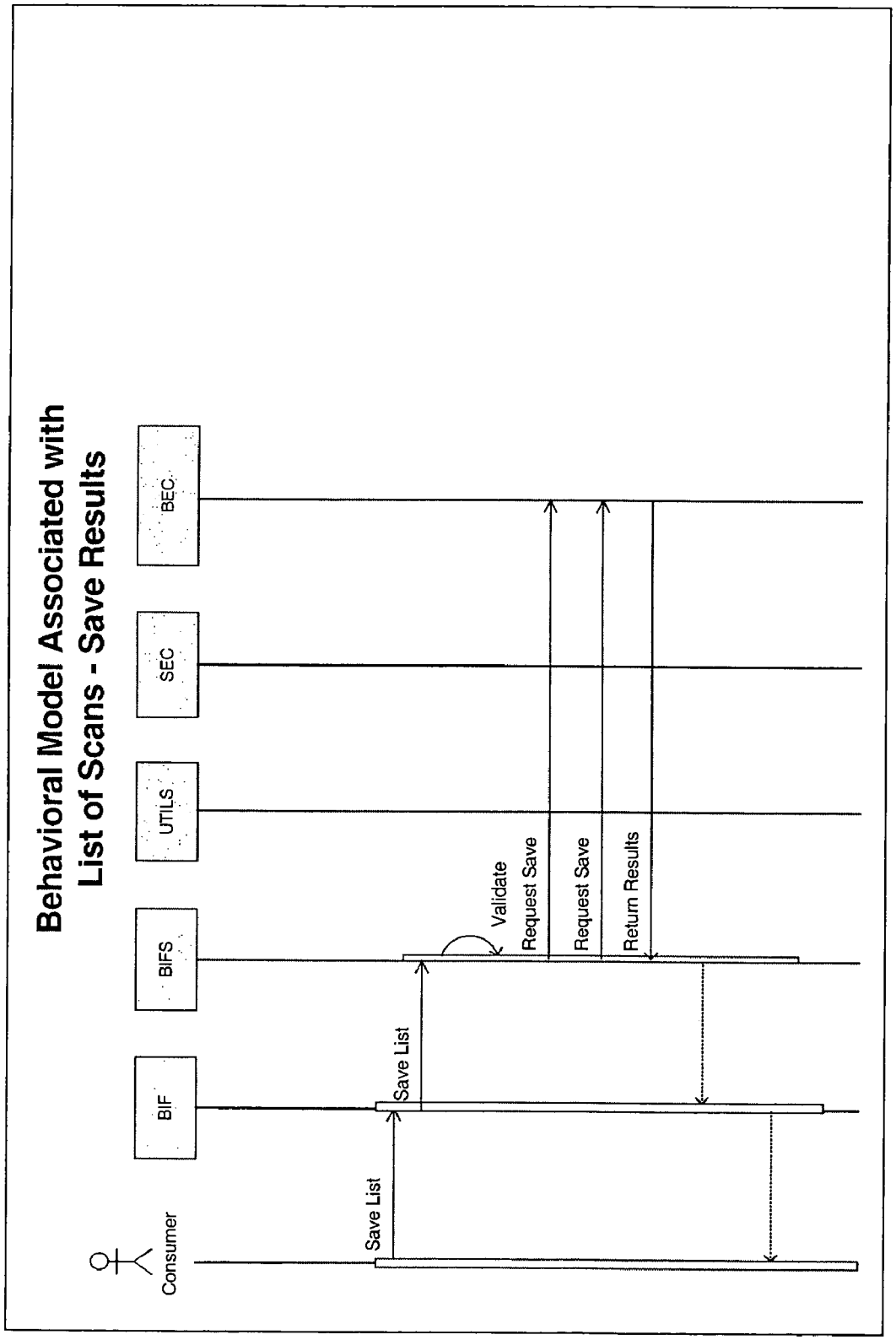
FIG. 38 depicts a preferred behavioral model associated with a List of Scans application performing a Save Results transaction.

FIG. 38 depicts a behavioral model associated with a List of Scans application performing a Get Results transaction.

Figure 39:
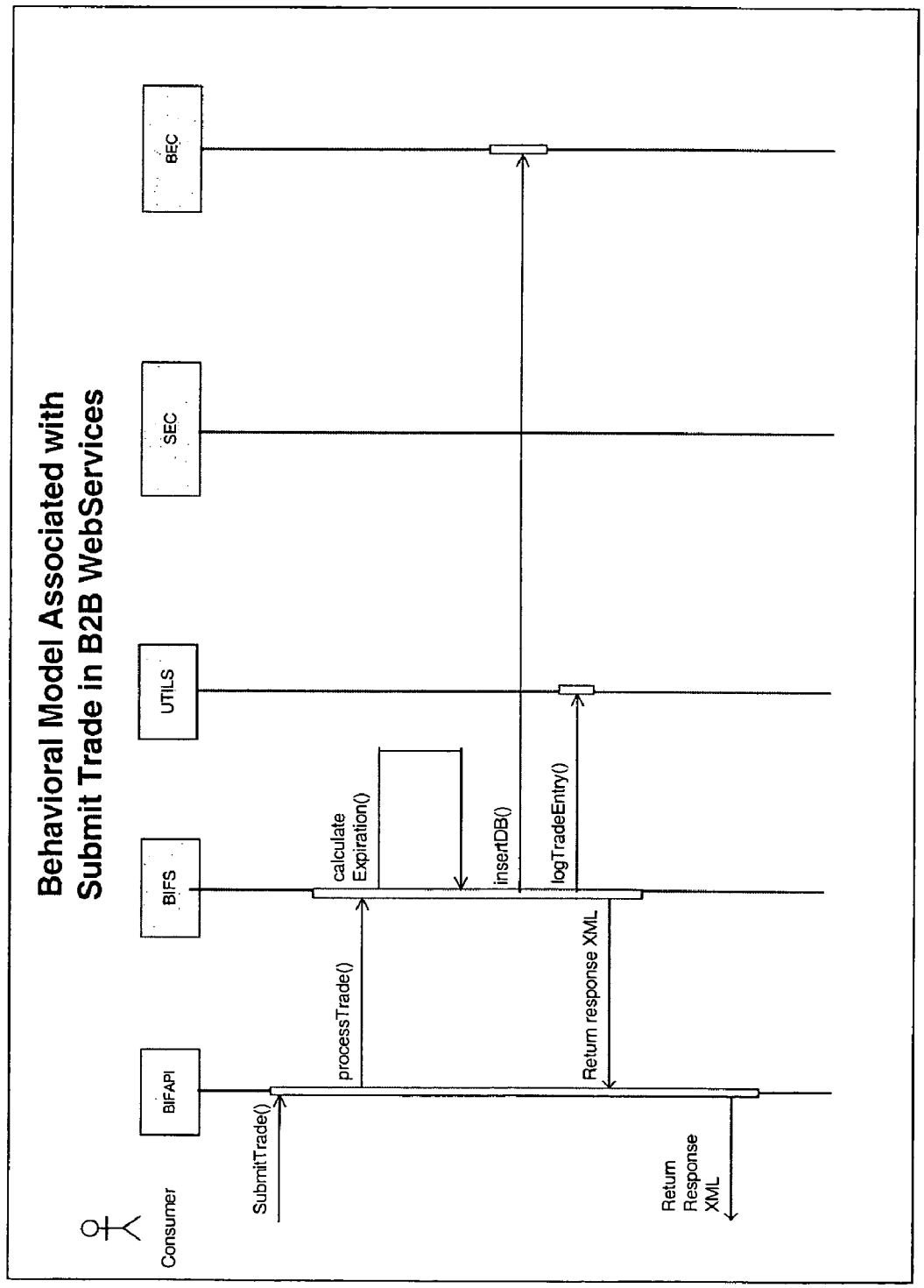
FIG. 39 depicts a preferred behavioral model associated with a B2B Webservices application performing a Submit Trade transaction.

FIG. 39 depicts a behavioral model associated with a B2B Webservices application performing a Submit Trade transaction.

Figure 40:
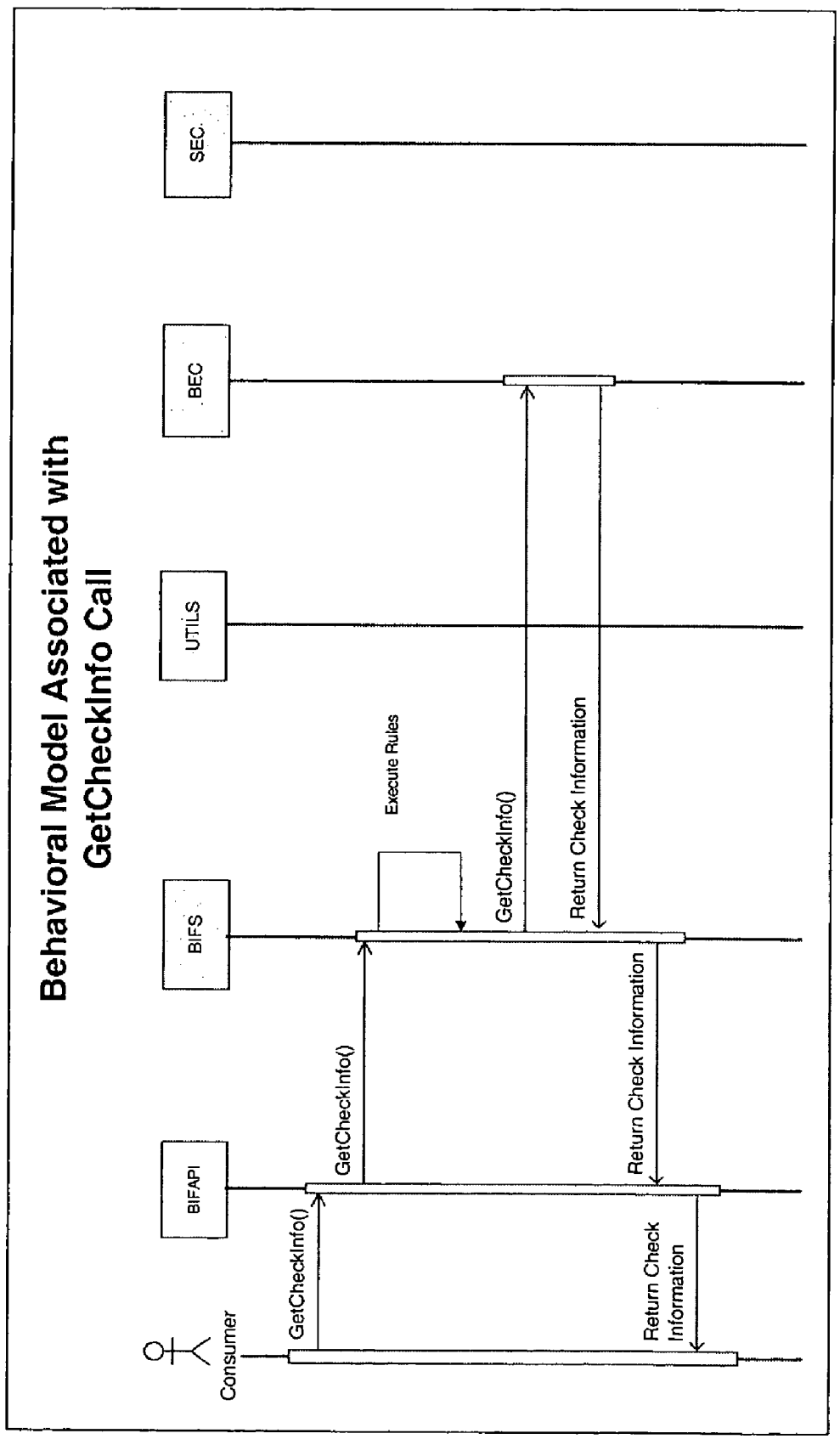
FIG. 40 depicts a preferred behavioral model associated with a PCOE application performing a GetCheckInfo call.

FIG. 40 depicts a behavioral model associated with a PCOE application performing a GetCheckInfo call.

Figure 41:
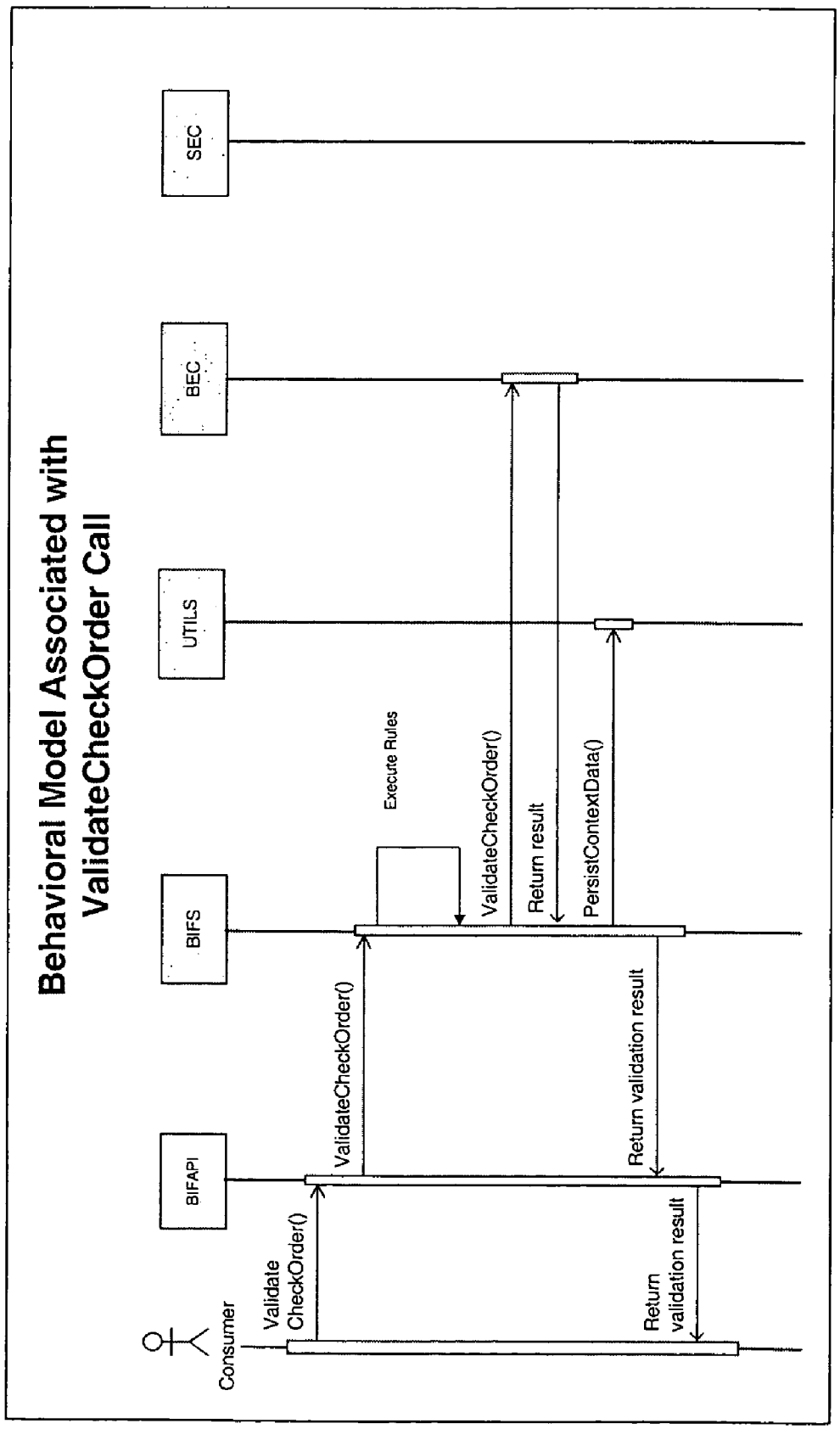
FIG. 41 depicts a preferred behavioral model associated with a PCOE application performing a ValidateCheckOrder call.

FIG. 41 depicts a behavioral model associated with a PCOE application performing a ValidateCheckOrder call.

Figure 42:
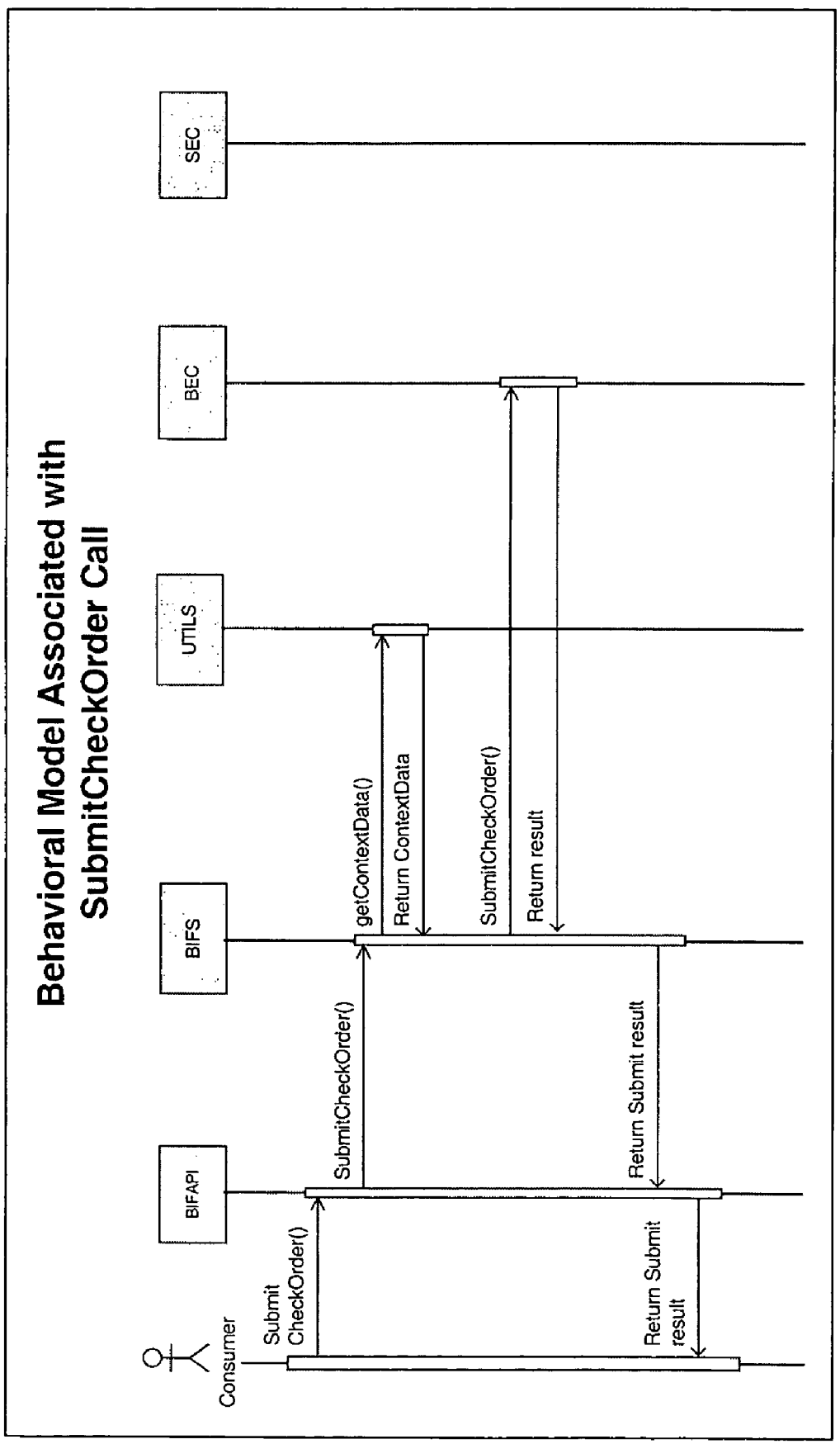
FIG. 42 depicts a preferred behavioral model associated with a PCOE application performing a SubmitCheckOrder call.

FIG. 42 depicts a behavioral model associated with PCOE application performing a SubmitCheckOrder call.

Figure 43:
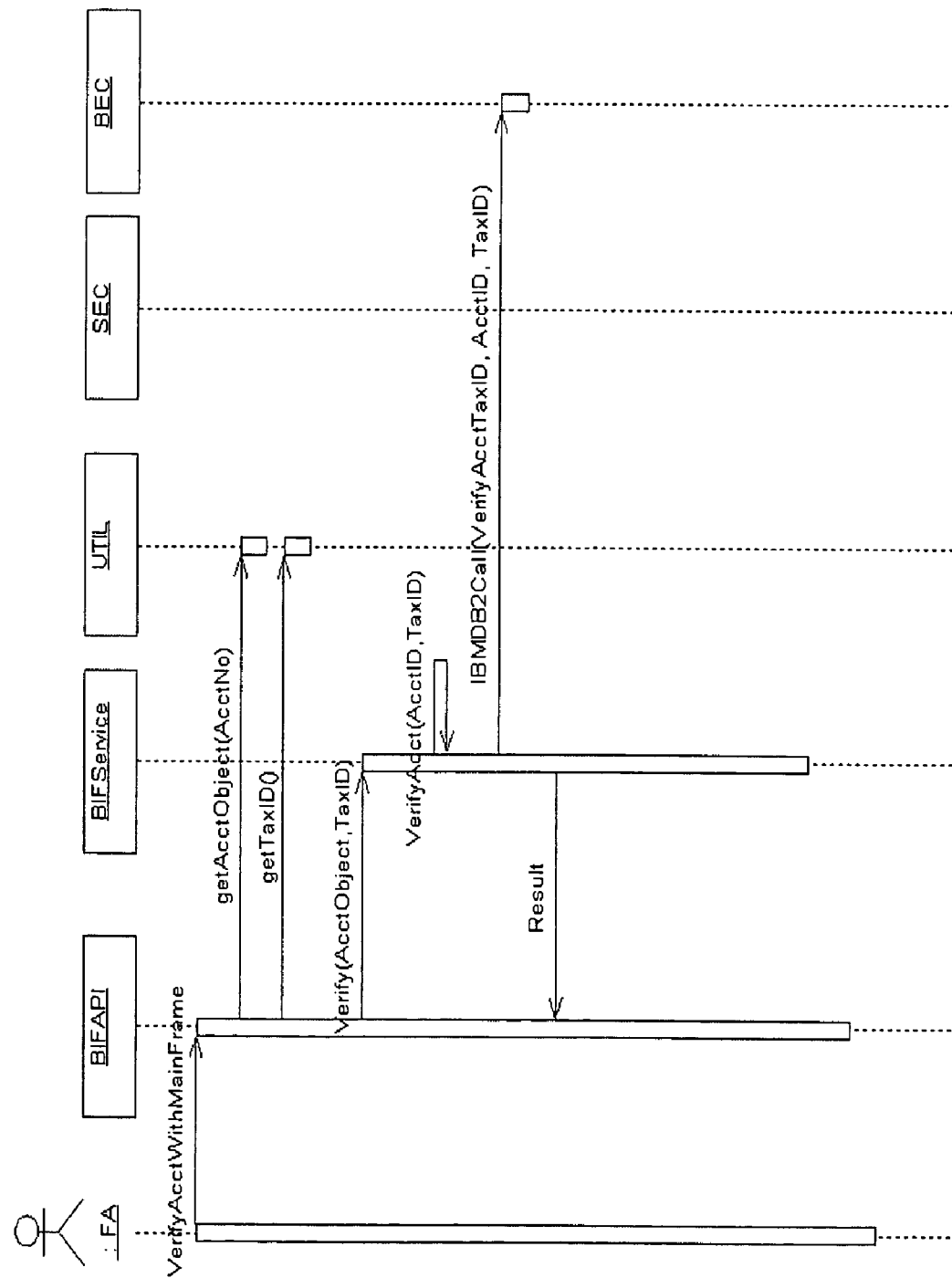
FIG. 43 depicts a preferred behavioral model associated with a Managed Assets application performing a Verify Account on Mainframe transaction.

FIG. 43 depicts a behavioral model associated with a Managed Assets application performing a Verify Account on Mainframe transaction.

Figure 44:
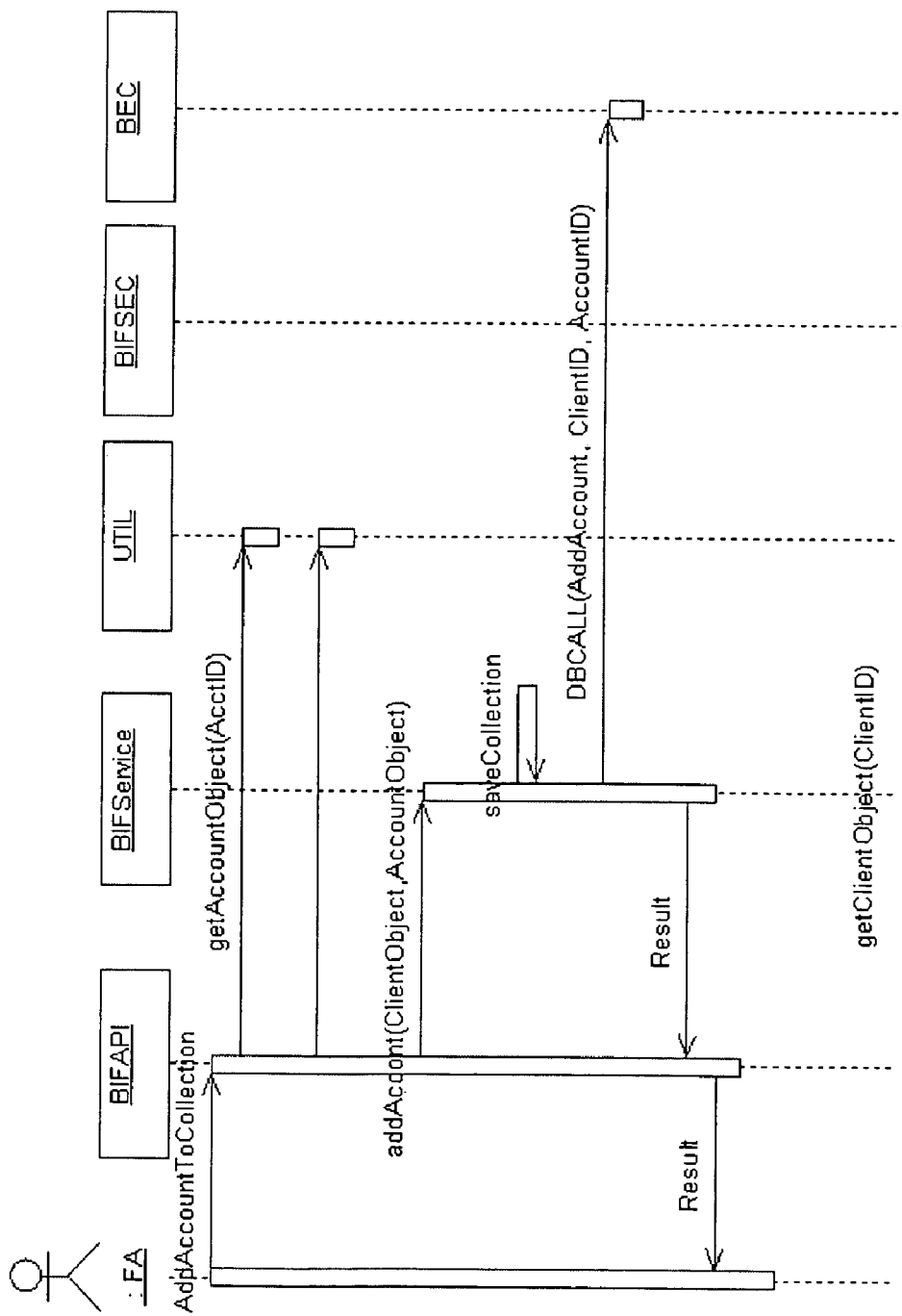
FIG. 44 depicts a preferred behavioral model associated with a Managed Assets application performing an Add Account to Client Account Collection transaction.

FIG. 44 depicts a behavioral model associated with a Managed Assets application performing an Add Account to Client Account Collection transaction.

Figure 45:
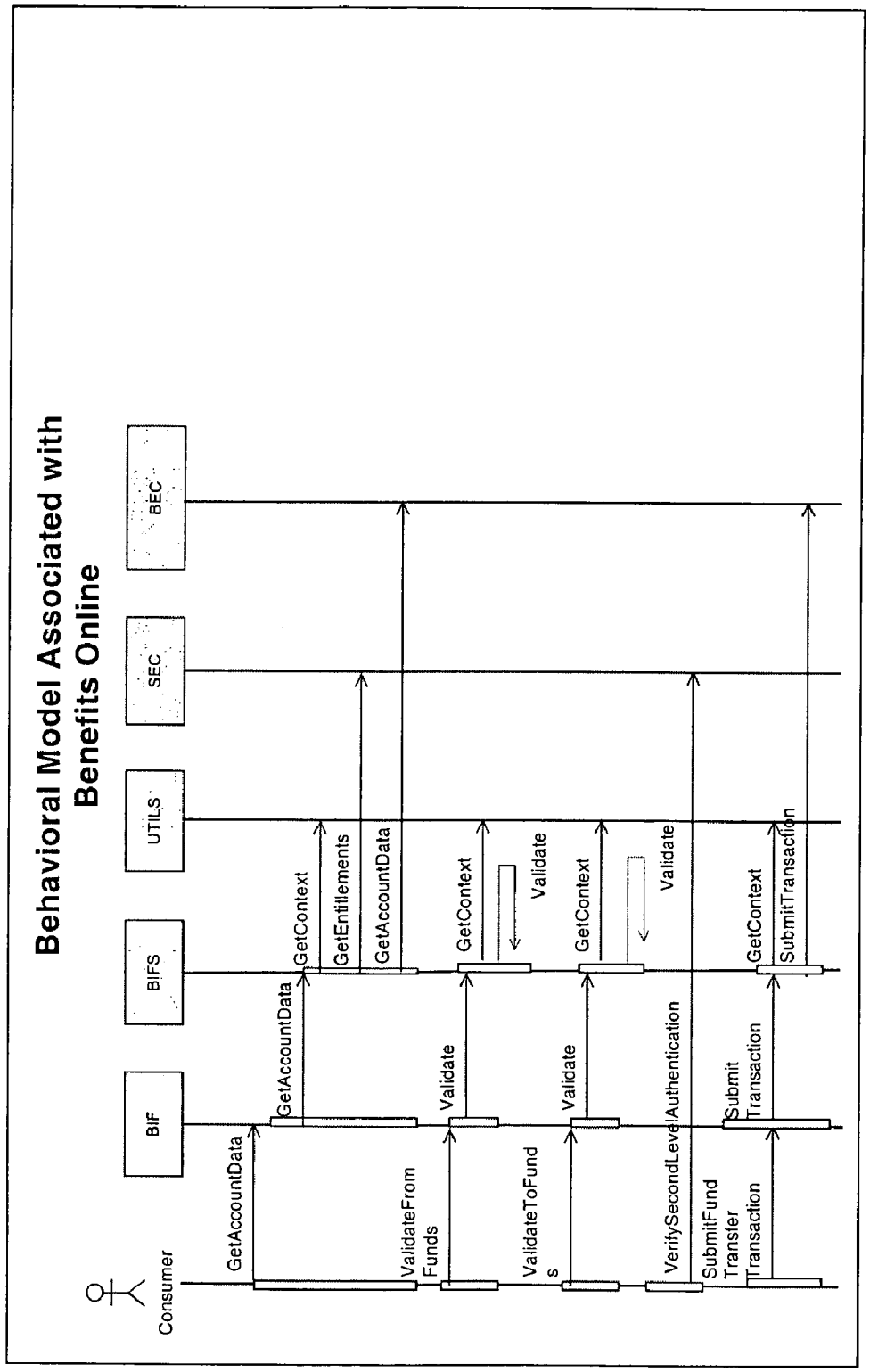
FIG. 45 depicts a preferred behavioral model associated with a Benefits Online application performing multiple transactions.

FIG. 45 depicts a behavioral model associated with a Benefits Online application performing multiple transactions.

Component Analysis: Interfaces to BIF
Interfaces of a candidate application to BIF API:

TABLE 12

Figure 46:
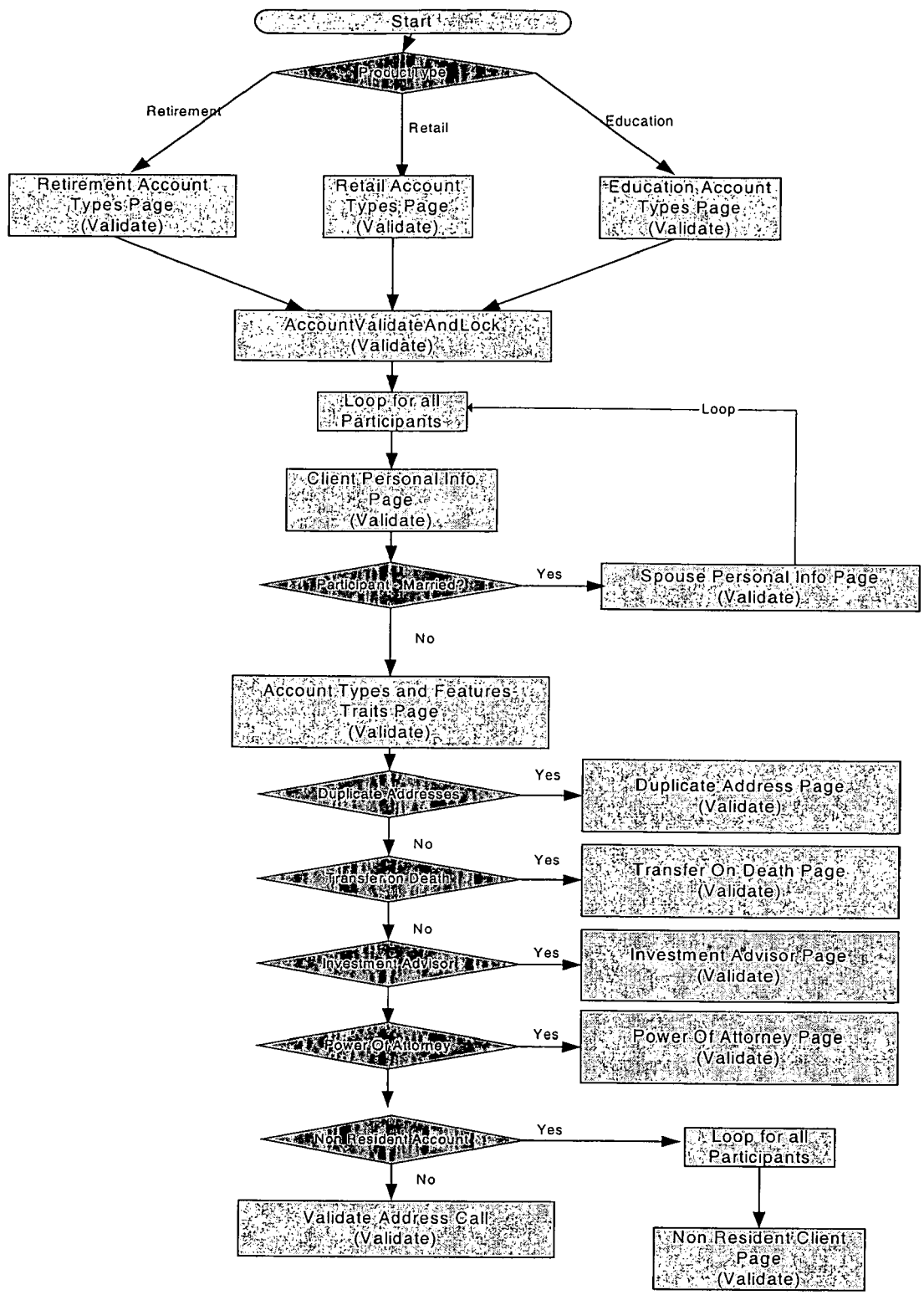
FIG. 46 is a flowchart diagram illustrating steps performed by a dynamic multi-step application.

| Use Case Types | Parameters | | |
| --- | --- | --- | --- |
| (App Types) | Comment | Operation Header | Payload |
| Multi Step (dynamic) | See FIG. 46 (flowchart diagram illustrating a dynamic multi-step application). | BIFML Header consisting of ContextHeader and CallHeader (see below for the XML schema) | BIFML payload consisting of APPdata, RuleData, SessionData, DownloadData. ErrorData |
| Multi Step (static) | A table mapping App calls to Validate, Ancillary and Submit. | BIFML Header consisting of ContextHeader and CallHeader (see below for the XML schema) | BIFML payload consisting of APPdata, RuleData, SessionData, DownloadData. ErrorData |
| Single Step | Single step is a special case of multi step with only one step to execute. | | |
| Bulk Transfer | Same as single step with specification to BEC to allow high-bandwidth transport. | | |

TABLE 12-continued

| Use Case Types (App Types) | Parameters | | |
|---|---|---|---|
| | Comment | Operation Header | Payload |
| Execute Synchronous Request Asynchronous Notification and Asynchronous request (originated by BIF client) | Same as Single Step Same as single step with a spec to BIF for guaranteed delivery. | | |

Component Analysis: BIF to BIF Service Provider:

TABLE 13

| Operation | Operation Header | Payload |
|---|---|---|
| Execute | BIFML Header consisting of ContextHeader and CallHeader | BIFML payload consisting of APPdata, RuleData, SessionData, DownloadData. ErrorData |

```
<BIFML_Message>
    <BIFML_Header/>
    <BIFMLPayload/>
</BIFML_Message>
<BIFML_Header>
    <BIFML_Context_Header/>
    <BIFML_Call_HEADER/>
</BIFML_Header>
<BIFML_Message>
    <BIFML_Header>
        <BIFML_Context_Header>
            <Product />
            <Channel />
            <Touchpoint />
            <Operation />
            <Mode />
            <ExecutionContextID />
            <RequestId />
                <BIFParameterList>
                <BIFParameter />
                </BIFParameterList>
        </BIFML_Context_Header>
```

-continued

```
        <BIFML_Call_HEADER>
            <SERVICEID />
            <VERSION />
            <DATETIME />
            <CLIENTAPP />
            <CLIENTUSERINFO />
            <ENVIRONMENT />
            <ENDPOINT />
        </BIFML_Call_HEADER>
    </BIFML_Header>
        <BIFMLPayload>
        <APPLICATION_DATA />
        <SESSION_DATA />
        <RULE_Data />
        <DOWNLOAD_DATA />
        <ERROR_DATA />
        </BIFMLPayload>
</BIFML_Message>
```

Component Analysis: Preferred BIF to Backend Connectivity Interfaces

Interfaces to Backend Connectivity: Note that even though the below exemplary requirement on Back End Connectivity is expressed in an interface format, this description does not define interfaces that BEC must expose, it merely uses this notation as a vehicle to express the requirements.

There are primarily three main preferred operations to BEC: SendReceive, SendOnly, and ReceiveOnly. SendOnly works as the main vehicle for asynchronous communication to BEC; ReceiveOnly works as the main vehicle for asynchronous communication from BEC; and SendReceive is the communication vehicle for synchronous calls.

TABLE 14

| | | Parameters | | |
|---|---|---|---|---|
| Operation | Behavior | Global Header Info | Operation Header | Payload |
| Send Received | Sends the information and block waits for the result. The backend executes and returns the answer. | Number Of Operations Global Input Data Length Execution Context Id Global Output Data Length Return Error Code | Operation Code Product Code Channel Code Touch point Code Operation Version Number Operation Input Data Length Operation Output Data Length | Send Receive Payload (Specific to App) |
| SendOnly | Sends the message and gets ACK. | Number Of Operations Global Input Data Length Execution Context Id Global Output Data Length Return Error Code | Operation Code Product Code Channel Code Touch point Code Operation Version Number Operation Input Data Length | Send Payload XML (Specific to App) |

TABLE 14-continued

| Operation | Behavior | Parameters | | |
|---|---|---|---|---|
| | | Global Header Info | Operation Header | Payload |
| Receive Only | Asynchronously receives the message | Acknowledgement Number Subscriber App Id Subscriber App Group Id Number Of Operations Global Input Data Length Execution Context Id Global Output Data Length Return Error Code Acknowledgement Number Target Subscriber App Id Target Subscriber App Group Id | Operation Output Data Length Operation Code Product Code Channel Code Touch point Code Operation Version Number Operation Input Data Length Operation Output Data Length | Receive Payload (specific to App) |

SL for BEC: Key preferred SL requirements for BEC are the following:

(A) Adding a new Backend Call for an application does not result in changing BIF code.

(B) BEC supports Dynamic Transport Selection at Runtime. It also allows for failover to an alternate transport mechanism, in case the primary mechanism fails.

To support the above SL, the applications within BIF define the following two types of parametric data.

Transport Type Specification: This specifies the transport protocol to be used for each call initiated by the BIF Client, if that call includes usage of BEC.

TABLE 15

Example of Transport Type Document (for FTS application)

| Calls | Description | Transport Type (Example) |
|---|---|---|
| Call1 | Get Valid Accounts | ECI |
| Call2 | Get Bank Relationships | ECI |
| Call3 | Funds Transfer Options | ECI |

Transport Failover Specification: This specifies failover strategy for the transport protocols on a per call basis.

TABLE 16

Example of Transport Failover Document (for FTS application)

| Calls | Description | Primary Transport (Example) | Failover Transport (Example) | Failover Condition |
|---|---|---|---|---|
| Call1 | Get valid Accounts | ECI | MQ | if PrimaryTransport.Timeout = true and <PrimaryTransport>.Waittime> <ReferenceData>.MaxTime |
| Call2 | Get Bank Relationships | ECI | MQ | if <PrimaryTarget>.NumOfTries> <ReferenceData>.NumOfTries |
| Call3 | Funds Transfer Options | ECI | MQ | if <PrimaryTarget>.NumOfTries> <ReferenceData>.NumOfTries |

Component Analysis Preferred: BIF to UTIL interfaces

Note that even though the below requirement on the Utility Framework is expressed in an interface format, this description does not seek to define the interfaces that the Utility Framework should expose; it merely uses this notation as a vehicle to express the requirements.

TABLE 17

Interfaces to UF - InterApp Context Manager

| Operation | Parameter | Behavior |
|---|---|---|
| Get | GroupId ApplicationId UserSessionId DataId DataXML | The application retrieves the context using Get. The context data is returned in DataXML output variable. UF Validates if the application is allowed to retrieve the context within its Group. |
| Set | GroupId ApplicationId UserSessionId DataId DataXML | The application Sets the context using Set. UF Validates if the application is allowed to set the context within it's Group. |

TABLE 18

Interfaces to UF - IntraApp Context Manager

| Operation | Parameter | Behavior |
|---|---|---|
| Get | ApplicationId<br>UserSessionId<br>DataId<br>DataXML | The application retrieves the context using Get. The context data is returned in DataXML output variable. |
| Set | ApplicationId<br>UserSessionId<br>DataId<br>DataXML | The application Sets the context using Set. |

TABLE 19

Interfaces to UF - Error Logging

| Operation | Parameter | Behavior |
|---|---|---|
| WriteErrorEvent | EventSource{ ApplicationId, WorkerId }<br>CorrelationId<br>ErrorNumber<br>ErrorMessage<br>Status | The application uses this operation to write an error event to UF. |
| WriteWarning Event | EventSource{ ApplicationId, WorkerId }<br>CorrelationId<br>Message<br>Status | The application uses this operation to write a warning event to UF. |
| WriteInfoEvent | EventSource{ ApplicationId, WorkerId }<br>CorrelationId<br>Message<br>Status | The application uses this operation to write an info event to UF. |

TABLE 20

Interfaces to UF - Tracing

| Operation | Parameter | Behavior |
|---|---|---|
| WriteInvokeBegin Event | EventSource{ ApplicationId, WorkerId }<br>CorrelationId<br>Input<br>Status | The application uses this operation to write a trace event to UF. This trace is used at the start of a function body. |
| WriteInvokeEnd Event | EventSource{ ApplicationId, WorkerId }<br>CorrelationId<br>Output<br>RequestCriteria<br>Status | The application uses this operation to write a warning event to UF. This trace event is used at the end of a function body. |

Implementation Considerations

This section describes some of the considerations that should be taken into account while implementing the service.

Exemplary Design Goals for Business Integration Framework:

(A) To provide clean application abstractions.

(B) Disallow coupling between UI/Presentation zone and Fulfillment/Host zone.

(C) Identify common services that all applications need (e.g., logging, etc).

(D) Determine application types and corresponding characteristics.

(E) Define "Application model" that includes data model, design model, configuration model, deployment model, etc.

Preferred Backend Connectivity Framework Specification
Scope of Framework

The BEC Framework preferably has three primary components: 3270 Integration Framework, RPC Framework, and Messaging Framework.

Scope of 3270 Framework: The 3270 Framework is focused on exposing a consistent set of interfaces to connect to Back End functionality and data. It preferably comprises the following major components (see FIG. 47):

(1) Business Object (BO) layer that comprises a 3270 Connectivity Adapter and other IF Services (e.g., Security Svc and Utility Svc). The 3270 Adapter preferably interacts with the host and provides features like caching of transactions and terminal pooling with the help of a Utility Framework. A cross-reference table of transactions (maintained in this layer) and their corresponding relevant quirks is accessed by the Adapter to get transaction specific customization (e.g., Cache/Not to Cache, Formatted/Not Formatted**), a pool of sessions that the transaction can use, and a description of the transaction.

** Many applications adhere to a presentation format (i.e., the first line comprises a FUNCTION, SELECT and PWD field, followed by the Application content, and the last line is the Action field). The Formatted/un-formatted information usually is necessary to create the initial map for the mainframe.

(2) A Data Object (DO) layer that executes the corresponding program in the host.

(3) The Rendering Object (RO) layer is the requester responsible for transforming the resultant data stream from the BEC IF into a presentation format and displaying it on the rendering device, or consuming the Datastream for Screen-Scraping.

Figure 47:
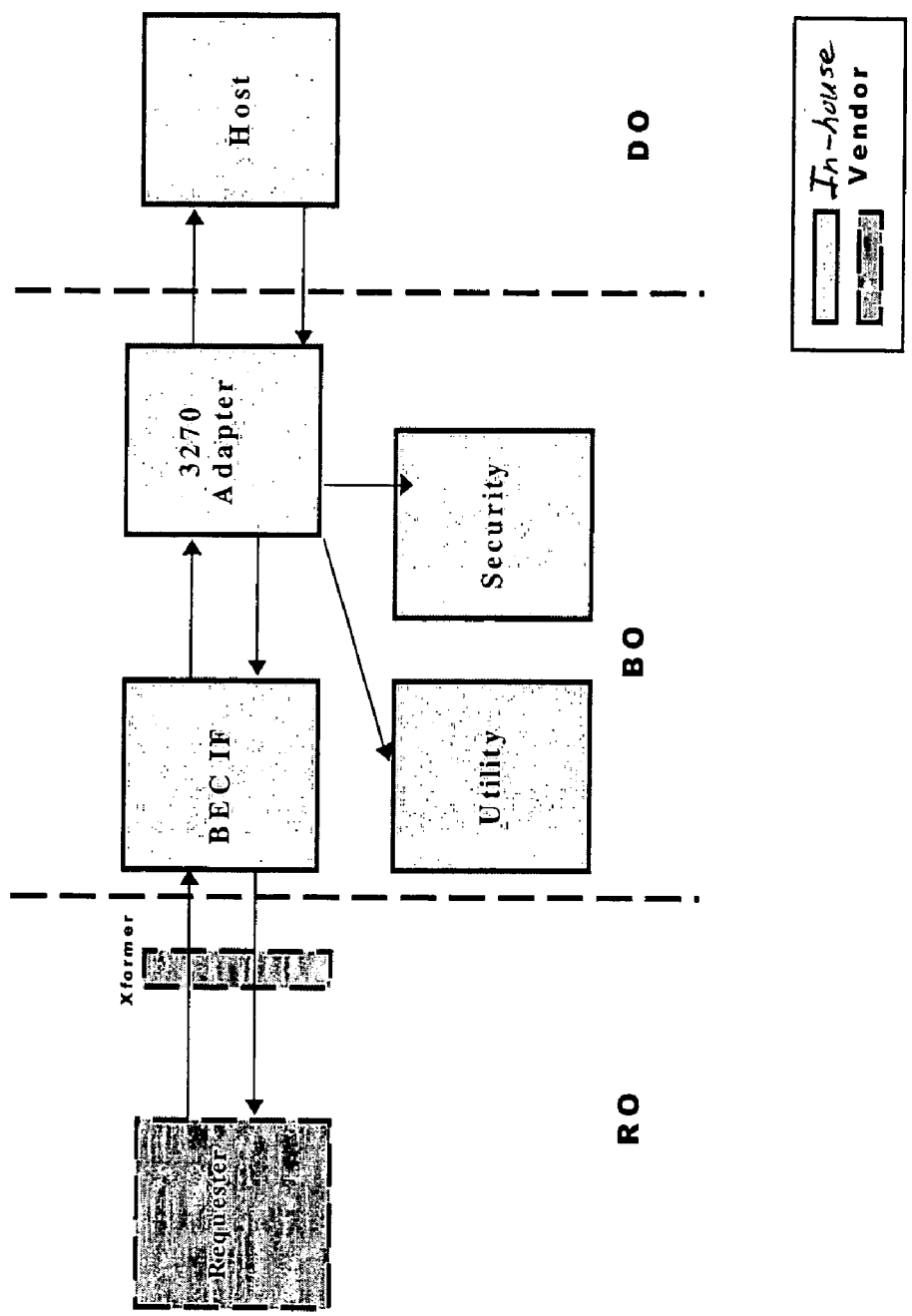
FIG. 47 is an object diagram of a preferred 3270 Integration Framework.

The high-level object diagram depicted in FIG. 47 can be applied to the following two scenarios:

(1) Single Session Scenario: The requester "explicitly" passes the last character of the TermID (the 3270 Adapter will extract the seed from the context of the requester) as part of the payload to the BEC IF. Looking at the payload, the 3270 Adapter examines the requirement of a single session user and does not involve a Utility Framework for Terminal pooling. However, it does involve the Utility Framework for caching* the transaction (the resultant DataStream), the screen map and storing/retrieving contextual information like terminal token.

(2) Multiple Session Scenario: A user needs the 3270 Adapter to perform the task of deciding what terminal the request should be executed on (there is no explicit mention of the last character of the TermID in the payload). The 3270 Adapter maintains a set of used terminals in the session state (with the help of State Management of the Utility Framework). Caching* transactions is also part of this scenario.

*The purpose of caching transactions is to increase performance of 3270 access. It avoids round-trips to the mainframe for transactions that have already been executed. The cached copy has an expiration value that ensures that the user does not get stale information.

Figure 48:
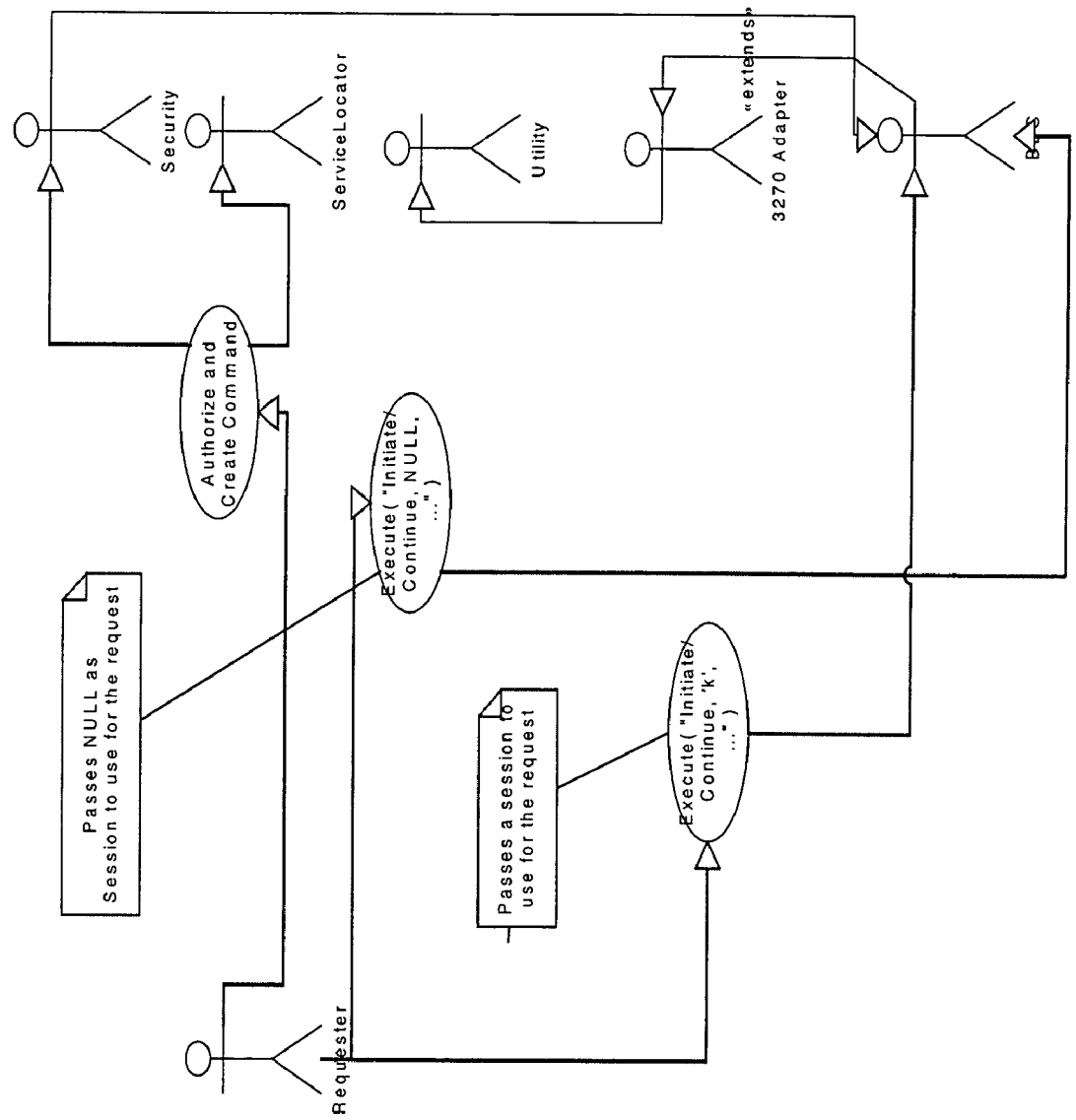
FIG. 48 is a use case diagram illustrating both single and multiple session scenarios.
Figure 49:
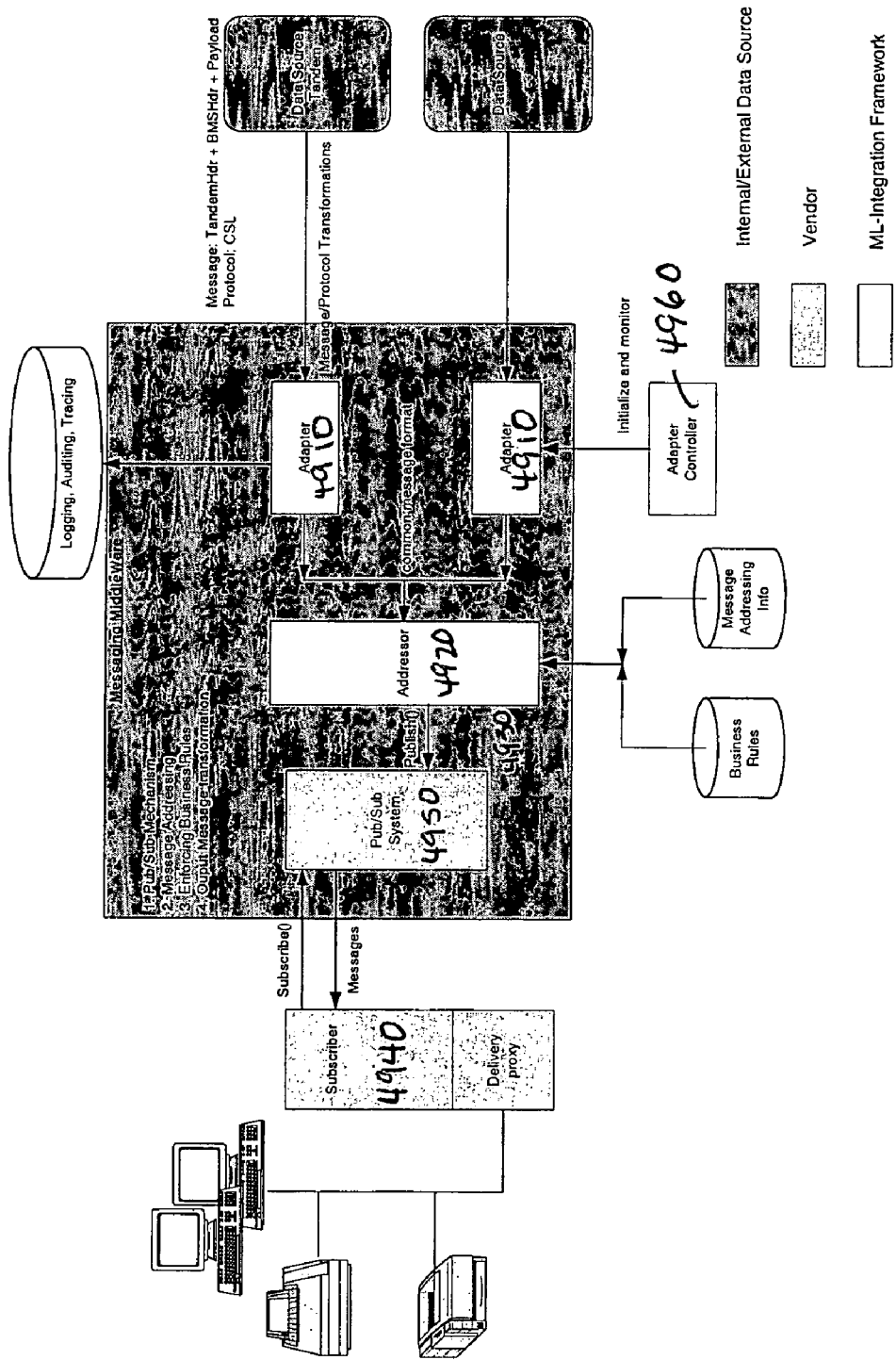
FIG. 49 depicts components of a preferred messaging integration framework.

FIG. 48 illustrates both Single and Multiple Session preferred scenarios.

Scope of RPC Framework: The goal of a preferred Remote Procedure Call (RPC, or Programmatic Interface) Framework is to provide a uniform interface to all back end systems regardless of the underlying technology or protocol. The scope of technologies the interface must support includes, but is not limited to: host data and process; access to database systems such as SQL Server, Oracle, and Sybase; and third-party sources such as Standard & Poor's and New River. As with the other frameworks, the interface provided preferably is based on adapter techniques. Transactions, while supported by the underlying technologies, preferably are not addressed by this framework.

Scope of Messaging Framework: The Messaging Integration Framework preferably defines a consistent set of interfaces for message consumers and message producers to exchange messages. It allows guaranteed distribution of addressed messages with defined message type from message producers to message consumers. The Messaging Framework distributes two types of messages, namely Host Print and Host Alert, from a central site to local branch offices. It consists of six major components (see FIG. 49):

Adapter 4910 provides technical interfaces to various different data sources. It accepts messages from data sources and performs message/protocol transformation to generate a common message format as an input to Addressor.

Addressor 4920 is responsible for message addressing, enforcing business rules, and transforming the output messages into the format that can be consumed by message consumers.

Publisher 4930 is an interface object used by the Addressor to send "addressed" messages to the Pub/Sub Server for distribution.

Subscriber 4940 is an interface object used by message consumers to connect to the Integration Framework Pub/Sub Server and receive messages.

The Publish-and-Subscribe Messaging System 4950 distributes messages to consumers.

Adapter Controller 4960 is a daemon service used to initialize, manage, and monitor adapters.

The following exemplary assumptions may be made regarding the frameworks.

RPC Framework Assumptions:

(1) The total cost of ownership (TCO) of the framework must be considered in all decisions regarding its specification.

(2) The framework for back end connectivity should provide the minimum gap possible from existing back end applications. Existing back end applications should ideally be exposed to the framework with no changes to the application.

(3) The framework solution must meet the minimum requirements of all applications. Conversely, all applications must use the framework solution.

(4) Industry standard APIs and protocols will be used.

(i) When both a vended solution and an in-house solution exist and meet the minimum requirements, prefer the vended solution.

(ii) Transactions are considered out of scope for the framework. This means that the Back End Connectivity Framework will not support resource locking mechanisms and will not participate in two-phase commits. This, however, does not prevent back end applications from participating in transactions themselves.

(iii) Applications using the framework must maintain transaction volume levels and SL consistent with existing requirements.

(iv) This description describes a preferred embodiment. The description describes one set of interfaces for the framework. It is assumed that there may be many service implementers of the interface.

3270 Framework Exemplary Assumptions:

(1) The Authorization process will be taken care of by Security.

(2) The Authorization process will make use of a utility service to set credentials. The 3270 Connectivity Service will use the utility service to retrieve it.

(i) The TermID Token state can be set and retrieved with the help of utility services.

(ii) The 3270 Connectivity Service will use the utility service for Audit, Error Tracing, and Logging.

(iii) Application relevant state (e.g., Account#, Symbol, FC#, etc.) will be pre-filled into the response screen by the vendor.

(iv) Vendor takes care of transforming the Standardized Data returned by the BEC IF into a presentation format.

(v) Vendor will map the attributes of the resultant fields to the presentation appropriately (see Appendix A).

Messaging Framework Exemplary Assumptions:

(1) The Authorization/Authentication process will be taken care of by the Security framework.

(2) Consumers will be connected to a private network, so no message encryption is required.

(3) Branch-level subscription. If user is not at workstation, user does not get alerts.

(4) Business rules such as failure retry, inbox management, and courtesy copy for alert messages will be provided by the BIF.

(5) Message addressing interface will be provided by the Security Framework.

(6) Identity mapping will be done by the Security Framework.

(7) Error logging, Tracing, and Auditing will be provided by the Utility Framework.

(8) Local alerts, price limits alerts, and the availability of email alerts will be provided by vendors.

Scenario Analysis

Figure 50:
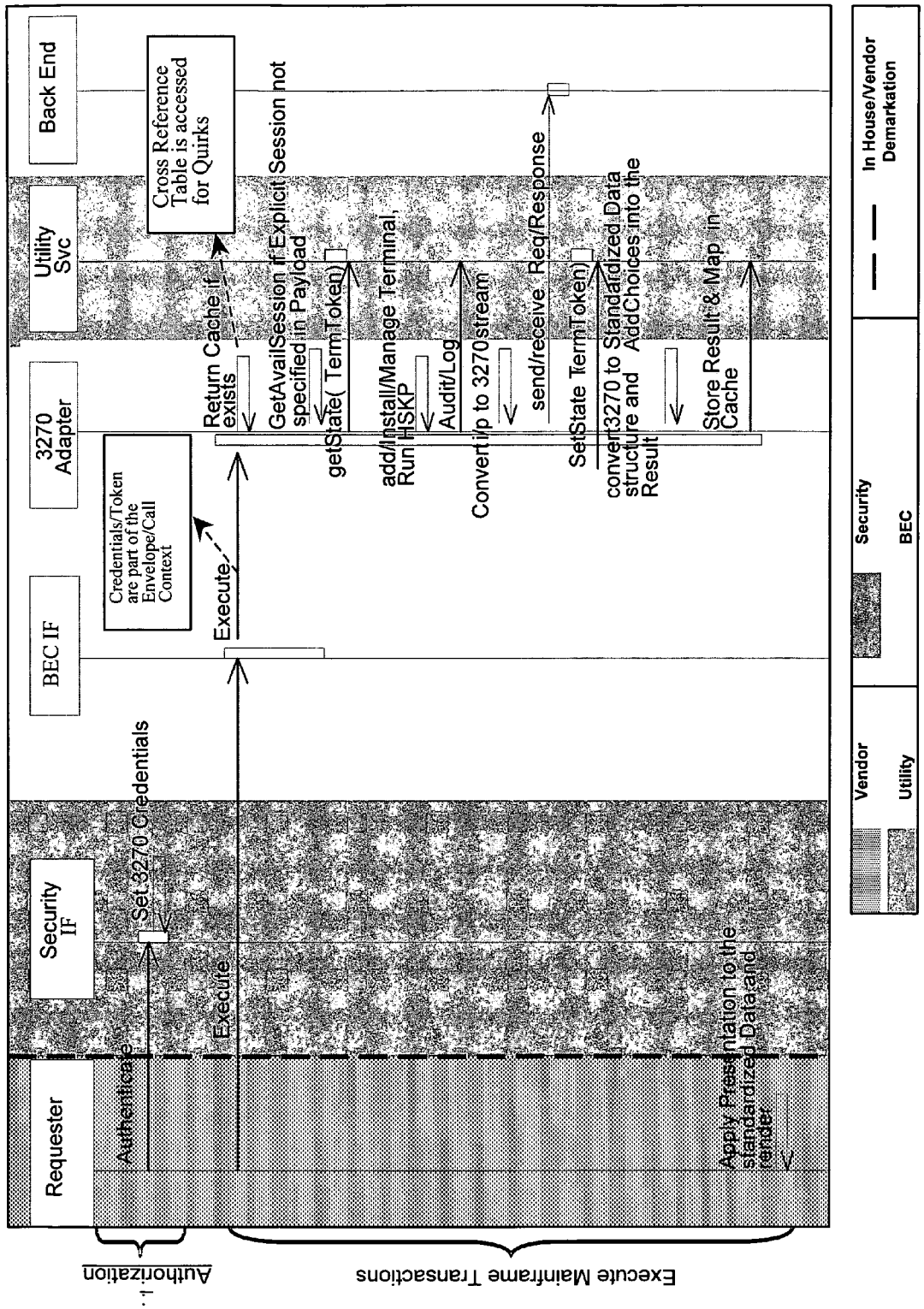
FIG. 50 is a sequence diagram for a preferred Locate and Bind to Service scenario.

3270 Scenario Analysis. A scenario relevant to the Vendor Connectivity is Locate and Bind to Service. The relevant sequence diagram for that scenario is depicted in FIG. 50.

Locate and Bind to Service: Precondition: User has been provisioned and logged in and has an authorization token from Security.

Once authorized, the 3270 Adapter picks up the credentials from the Envelope/Call Context of the request and executes the transaction.

Figure 51:
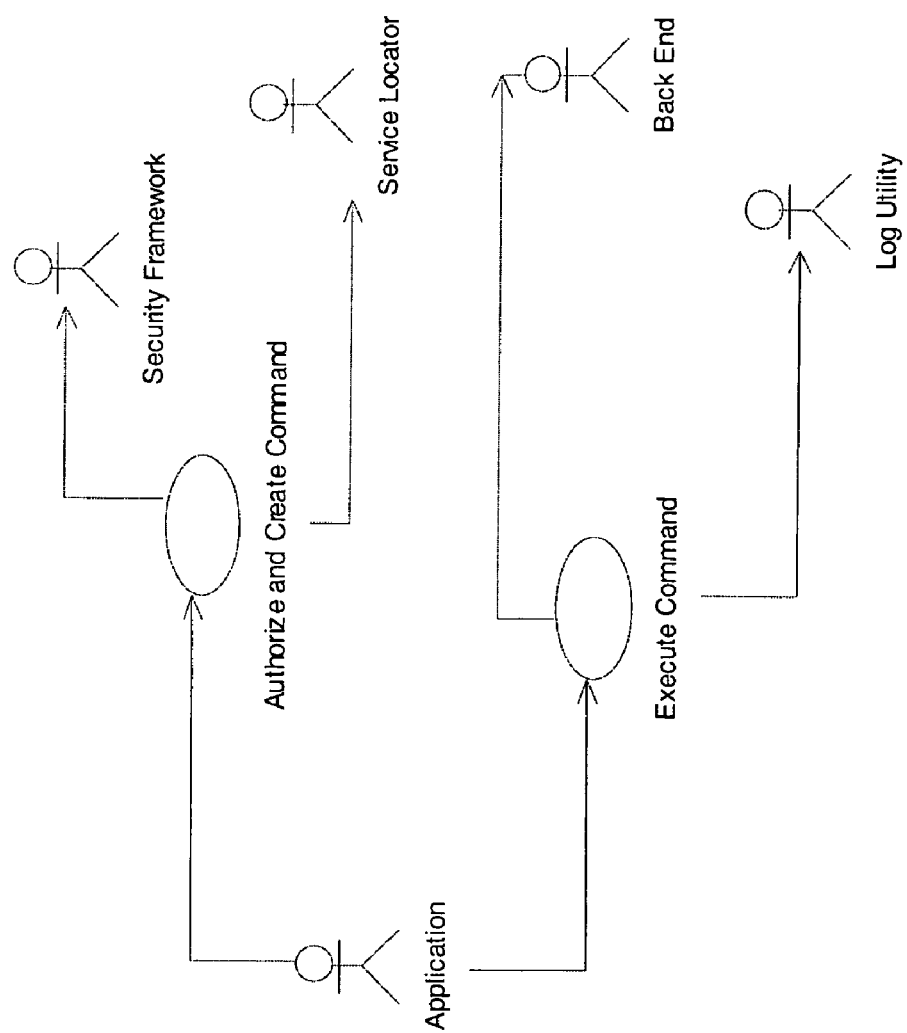
FIG. 51 illustrates a preferred use case for a back end connectivity interface framework.
Figure 52:
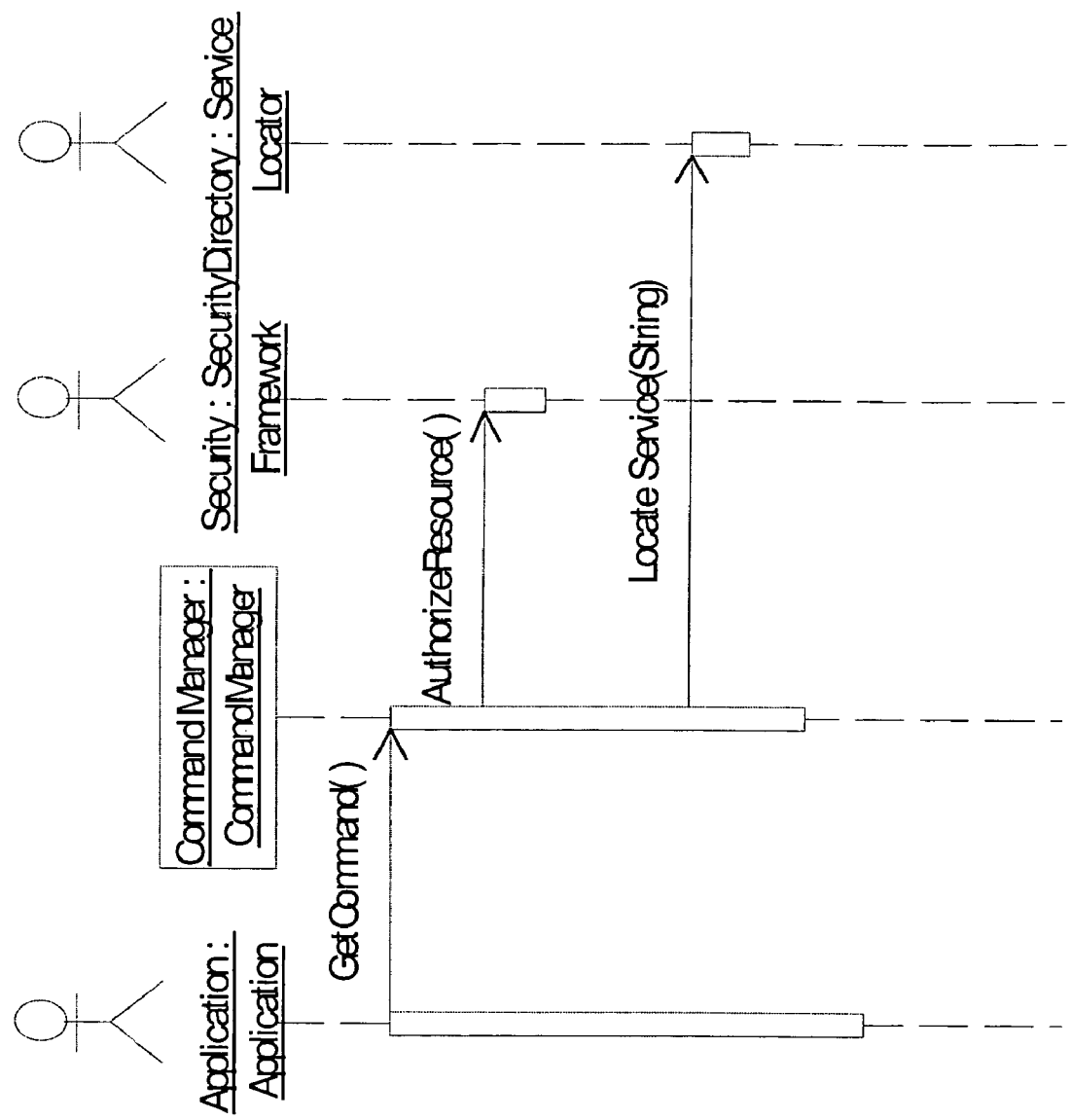
FIG. 52 illustrates a preferred Authorize and Create Command scenario.
Figure 53:
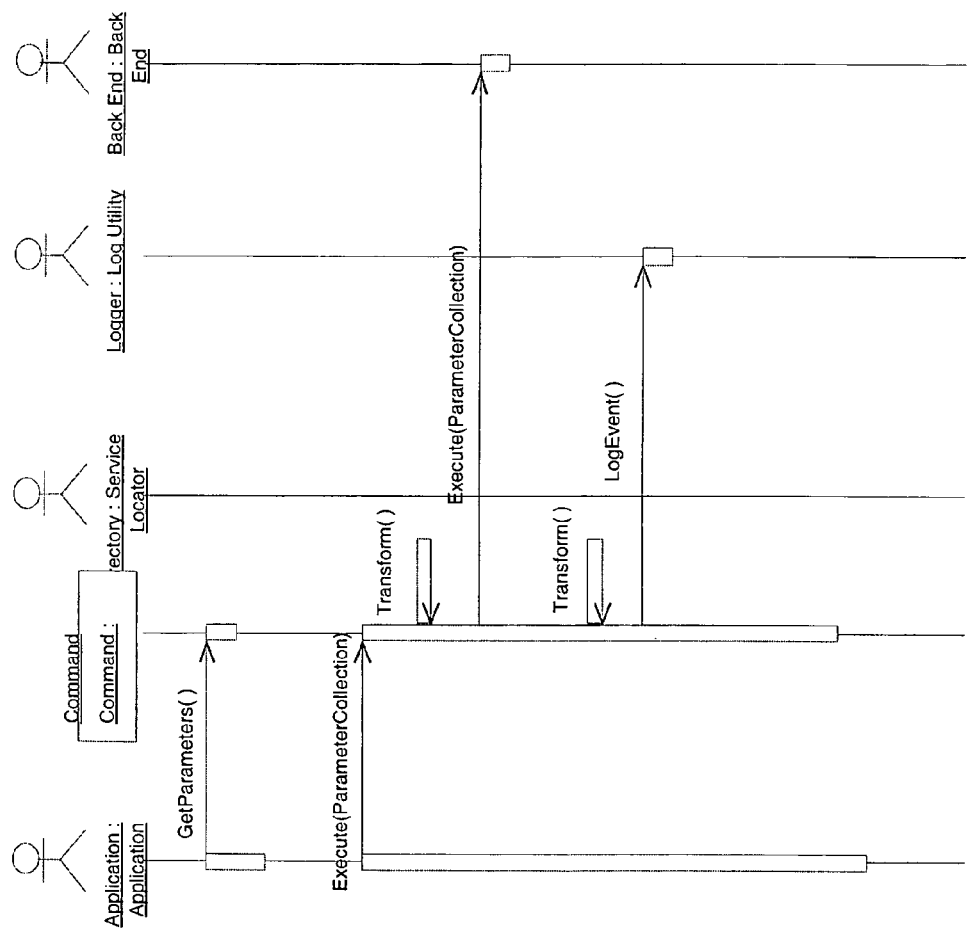
FIG. 53 illustrates a preferred Execute Command scenario.
Figure 54:
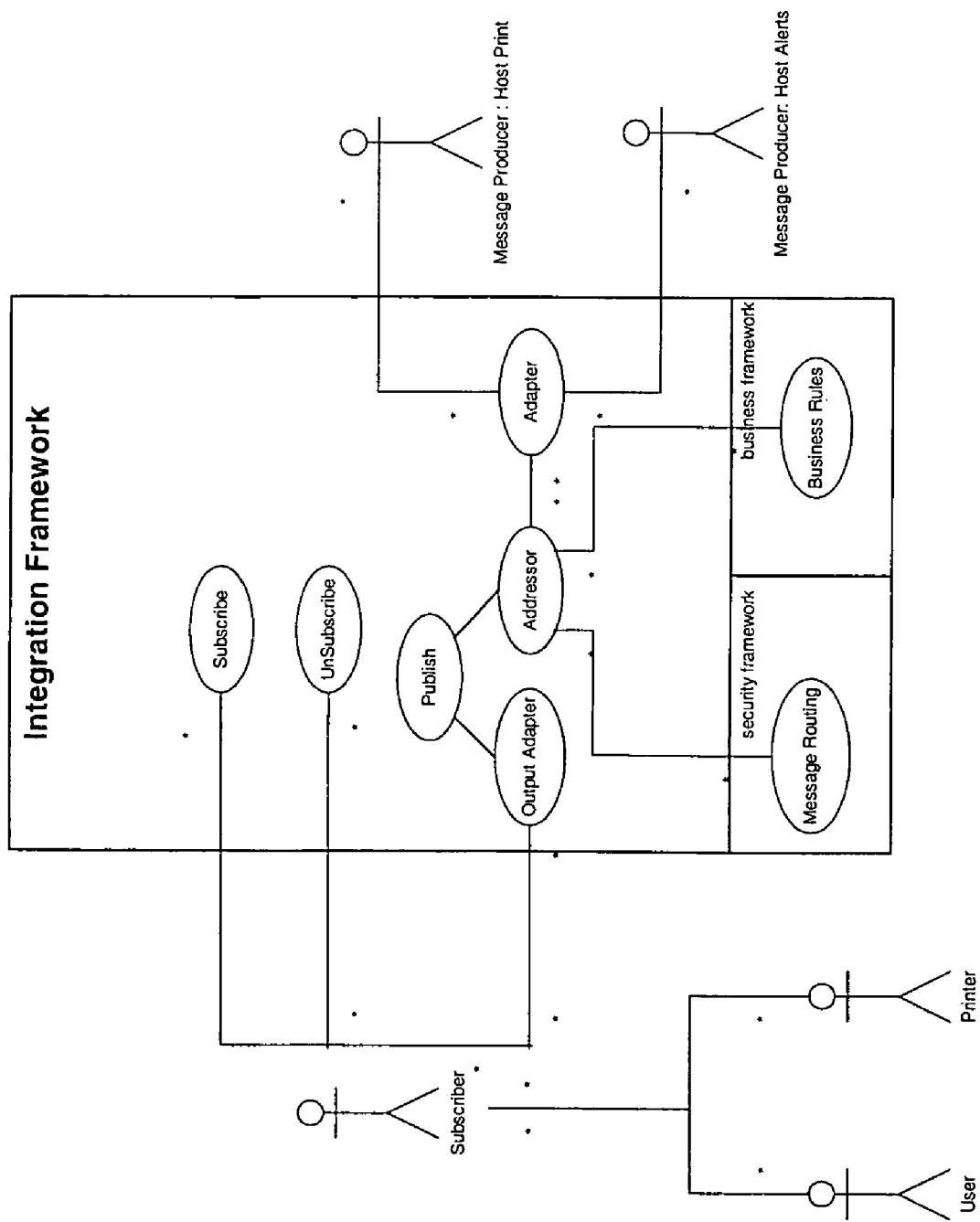
FIG. 54 illustrates a preferred messaging scenario, wherein the Integration Framework accepts messages from a data source and sends the messages to an external subscriber.
Figure 55:
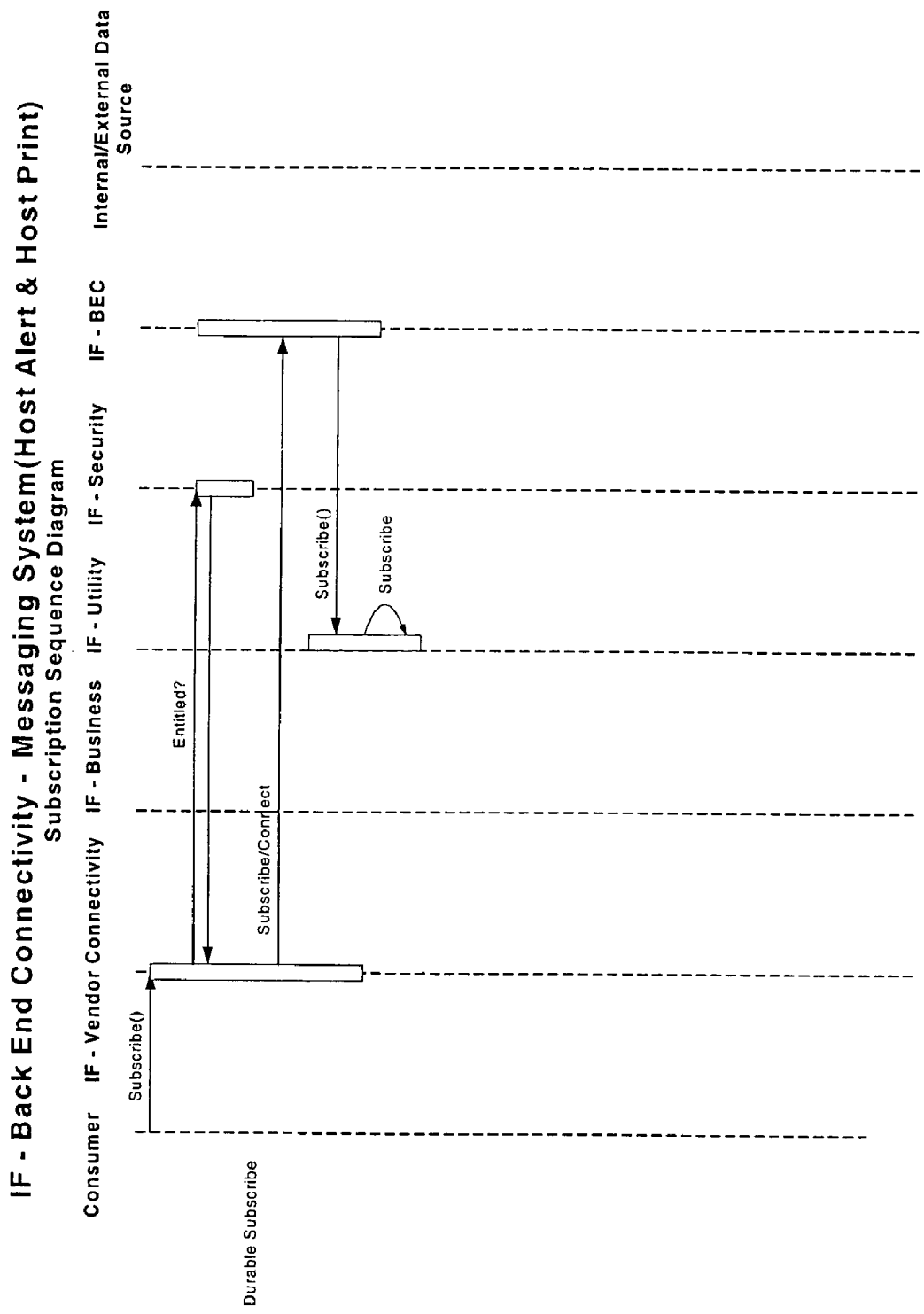
FIG. 55 illustrates a preferred subscription scenario.
Figure 56:
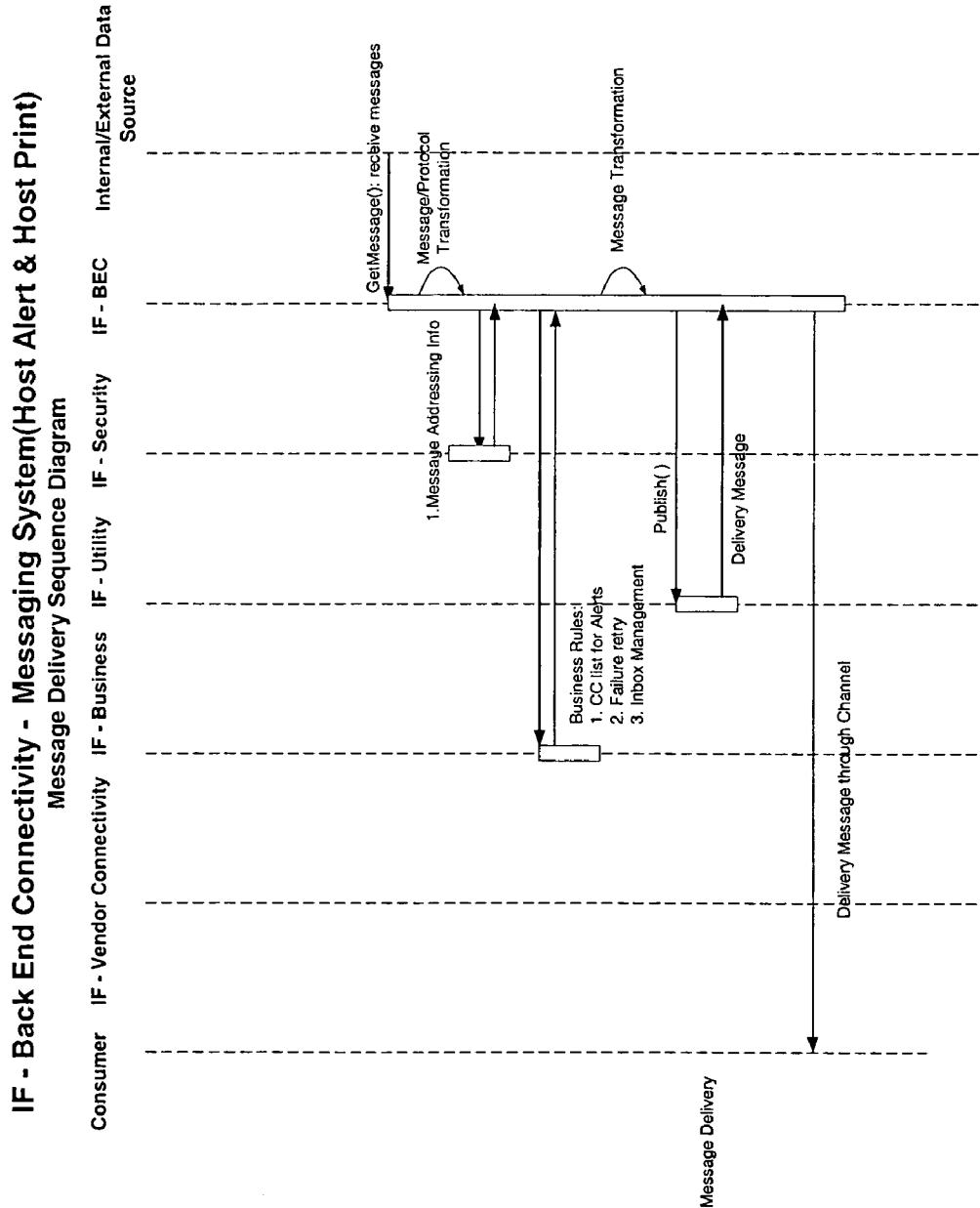
FIG. 56 illustrates a preferred message delivery scenario.
Figure 57:
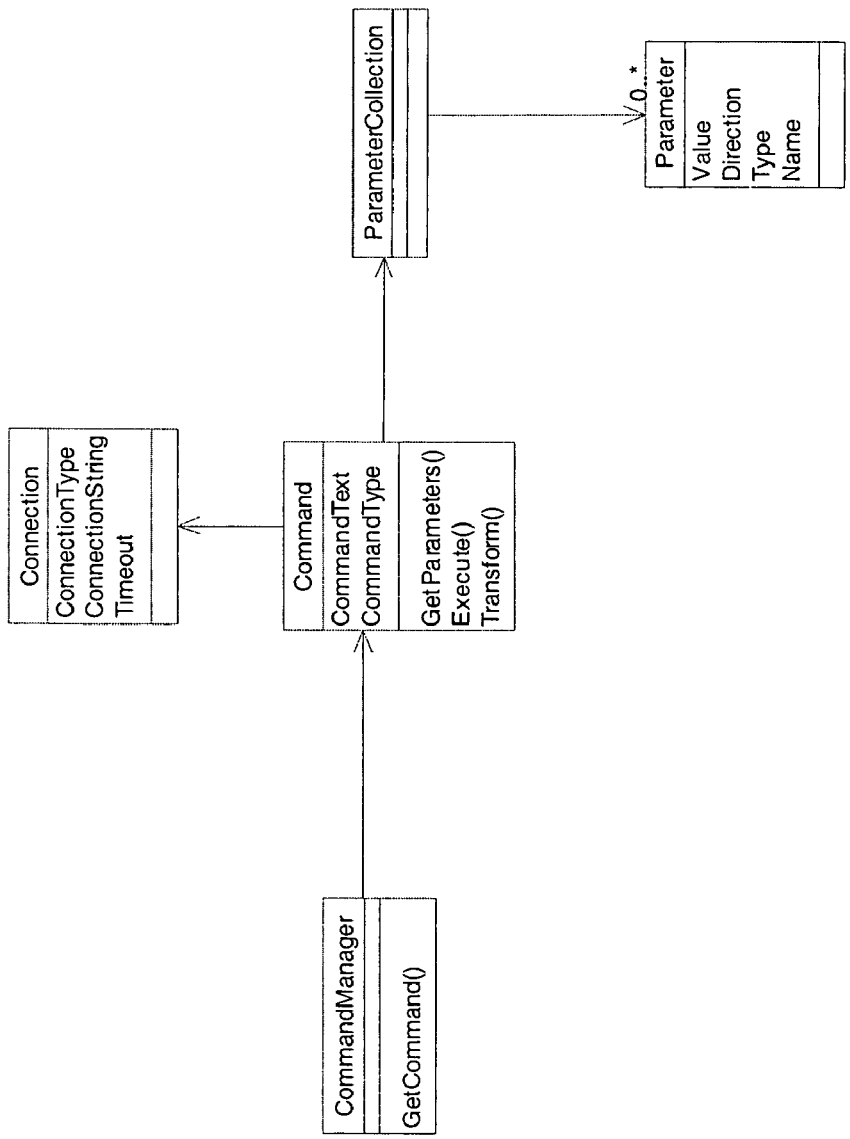
FIG. 57 depicts a preferred RPC logical interface definition.

RPC Scenario Analysis. The analysis begins with defining the use cases. The use case for the back end connectivity programmatic interface framework is depicted in FIG. 51. There are two actors important to the framework: the application requiring back end services, and the back end system providing the services. The remaining actors provide support for security, service discovery, and logging.

There are two distinct scenarios that can be developed for back end connectivity RPC. The first is authorizing the activity and finding the provider of the service. The second is execution of the service. In this section those scenarios are discussed and relevant sequence diagrams are described.

As mentioned in the assumptions, in this embodiment the back end connectivity framework does not support transactional processing. However, each of these scenarios may itself represent a transaction.

Authorize and Create Command. This scenario represents the activities typical to an application requesting a command resource. The request contains the name of the requested resource, the user context, and the desired service level (SL). The SL can be used when more than one service is available for the requested resource.

This scenario can be viewed as a novel adaptation of the classic Class Factory Pattern. In that pattern, rather than applications creating instances of a particular implementation, the factory object creates instances on behalf of the caller. In this scenario, the Command Manager acts as a factory taking requests for command instances. In order to do that the Command Manager must first ask the Security Framework whether the command is authorized for the current user context. After authorization, the Command Manager uses the Service Locator to find implementations of the command. The Command Manager creates an instance of the cCommand, loading the code if required. The command instance is returned to the caller. See FIG. 52.

Execute Command. This scenario represents execution of a program or process on behalf of the calling program. This scenario is another adaptation of a classic software pattern, the Adapter Pattern. The Command object returned from the GetCommand scenario is an adapter ("wrapper") for an existing technology service.

The Command object gives a standard interface to the application regardless of the underlying back end technology. The command manages the transformation from one data format to another. Additionally, the command object manages the connection to the back end and associated protocols. See FIG. 53.

Messaging Scenario Analysis. The messaging scenario that is relevant to the Back End Connectivity—Messaging framework is to get messages from internal/external data sources and deliver the messages to consumers. See FIG. 54. The Messaging framework preferably provides an adapter for each type of data source. The adapter gets messages asynchronously from the data source and performs message/protocol transformation. In this section the relevant sequence diagram is depicted for each scenario.

Subscription: See FIG. 55.

Message Delivery: See FIG. 56.

Component Analysis

This section outlines a preferred Logical Interface Definition provided by Back End Connectivity. Note that the interface is defined at the logical level and hence describes the behavior to be offered, but not the specific physical messages.

3270 Component Analysis. This section outlines the Logical Interface Definition provided by the BEC IF. BEC IF forwards the call to the 3270 Adapter. Note that the interface is defined at the logical level and hence describes the behavior to be offered, but not the specific physical messages. Guidelines on how the physical messages can be constructed are given in the Implementation Considerations section below.

3270 Logical Interface Definition. The BEC 3270 IF interface has the following preferred logical operations:

TABLE 21

| Operation | Parameters | Return | Behavior |
|---|---|---|---|
| Execute | Collection of Params containing "Initiate", cSession = NULL sCacheID, sTrans, sArgs, sFuncKey, sReserved | Standardized data structure containing output of the transaction | Executes the transaction on the mainframe (if the cross reference table specifies this transaction as cached and the cached copy is not available). |
| Execute | Collection of Params containing "Continue", cSession = NULL sCacheID, sTrans, sResponse, sFuncKey, sCursorPos, sReserved | | Executes the transaction on the mainframe (even if the cached copy of this transaction is available). |

RPC Component Analysis. RPC Logical Interface Definition: See FIG. 57.

TABLE 22

| CommandManager | | | |
|---|---|---|---|
| Operation | Parameters | Return | Behavior |
| GetCommand | Command Identifier User Context Command SL | Command interface | Checks with Security Framework to ensure that resource is available to user context. If available, locate service and code if required. If multiple services exist, use SL to determine unique service instance. |

TABLE 23

| Command | |
|---|---|
| Attribute | Description |
| CommandType | The type of command. Values could be: stored procedure, dynamic SQL, XML request document. |
| CommandText | The text that represents the command. This could be a command name or call string. |

TABLE 24

| Operation | Parameters | Return | Behavior |
|---|---|---|---|
| Execute | Parameter Collection | ExecuteResults | Executes the command on behalf of the application. The results are returned as Execute Results object. |
| Transform | None | None | Transforms the data for the command into a format understood by the underlying technology. |
| GetParameters | None | Parameter Collection | Returns a collection of parameters appropriate for the command. Clients set values for the parameters and pas as input to Execute method. |

TABLE 25

| Connection | |
|---|---|
| Attribute | Description |
| ConnectionType | The type of the connection, i.e.: ODBC, OLEDB, TGADP, Web Service. |
| ConnectionString | Information about the connection required to connect |
| Timeout | The length of time to wait for a request before timing out the operation. |

TABLE 26

Parameter

| Attribute | Description |
|---|---|
| Name | The name of the parameter |
| Value | The value assigned to the parameter |
| Type | The data type for the parameter. |
| Direction | The direction of the parameter. Valid values for direction are In, InOut, and Out. |

ParameterCollection is a class that contains a collection of Parameter instances.

Messaging Component Analysis. This section outlines the Logical Interface Definition provided by the Messaging framework. Note that the interface is defined at the logical level and hence describes the behavior to be offered, but not the specific physical messages.

Messaging Logical Interface Definition: The Messaging Connectivity Component realizes Adapter, Subscriber, and Publisher interfaces. The Subscriber interface object has the following logical operations:

TABLE 27

| Operation | Parameters | Return | Behavior |
|---|---|---|---|
| Subscribe( ) | Topic | SUCCESS/ ERROR | Accept messages with defined message type from the IF. |
| UnSubscribe( ) | Topic | SUCCESS/ ERROR | No longer want to receive messages from the Integration Framework. |
| CreateConnection( ) | Username, Password, IFMessage-ServiceID, SubscriberID | SUCCESS/ ERROR | Check for user entitlement Establish communication channel with the IF Pub/Sub System |

The Publisher interface object has the following logical operations:

TABLE 28

| Operation | Parameters | Return | Behavior |
|---|---|---|---|
| CreateConnection( ) | IFMessage-ServiceID, Topic | SUCCESS/ ERROR | Establish communication channel with IF - Pub/Sub System |
| Publish( ) | Message, DeliveryMode, Priority, Timeout | NIL | Sends messages to the Integration Framework |

The Adapter interface object has the following logical operations:

TABLE 29

| Operation | Parameters | Return | Behavior |
|---|---|---|---|
| GetMessage( ) | Message | SUCCESS/ ERROR | Get messages from data source Perform protocol transformation Transform message into a common message format understood by the underlying technology |

Naming Conventions. Commands provided in the Back End Connectivity Framework preferably adhere to standards for naming and structure. Standards provide for easier readability, development, and support of the interfaces.

Command Name:

Interface: <Verb><AppCategory>[Optional: SubCategory][Optional: Qualifier]

Verb: Query, Create, Update, Delete, Execute

AppCategories: Account, Research, Client, Order

SubCategory

Qualifier

Example: QueryAccount, QueryAccountBalance, ExecuteOrder, DeleteAccountHolding, CreateResearchOpinion.

Command Response: <CommandName>Response

Example: QueryAccountResponse

Command Return Data: <CommandName>Results

Example: QueryAccountResults

Implementation Considerations

This section describes some of the considerations that preferably are taken into account while implementing services for back end connectivity.

3270 Protocol Considerations. The Datastream that is expected out of the 3270 Connectivity Service is a standardized Data Stream representing 3270.

BEC IF Adapter Namespace. The 3270 Adapter Namespace exposes two methods via Execute (method of BEC IF), viz., "Initiate" and "Continue." The method is either "Initiate" for Initial request or "Continue" for Continuation of User Response. This is recommended for the following reasons:

(1) If there is a cached copy of the transaction, it would be submitted as a response to this method "only" if it is an "Initial" request; otherwise, the request is routed to the Mainframe for execution.

(2) If this is an Initial request, a 3270 Screen Buffer will be constructed (out of Transaction ID and the sArgs (see below)) and submitted to the mainframe.

"Initiate" is used for Initiation of Mainframe transactions. Following is the signature of the method: Execute("Initiate", cSession=NULL, sCacheID, sTrans, sArgs, sFuncKey, sReserved)

cSession: is the last character of the TermID (used for executing this transaction). If this value is NULL, the adapter allocates an available session for use.

sCacheID: is the key to cached transactions. Transaction ID cannot serve as an identifier since a user can have multiple copies of the same transaction with different states. (RCE is one transaction that can have as many as 400 branches. The value of Select fields denotes the branch that the user wants to follow.)

sTrans: is the transaction to execute.

sArgs: is a string that the Adapter concatenates with the sTrans (see above) and executed (much like a command line execution). For example, if the purpose was to execute "RCE 23a897655/1/2/3" in a "Clear" screen, the sTrans would have "RCE" and sArgs would have "23a89765/1/2/3."

sFuncKey: Function Keys that were pressed (PF1 ... PF12 and the Advanced PA keys).

sReserved: Reserved Data.

Response: The response is in a Standardized Data format. The data will contain all the fields that make up the resultant screen (including all relevant attributes like position, style, etc.), and choices. The Screen Buffer will be cached in Utility and will be accessed for future use.

(If Unsuccessful)
Requested status and/or Warnings
Error details
Error ID, Error type (server, app. etc) Error Message.
OR
(If Successful)
Standardized Format representing 3270 Data Stream
3270 Map "Continue" is used for Continuation of Response. Following is the preferred signature of the method: Execute("Continue", sSession, sCacheID, sTrans, sResponse, sFuncKey, sCursorPos, sReserved)

cSession: is the last character of the Termid (used for executing this transaction). If this value is NULL, the adapter allocates an available session for use.

sCacheID: is the key to cached transactions. The response to this request will be saved using this identifier.

sTrans: Transaction to execute.

sResponse: Name-Value pairs of the user response in the editable fields. Each edit field will have a name that starts with the letter 'E' (for edit field) followed by row number, a "_" and a column number. For example, "E1_10" denotes the edit field on first row, $10^{th}$ column. A semicolon will delimit the name-value pairs.

sFuncKey: Function Keys that were pressed (PF1 ... PF12 and the Advanced PA keys).

sCursorPos: Edit field that has the cursor position. The name of the edit field conforms to the same format that is stated in sResponse.

sReserved: Reserved Data.

Response: The response is in a Standardized Data format. The data will contain all the fields that make up the resultant screen (including all relevant attributes like position, style, etc.), and choices. The Screen Buffer will be cached in Utility and will be accessed for future use.

(If Unsuccessful)
Requested status and/or Warnings Error details
Error ID, Error type (server, app, etc.) Error Message.
OR
(If Successful)
Standardized Format representing 3270 Data Stream
3270 Map RPC Protocol Considerations: The back end connection framework preferably does not restrict the wire protocol used for connectivity. The framework requires that standard protocols such as SOAP be used. Applications using the framework do not decide the protocol and are not aware of the implementation details of the protocol.

Messaging Protocol Considerations: Messaging Connectivity Namespace. This is a preferred minimum requirement for the messaging framework namespace.

Exemplary Common Message Header Format:

VERSION=0101

MCAT=MESSAGE CATEGORY, A=HOST ALERT, L=LOCAL ALERT, P=HOST PRINT

MTYPE=CURRENT TGA MESSAGE TYPES, I.E., AOI, FYI, ETC.

MSRC=ORIGINATION SYSTEM, I.E. FYI, ORDER ENTRY, ETC.

MLOC_WC=ORIGINATION SYSTEM LOCATION/WIRE CALL, IF ANY (GENERATED EXTERNAL TO MAINFRAME HOST).

MUSER=ORIGINATION SYSTEM USER ID, IF ANY.

MID=MESSAGE ID (UNIQUE)

TIMESTAMP=TIMESTAMP (MMDDYYYYH-HMMSSSS) WHEN THIS MESSAGE ENTERED

DETAIL=ONE LINE MESSAGE TITLE OR DESCRIPTION

ADDRESSING.MODE=ADDRESSING MODE, I=INDIVIDUAL, X=BROADCAST TO ALL AT WC

ADDRESSING.COUNT=COUNT OF RECIPIENTS

ADDRESSING.LOC_WC=WIRE CALL WHERE MESSAGE IS TO GO

ADDRESSING.TYPE=ADDRESSING TYPE, N=NTID, B=BOSS ID, V=VENDOR SPECIFIED.

ADDRESSING.RECIPIENT.USER 1 TO N USER ID'S

MSG.CAT=CURRENT TGA MESSAGE CATEGORIES, I.E., MG—MANAGEMENT, ETC.

MSG.DETAIL=DETAIL FOR MESSAGE CAT, SUCH AS 'FD' FOR FUNDS DUE

MSG.DATETIME=MESSAGE DATE/TIME MMD-DYYYYHHMMSSSS PROVIDED BY INPUT SYSTEM.

MSG.LEN=NUMBER OF CHARACTERS IN MESSAGE

MSG.LINES=NUMBER OF LINES IN MESSAGE

MSG.DATA.NL=1 TO ADMS_OUT.MSG.LINES OF TEXT DATA

RESENT=0 TO N TIMES MESSAGE HAS BEEN RESENT TO DELIVERY SYSTEM

Delivery Mode: Asynchronous request-reply, Persistent.
Topic: branch location code
Message Payload: Message output header+Message Text
Message output header: RTRV/POSS DUP
DEST OSN [SO ISN] D/T APPENDIX A: 3270 Field Attributes

TABLE 30

| Line | Field Description | Application Screen View |
|---|---|---|
| 1 | Protected unmarked fields prior to first enterable field or first FSET protected field. | Ignored for View. |
| 1 | First unprotected field unless FSET protected field encountered first. | Taken to be Function field. Not mapped directly to view, but used for transmitting Transaction ID. |

TABLE 30-continued

| Line | Field Description | Application Screen View |
|---|---|---|
| 1 | FSET protected field prior to first unprotected field. | Taken to be Function field. Response data considered invalid if contents of this field do not match the Transaction ID attribute of the Page. |
| 1 | First FSET protected field between Function field and next enterable field. | Taken to be Hidden function field. If any transmission is made with the function field of the Host data map blank, this field must be present and nonblank. |
| 1 | Next unprotected field, or second FSET field, after Function Field. | Taken to be Select field. If field is FSET protected, the screen will have to be cleared if WS User alters the Select field on the View. |
| 1 | Next unprotected or FSET field after the Select field. | Taken to be the Password field. If field is FSET protected, the screen will have to be cleared if the WS User alters the Password field on the View. |
| 2-19 | Any protected, displayable field. | Presented as text in client area of Application Screen View, in location expected on a 3270 display. Color of text per table below. |
| 2-19 | Any protected, hidden field. | Ignored for View. If FSET, WHAM will retransmit to Host application. |
| 2-19 | Any unprotected, single-line displayable field. | Presented as an edit control on Application Screen View, in location expected on a 3270 display. Color of text per table below. |
| 2-19 | Any unprotected, single-line nondisplayable field. | Presented as a password-style edit control on Application Screen View, in location expected on a 3270 display. Displayed masking character configurable in Registry. |
| 2-19 | Any unprotected, multi-line displayable field | Presented as a single editable object that wraps from the end of one line to the beginning of the next in the way expected on a 3270 display. However, if field extends beyond line 19, it is truncated at the end of line 19. Color of text per table below. |
| 2-19 | Any unprotected, multi-line nondisplayable field. | Presented as a single-line password-style edit control on Application Screen View, capable of horizontal scrolling to hold the number of characters required by the 3270 field. If the field contains at least one full line, it is displayed on the first such line, as a field of 80 characters. If the field does not contain a full line (thus occupying at most two lines), it is displayed on the line on which it has the most enterable characters. If it has the same number of characters on each of the two lines, the field is displayed on the second line, where is starts at the beginning of the line. Displayed masking character configurable in Registry. |
| 20-24 | Text of a given line, ignoring field boundaries. | If non-blank, presented as one line of a multiline rich text edit field (with user editing disabled)., with text colors established separately for each field originally in the 3270 map, according to the table below. Blank or hidden fields are ignored in the View. |
| 20-24 | Any unprotected fields. | If non-blank, contents are presented as text per rule above, but WS User cannot alter contents. Blank or hidden fields are ignored in the View. |

The colors of the text characters are determined from Table 31 below.

TABLE 31

| 3270 Display Attribute | 3270 Extended Attribute | Hex Code | Color in Application View |
|---|---|---|---|
| Hidden (a/k/a Non-display) and protected. | Any | | Ignored, because text is not displayed. |
| Hidden (a/k/a Non-display) and unprotected. | None or Color Neutral | 42F0 | Black (color of displayed masking character). |
| Normal, non-detectable | None or Color Neutral | 42F0 | Black (0, 0, 0) |

TABLE 31-continued

| 3270 Display Attribute | 3270 Extended Attribute | Hex Code | Color in Application View |
|---|---|---|---|
| Normal, selector pen detectable | None or Color Neutral | 42F0 | Configurable, default Purple (199, 21, 124) |
| Intensified | None or Color Neutral | 42F0 | Configurable, default Red (255, 0, 0) |
| Any but Hidden protected. | Color Blue | 42F1 | Blue (0, 0, 255) |
| Any but Hidden protected | Color Red | 42F2 | Red (255, 0, 0) |
| Any but Hidden protected | Color Pink | 42F3 | Magenta (192, 0, 192) |
| Any but Hidden protected | Color Green | 42F4 | Green (0, 255, 0) |
| Any but Hidden protected | Color Turquoise | 42F5 | Cyan (0, 192, 192) |
| Any but Hidden protected | Color Yellow | 42F6 | Yellow (192, 192, 0) |
| Any but Hidden protected | Color Neutral | 42F7 | Configurable, matches background color, default (208, 208, 208) |
| Any but Hidden protected | Color Black | 42F8 | Black (0, 0, 0) |
| Any but Hidden protected | Color Deep Blue | 42F9 | Deep Blue (0, 0, 96) |
| Any but Hidden protected | Color Orange | 42FA | Orange (255, 192, 0) |
| Any but Hidden protected | Color Purple | 42FB | Purple (199, 21, 124) |
| Any but Hidden protected | Color Pale Green | 42FC | Pale Green (128, 255, 128) |
| Any but Hidden protected | Color Pale Turquoise | 42FD | Pale Turquoise (128, 255, 255) |
| Any but Hidden protected | Color Grey | 42FE | Grey (128, 128, 128) |
| Any but Hidden protected | Color White | 42FF | White (255, 255, 255) |
| Any but Hidden protected | Extended Highlight Blink | 41F1 | Ignored |

Although the present invention is particularly beneficial for use with business-related networks, it should be understood that the invention is not limited in that regard. Accordingly, the present invention may also be used with any type of software-based system that has front-end applications interacting with back-end services.

What is claimed is:

1. A system for implementing computer network services and applications, comprising:
   a front-end component comprising more than one software application stored in a first processor;
   a back-end component comprising one or more software services stored in a second processor; and
   an abstraction layer component that communicates with each of said more than one software application in said front-end component and each of said one or more software services in said back-end component, wherein:
   said abstraction layer component provides standardization of back end services such that each of said more than one software application in said front-end component accesses each of said one or more software services in said back-end component by communicating through said abstraction layer component, and
   said abstraction layer component provides built-in identity management that accepts a single sign on from a user and uses said single sign on to identify said user to each of said one or more software services and each of said more than one software application.

2. A system as in claim 1, wherein said abstraction layer component is operable to provide de-coupling of services provided by said back-end component.

3. A system as in claim 1, wherein said abstraction layer component is operable to provide de-coupling of said more than one application in said front-end component.

4. A system as in claim 1, wherein said abstraction layer component is operable to provide system wide error reporting.

5. A system as in claim 1, wherein said abstraction layer component comprises a business integration component.

6. A system as in claim 1, wherein said abstraction layer component comprises a vendor connectivity component.

7. A system as in claim 1, wherein said abstraction layer component comprises a security component.

8. A system as in claim 1, wherein said abstraction layer component comprises a utility component.

9. A system as in claim 1, wherein said abstraction layer component comprises a back end connectivity component.

10. A system as in claim 1, wherein said abstraction layer component uses application templates to provide standardization of business services.

11. A system as in claim 1, wherein said abstraction layer component is operable to provide one or more standardized interfaces to back end services.

12. A system as in claim 1, wherein said abstraction layer component is operable to provide one or more standardized interfaces to external consumers and providers.

13. A system as in claim 1, wherein said abstraction layer component comprises a single deployment platform.

14. A system for linking more than one software application in a front-end component and one or more software services in a back-end component, comprising:
- a vendor connectivity component stored on a first processor;
- a business integration component stored on a second processor;
- an abstraction layer component comprising a security component, wherein said security component provides identity management that accepts a single sign on from a user and uses said single sign on to identify said user to each of said more than one software application and each of said one or more software services;
- a utility component; and
- a back end connectivity component, wherein said back end connectivity component enables each of said more than one software application in said front-end component to access each of said one or more software services in said back-end component by communicating through one standardized application program interface.

15. A system as in claim 14, wherein said vendor connectivity component is operable to standardize exposure of said applications to said services.

16. A system as in claim 14, wherein said vendor connectivity component is operable to provide a consistent abstraction between a user interface and a middle tier.

17. A system as in claim 14, wherein said vendor connectivity component is operable to use standardized headers to provide substantially seamless system management integration between a caller and said applications.

18. A system as in claim 14, wherein said vendor connectivity component is operable to provide automatically generated service entry points.

19. A system as in claim 14, wherein said vendor connectivity component is operable to provide service location and activation capabilities using one or more standard interfaces.

20. A system as in claim 19, wherein said one or more standard interfaces comprise a Universal Discovery Description and Integration interface.

21. A system as in claim 14, wherein said business integration component is operable to provide call context information.

22. A system as in claim 14, wherein said business integration component is operable to provide identity context information.

23. A system as in claim 14, wherein said business integration component is operable to provide application context information.

24. A system as in claim 14, wherein said security component is operable to provide distributed security.

25. A system as in claim 14, wherein said utility component is operable to enable said applications to access utilities using a standardized application program interface.

26. A system as in claim 14, wherein said utility component is operable to provide centralized end-to-end system management with an ability to correlate information across a plurality of parameters.

27. A system as in claim 14, wherein said utility component is operable to enable auditing at system boundaries to manage service level agreements and method level metering.

28. A system as in claim 14, wherein said back end connectivity component is operable to provide access to back end data sources without changing a back end system.

29. A system as in claim 14, wherein said back end connectivity component is operable to enable de-coupling of said applications from said services.

* * * * *